United States Patent
Noble et al.

(10) Patent No.: US 9,004,512 B2
(45) Date of Patent: *Apr. 14, 2015

(54) SHEAR SPRING USEFUL FOR VEHICLE SUSPENSION

(71) Applicant: Hendrickson USA, L.L.C., Itasca, IL (US)

(72) Inventors: Shawn D. Noble, Naperville, IL (US); Matthew J. Van Meter, Plainfield, IL (US); Monica J. Kaltreider, Chicago, IL (US); Hormoz Kerendian, Buffalo Grove, IL (US); Ashley T. Dudding, Yorkville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,873

(22) Filed: Jul. 25, 2013

(65) Prior Publication Data

US 2013/0307242 A1 Nov. 21, 2013

Related U.S. Application Data

(63) Continuation-in-part of application No. 13/543,424, filed on Jul. 6, 2012, now Pat. No. 8,657,315, which is a continuation-in-part of application No. 13/178,773, filed on Jul. 8, 2011, now Pat. No. 8,262,112.

(51) Int. Cl.
*B60G 11/22* (2006.01)
*B60G 11/24* (2006.01)
(Continued)

(52) U.S. Cl.
CPC *B60G 11/24* (2013.01); *B60G 9/02* (2013.01); *B60G 11/22* (2013.01); *B60G 5/02* (2013.01);
(Continued)

(58) Field of Classification Search
CPC ............. B60G 5/00; B60G 5/01; B60G 5/02; B60G 5/04; B60G 7/02; B60G 11/22; B60G 2200/318; B60G 11/24
USPC .......... 280/676, 677, 681, 682, 687, 124.116, 280/124.121, 124.177, 124, 178; 267/140.4, 292, 294
See application file for complete search history.

(56) References Cited

U.S. PATENT DOCUMENTS

| 7,706 A | 10/1850 | Ray |
|---|---|---|
| 1,409,044 A | 3/1922 | Tusar |

(Continued)

FOREIGN PATENT DOCUMENTS

| CN | 200974446 | 11/2007 |
|---|---|---|
| CN | 301294475 | 7/2010 |

(Continued)

OTHER PUBLICATIONS

Hendrickson, Technical Bulletin HN 402/462/522, Subject: Auxiliary Spring Shim Design, Jun. 2006.

(Continued)

*Primary Examiner* — Paul N Dickson
*Assistant Examiner* — Barry Gooden, Jr.
(74) *Attorney, Agent, or Firm* — McDonnell Boehnen Hulbert & Berghoff LLP

(57) ABSTRACT

A shear spring having a base plate having a flat upper surface, and an upper plate having a V-shaped upper surface opposite the base plate adapted to mate with a corresponding V-shaped surface positioned on a side wall of a spring mount, the upper plate having a flat lower surface parallel to the flat upper surface of the base, and an elastomeric material positioned between the flat upper surface of the base plate and the flat lower surface of the upper plate.

27 Claims, 46 Drawing Sheets

(51) Int. Cl.
  *B60G 9/02* (2006.01)
  *B60G 5/02* (2006.01)
  *B60G 7/04* (2006.01)
  *B60G 11/42* (2006.01)
  *B60G 11/52* (2006.01)
  *B60G 11/62* (2006.01)
  *F16F 1/373* (2006.01)
  *F16F 1/41* (2006.01)
  *F16F 1/44* (2006.01)
  *F16F 1/50* (2006.01)
  *F16F 1/54* (2006.01)
  *F16F 3/087* (2006.01)

(52) U.S. Cl.
  CPC  *B60G 7/04* (2013.01); *B60G 11/42* (2013.01); *B60G 11/52* (2013.01); *B60G 11/62* (2013.01); *F16F 1/373* (2013.01); *F16F 1/41* (2013.01); *F16F 1/44* (2013.01); *F16F 1/50* (2013.01); *F16F 1/54* (2013.01); *F16F 3/0876* (2013.01); *B60G 2200/318* (2013.01); *B60G 2202/1422* (2013.01); *B60G 2202/143* (2013.01); *B60G 2204/125* (2013.01); *B60G 2204/41* (2013.01); *B60G 2204/44* (2013.01); *B60G 2204/4502* (2013.01); *B60G 2206/60* (2013.01); *B60G 2206/601* (2013.01); *B60G 2206/8101* (2013.01); *B60G 2206/8207* (2013.01); *B60G 2300/026* (2013.01); *B60G 2300/0262* (2013.01); *B60G 2300/10* (2013.01)

(56) References Cited

U.S. PATENT DOCUMENTS

| | | |
|---|---|---|
| 1,516,051 A | 11/1924 | Lundie |
| 1,576,376 A | 3/1926 | Sudekum |
| 1,604,961 A | 11/1926 | Bell et al. |
| 1,608,507 A | 11/1926 | Hogan |
| 1,640,179 A | 8/1927 | Buckwalter |
| 1,640,204 A | 8/1927 | Biagio |
| 1,679,528 A | 8/1928 | Johanson |
| 1,817,325 A | 8/1931 | Sinkovich |
| 1,853,166 A | 4/1932 | Nibbe |
| 1,949,363 A | 2/1934 | Willard |
| 1,974,160 A | 9/1934 | Peirson |
| 2,094,335 A | 9/1937 | Willard et al. |
| 2,111,475 A | 3/1938 | Kegresse |
| 2,197,727 A | 4/1940 | Ledwinka |
| 2,216,715 A | 10/1940 | Ledwinka |
| 2,245,296 A | 6/1941 | Piron |
| 2,284,484 A | 5/1942 | Eksergian |
| 2,286,563 A | 6/1942 | Mussey |
| 2,323,919 A | 7/1943 | Knox |
| 2,333,650 A | 11/1943 | Hickman |
| 2,437,158 A | 3/1948 | Heiney |
| 2,655,005 A | 10/1953 | Kinneman |
| 2,663,570 A | 12/1953 | Hickman |
| 2,689,136 A | 9/1954 | Hendrickson |
| 2,704,664 A | 3/1955 | Hickman |
| 2,706,113 A | 4/1955 | Hickman |
| 2,739,821 A | 3/1956 | Hickman |
| 2,750,200 A | 6/1956 | Scheel |
| 2,758,832 A | 8/1956 | Hickman |
| 2,775,353 A | 12/1956 | Tillou |
| 2,788,222 A | 4/1957 | Wilson et al. |
| 2,798,735 A | 7/1957 | Compton |
| 2,802,662 A | 8/1957 | Hirst |
| 2,872,207 A | 2/1959 | Hirst |
| 2,880,885 A | 4/1959 | Willison |
| 2,905,390 A | 9/1959 | Saul |
| 2,940,771 A | 6/1960 | Hendrickson |
| 2,980,439 A | 4/1961 | Miller |
| 2,981,208 A | 4/1961 | Sinclair |
| 2,995,383 A | 8/1961 | Barker |
| 3,004,715 A | 10/1961 | Gadd |
| 3,011,776 A | 12/1961 | Reed |
| 3,017,195 A | 1/1962 | Hickman |
| 3,030,098 A | 4/1962 | Roubal |
| 3,037,764 A | 6/1962 | Paulsen |
| 3,045,998 A | 7/1962 | Hirst |
| 3,047,163 A | 7/1962 | Johnson et al. |
| 3,071,422 A | 1/1963 | Hinks |
| 3,121,560 A | 2/1964 | Reed |
| 3,134,585 A | 5/1964 | Trask |
| 3,241,856 A | 3/1966 | Raidel |
| 3,276,395 A | 10/1966 | Heintzel |
| 3,279,779 A | 10/1966 | Thomas et al. |
| 3,279,820 A | 10/1966 | Hickman |
| 3,297,339 A | 1/1967 | Hendrickson |
| 3,301,573 A | 1/1967 | Hickman |
| 3,305,227 A | 2/1967 | Henley |
| 3,315,951 A | 4/1967 | Boschi et al. |
| 3,368,806 A | 2/1968 | Szonn |
| 3,436,155 A | 4/1969 | Perin, Jr. |
| 3,447,814 A | 6/1969 | Siber et al. |
| 3,471,165 A | 10/1969 | Raidel |
| 3,482,852 A | 12/1969 | Hickman |
| 3,485,040 A | 12/1969 | Niskanen |
| 3,539,170 A | 11/1970 | Hamel |
| 3,545,787 A | 12/1970 | Miller |
| 3,563,525 A | 2/1971 | Narabu |
| 3,572,745 A | 3/1971 | Willets |
| 3,575,403 A | 4/1971 | Hamel et al. |
| 3,580,611 A | 5/1971 | McNitt |
| 3,606,295 A | 9/1971 | Appleton |
| 3,618,533 A | 11/1971 | Hirst |
| 3,618,971 A | 11/1971 | Wragg |
| 3,625,501 A | 12/1971 | Hein et al. |
| 3,626,465 A | 12/1971 | Hirst |
| 3,680,888 A * | 8/1972 | Hirst ..................... 280/124.177 |
| 3,687,477 A | 8/1972 | Miller |
| 3,695,737 A | 10/1972 | Alexander et al. |
| 3,699,897 A | 10/1972 | Sherrick |
| 3,712,246 A | 1/1973 | Lich |
| 3,716,999 A | 2/1973 | Middelbeek |
| 3,731,913 A | 5/1973 | Hirst |
| 3,797,851 A | 3/1974 | Hirst |
| 3,811,700 A | 5/1974 | Moore |
| 3,817,551 A | 6/1974 | Moore |
| 3,830,483 A | 8/1974 | Gaydecki |
| 3,831,923 A | 8/1974 | Meldrum |
| 3,857,556 A | 12/1974 | Wing |
| 3,936,073 A | 2/1976 | Hickman et al. |
| 3,952,669 A | 4/1976 | Mauzin et al. |
| 3,955,808 A | 5/1976 | Jorn et al. |
| D240,239 S | 6/1976 | Calandrino |
| 3,984,125 A | 10/1976 | Paton et al. |
| 3,997,151 A | 12/1976 | Leingang |
| 3,999,497 A | 12/1976 | Hamel |
| 4,000,914 A * | 1/1977 | Wragg .......................... 280/682 |
| D246,572 S | 12/1977 | Walter |
| 4,082,316 A | 4/1978 | Raidel |
| 4,095,690 A | 6/1978 | Baldwin |
| 4,108,470 A | 8/1978 | Vinton |
| 4,111,131 A | 9/1978 | Bullock |
| 4,111,406 A | 9/1978 | Zanow |
| 4,132,433 A | 1/1979 | Willetts |
| 4,134,343 A | 1/1979 | Jackson |
| 4,144,978 A | 3/1979 | Drake |
| 4,162,799 A | 7/1979 | Willetts |
| 4,182,338 A | 1/1980 | Stanulis |
| 4,193,612 A | 3/1980 | Masser |
| 4,213,633 A | 7/1980 | Moore et al. |
| 4,258,629 A | 3/1981 | Jackson et al. |
| 4,278,271 A | 7/1981 | Raidel |
| D265,285 S | 7/1982 | Englert, Jr. |
| 4,357,032 A * | 11/1982 | Kenyon .......................... 280/681 |
| 4,358,096 A | 11/1982 | Paton et al. |
| 4,371,189 A | 2/1983 | Raidel |
| 4,382,547 A | 5/1983 | Phillips |
| D270,574 S | 9/1983 | Black |
| 4,420,171 A | 12/1983 | Raidel |
| 4,452,007 A | 6/1984 | Martin |

(56) References Cited

U.S. PATENT DOCUMENTS

| | | |
|---|---|---|
| D275,178 S | 8/1984 | Yeater |
| 4,486,029 A | 12/1984 | Raidel |
| 4,488,495 A | 12/1984 | Dean, II |
| 4,504,080 A | 3/1985 | Van Denberg |
| 4,527,365 A | 7/1985 | Yoshizawa et al. |
| 4,548,150 A | 10/1985 | Drewett |
| 4,585,086 A | 4/1986 | Hiramatsu |
| 4,589,347 A | 5/1986 | Colford et al. |
| 4,705,294 A | 11/1987 | Raidel |
| 4,733,855 A | 3/1988 | Balczun et al. |
| 4,753,456 A | 6/1988 | Booher |
| 4,781,365 A | 11/1988 | Harrison |
| 4,793,597 A | 12/1988 | Smith |
| D306,476 S | 3/1990 | Millard |
| 4,944,402 A | 7/1990 | Wu |
| D312,205 S | 11/1990 | de Rooij |
| 4,968,010 A | 11/1990 | Odobasic |
| 4,995,636 A | 2/1991 | Hall et al. |
| D318,010 S | 7/1991 | Clinkscales |
| 5,114,178 A | 5/1992 | Baxter |
| 5,118,086 A | 6/1992 | Stevenson et al. |
| 5,150,657 A | 9/1992 | Bourgeot |
| 5,150,918 A | 9/1992 | Heitzmann |
| 5,237,933 A | 8/1993 | Bucksbee |
| D341,529 S | 11/1993 | Jacobs |
| 5,271,678 A | 12/1993 | Bourgeot |
| D344,254 S | 2/1994 | Zimmerman |
| 5,283,404 A | 2/1994 | Prescaro, Jr. |
| D349,041 S | 7/1994 | Wical |
| 5,327,674 A | 7/1994 | Powell |
| 5,333,897 A | 8/1994 | Landis et al. |
| 5,364,086 A | 11/1994 | Paton |
| D356,641 S | 3/1995 | Stewart et al. |
| 5,413,320 A | 5/1995 | Herbst |
| D360,544 S | 7/1995 | Gauthier |
| 5,447,324 A | 9/1995 | Raidel, Sr. |
| 5,465,997 A | 11/1995 | Heitzmann |
| 5,482,406 A | 1/1996 | Arlt, III |
| 5,508,482 A | 4/1996 | Martin et al. |
| D377,961 S | 2/1997 | Dickson et al. |
| 5,615,786 A | 4/1997 | Hoyon et al. |
| D381,338 S | 7/1997 | Johansson |
| D384,877 S | 10/1997 | Perrin et al. |
| 5,676,356 A | 10/1997 | Ekonen et al. |
| D390,305 S | 2/1998 | Dickson et al. |
| D391,915 S | 3/1998 | Miller |
| 5,753,429 A | 5/1998 | Pugh |
| D397,667 S | 9/1998 | White |
| 5,810,337 A | 9/1998 | McLaughlin |
| 5,816,605 A * | 10/1998 | Raidel, Sr. .................... 280/676 |
| 5,868,384 A | 2/1999 | Anderson |
| 5,887,881 A | 3/1999 | Hatch |
| D409,077 S | 5/1999 | Brooks |
| 5,899,470 A | 5/1999 | Heitzmann |
| 5,909,821 A | 6/1999 | Guridi |
| 5,938,221 A | 8/1999 | Wilson |
| 5,947,458 A | 9/1999 | Rhodes et al. |
| 5,957,441 A | 9/1999 | Tews |
| D415,950 S | 11/1999 | Anderson |
| 5,989,075 A | 11/1999 | Hsiao et al. |
| 6,008,460 A | 12/1999 | Demari |
| D423,342 S | 4/2000 | Popesco |
| 6,045,328 A | 4/2000 | Jones |
| 6,129,369 A | 10/2000 | Dudding |
| 6,176,345 B1 | 1/2001 | Perkins et al. |
| 6,178,894 B1 | 1/2001 | Leingang |
| 6,189,904 B1 | 2/2001 | Gentry et al. |
| 6,193,266 B1 | 2/2001 | Cortez et al. |
| 6,206,407 B1 | 3/2001 | Fuchs et al. |
| 6,264,231 B1 | 7/2001 | Scully |
| 6,276,674 B1 | 8/2001 | Randell |
| 6,328,294 B1 | 12/2001 | Palinkas |
| 6,478,321 B1 | 11/2002 | Heitzmann |
| 6,516,914 B1 | 2/2003 | Andersen et al. |
| D471,888 S | 3/2003 | Solland |
| D474,274 S | 5/2003 | Walters |
| 6,572,087 B2 | 6/2003 | Schleinitz et al. |
| 6,585,286 B2 | 7/2003 | Adema et al. |
| 6,588,820 B2 | 7/2003 | Rice |
| D479,793 S | 9/2003 | Jones |
| 6,659,438 B2 | 12/2003 | Michael et al. |
| 6,666,474 B2 | 12/2003 | Pavuk |
| 6,702,240 B1 | 3/2004 | Bradley |
| D496,887 S | 10/2004 | Carlson |
| 6,817,301 B1 | 11/2004 | Bullock |
| D503,231 S | 3/2005 | Daugherty |
| 6,877,623 B2 | 4/2005 | Salis |
| D507,658 S | 7/2005 | Wescott, III |
| 6,916,037 B2 | 7/2005 | Baxter et al. |
| 6,951,260 B1 | 10/2005 | Isley |
| D515,942 S | 2/2006 | Hamblin et al. |
| D515,943 S | 2/2006 | Hamblin et al. |
| D519,104 S | 4/2006 | Richter |
| D520,322 S | 5/2006 | Orlando |
| 7,059,631 B2 | 6/2006 | Schorle et al. |
| 7,077,411 B2 | 7/2006 | Peters et al. |
| D530,187 S | 10/2006 | Esbaugh |
| 7,185,903 B2 | 3/2007 | Dove |
| D543,492 S | 5/2007 | Lyew |
| 7,229,088 B2 | 6/2007 | Dudding et al. |
| 7,234,723 B2 | 6/2007 | Sellers |
| D551,315 S | 9/2007 | Zimmerman |
| 7,287,760 B1 | 10/2007 | Quick et al. |
| 7,293,794 B2 | 11/2007 | Clarke et al. |
| 7,303,200 B2 | 12/2007 | Ramsey |
| D559,081 S | 1/2008 | Myers |
| 7,320,538 B2 | 1/2008 | Ko et al. |
| 7,387,074 B2 | 6/2008 | Myers |
| D582,918 S | 12/2008 | Scott |
| D586,204 S | 2/2009 | Robbins et al. |
| 7,490,852 B2 | 2/2009 | Marotzke et al. |
| 7,607,668 B2 | 10/2009 | Dugandzic et al. |
| D603,303 S | 11/2009 | Noble et al. |
| D604,792 S | 11/2009 | Stanley |
| D605,984 S | 12/2009 | Noble et al. |
| D606,459 S | 12/2009 | Noble et al. |
| D610,952 S | 3/2010 | Noble et al. |
| D615,005 S | 5/2010 | Noble et al. |
| 7,708,309 B2 | 5/2010 | Kim et al. |
| D622,642 S | 8/2010 | Noble et al. |
| D624,461 S | 9/2010 | Noble et al. |
| D624,462 S | 9/2010 | Noble et al. |
| D624,463 S | 9/2010 | Noble et al. |
| D624,464 S | 9/2010 | Noble et al. |
| D624,465 S | 9/2010 | Noble et al. |
| 7,832,508 B2 | 11/2010 | Isley |
| 7,845,288 B2 | 12/2010 | Forbes et al. |
| D630,137 S | 1/2011 | Noble et al. |
| D632,230 S | 2/2011 | Noble et al. |
| D632,619 S | 2/2011 | Noble et al. |
| D632,620 S | 2/2011 | Noble et al. |
| D633,011 S | 2/2011 | Noble et al. |
| 7,926,836 B2 | 4/2011 | Noble et al. |
| D645,794 S | 9/2011 | Noble et al. |
| 8,033,565 B2 | 10/2011 | Holroyd |
| D648,031 S | 11/2011 | Roggenkamp |
| D648,249 S | 11/2011 | Noble et al. |
| 8,052,166 B2 | 11/2011 | Noble et al. |
| 8,061,698 B2 | 11/2011 | Palinkas |
| D649,917 S | 12/2011 | Noble et al. |
| D650,082 S | 12/2011 | Roggenkamp |
| D650,483 S | 12/2011 | Roggenkamp |
| 8,070,143 B2 | 12/2011 | Wietharn |
| D655,419 S | 3/2012 | Roggenkamp |
| 8,152,195 B2 | 4/2012 | Noble et al. |
| 8,210,507 B2 | 7/2012 | Mitsch |
| 8,262,112 B2 | 9/2012 | Noble et al. |
| 8,276,927 B1 | 10/2012 | Noble et al. |
| 8,302,988 B2 | 11/2012 | Noble et al. |
| D672,286 S | 12/2012 | Noble et al. |
| D672,287 S | 12/2012 | Noble et al. |
| 8,342,566 B1 | 1/2013 | Noble et al. |
| 8,579,510 B2 * | 11/2013 | Noble et al. .................. 384/428 |
| 8,657,315 B2 | 2/2014 | Noble et al. |

(56) References Cited

U.S. PATENT DOCUMENTS

| | | | |
|---|---|---|---|
| 8,720,937 B2* | 5/2014 | Noble et al. | 280/681 |
| 2002/0163165 A1 | 11/2002 | Adema et al. | |
| 2003/0047907 A1 | 3/2003 | Hicks et al. | |
| 2003/0196648 A1 | 10/2003 | Schroer et al. | |
| 2004/0262877 A1 | 12/2004 | Sellers | |
| 2005/0110233 A1 | 5/2005 | Hedenberg | |
| 2006/0071441 A1 | 4/2006 | Mathis | |
| 2006/0208445 A1 | 9/2006 | Gideon | |
| 2007/0262547 A1 | 11/2007 | Warinner | |
| 2008/0018070 A1 | 1/2008 | Gottschalk | |
| 2008/0030006 A1 | 2/2008 | Sellers | |
| 2008/0122146 A1 | 5/2008 | Herntier et al. | |
| 2008/0134413 A1 | 6/2008 | Guo | |
| 2008/0258361 A1 | 10/2008 | Wen et al. | |
| 2008/0290572 A1 | 11/2008 | Desprez et al. | |
| 2009/0008846 A1 | 1/2009 | Yamakawa et al. | |
| 2009/0108086 A1 | 4/2009 | Mospan et al. | |
| 2009/0218740 A1 | 9/2009 | Gedenk | |
| 2009/0224504 A1 | 9/2009 | Noble et al. | |
| 2009/0224513 A1 | 9/2009 | Noble et al. | |
| 2009/0230650 A1 | 9/2009 | Mayen et al. | |
| 2010/0044992 A1 | 2/2010 | Noble et al. | |
| 2010/0072733 A1 | 3/2010 | Levi | |
| 2010/0270719 A1 | 10/2010 | Ranum et al. | |
| 2011/0031662 A1 | 2/2011 | Toyama | |
| 2011/0057407 A1 | 3/2011 | Noble et al. | |
| 2011/0222803 A1* | 9/2011 | Noble et al. | 384/428 |
| 2012/0001373 A1 | 1/2012 | McLaughlin | |
| 2012/0018983 A1 | 1/2012 | Oriet | |
| 2012/0325107 A1 | 12/2012 | Wicks et al. | |
| 2013/0009373 A1 | 1/2013 | Noble et al. | |
| 2013/0009377 A1 | 1/2013 | Noble et al. | |
| 2013/0019774 A1 | 1/2013 | Ahuja et al. | |
| 2013/0033018 A1 | 2/2013 | Kiselis et al. | |
| 2013/0062856 A1* | 3/2013 | Noble et al. | 280/124.177 |
| 2013/0069333 A1 | 3/2013 | Pizzeta | |
| 2013/0162007 A1 | 6/2013 | Oriet | |
| 2015/0028556 A1* | 1/2015 | Noble et al. | 280/124.116 |

FOREIGN PATENT DOCUMENTS

| | | |
|---|---|---|
| CN | 301364969 | 10/2010 |
| DE | 973418 | 2/1960 |
| DE | 3524916 | 1/1987 |
| DE | 4128488 | 3/1993 |
| DE | 4204783 | 8/1993 |
| EP | 0419057 | 3/1991 |
| EP | 1911661 | 4/2008 |
| EP | 2006129 | 12/2008 |
| FR | 2270487 | 12/1975 |
| FR | 2342193 | 9/1977 |
| FR | 2550918 | 3/1985 |
| FR | 2797432 | 2/2001 |
| GB | 997305 | 7/1965 |
| GB | 2069424 | 8/1981 |
| GB | 2128942 | 5/1984 |
| GB | 2226867 | 7/1990 |
| GB | 2252276 | 8/1992 |
| GB | 2339264 | 1/2000 |
| GB | 2352016 | 1/2001 |
| JP | 57-128503 | 5/1982 |
| JP | 58-079408 | 5/1983 |
| JP | 59-073648 | 5/1984 |
| JP | 64-035134 | 2/1989 |
| JP | 05149035 | 6/1993 |
| JP | 05338552 | 12/1993 |
| JP | H11-51116 | 2/1999 |
| JP | D1337440 | 8/2008 |
| TW | 528545 | 4/2003 |
| WO | 92/15800 | 9/1992 |
| WO | 02/42097 | 5/2002 |
| WO | 2006/067551 | 6/2006 |
| WO | 2010/068319 | 6/2010 |

OTHER PUBLICATIONS

Hendrickson, Technical Bulletin R, RS, RT/RTE 46K Capacity, Subject: 46K Heavy-Duty Beam Option, Dec. 2004.
Hendrickson, Technical Procedure Haulmaax, Subject: Pre-delivery Inspection and Preventive Maintenance, Apr. 2006.
Hendrickson, Technical Procedure Haulmaax, Subject: Service Instructions, May 2002.
Hendrickson, Technical Procedure Haulmaax, Subject: Service Instructions, Jun. 2007.
Hendrickson, Technical Procedure Haulmaax, Subject: Service Instructions, Dec. 2007.
Hendrickson, Technical Procedure HN/HNT-400/460 Truck & Trailer Suspension in Production Nov. 1988-Sep. 1996, Apr. 1998.
Hendrickson, Technical Procedure, R/RS Heavy Duty, Subject: 85K/100K/120K lbs Capacity Tightening Torgue for Torque Rod and Saddle Assembly Fasteners, Oct. 2008.
Hendrickson USA, L.L.C., HUV Heavy-duty Rubber Suspension, Dec. 2009.
Hendrickson, The Boler Company, RS Frame Hanger, Dec. 1997.
"Hydropneumatic Suspension"—Wikipedia, the free encyclopedia, downloaded from the World Wide Web at http://en.wikipedia.org/wiki/hydropneumatic_suspension on Nov. 11, 2009.
Jorn, Technology in Rubber—Metal, Sep. 29, 2008.
Kenworth Truck Company, Haulmaxx, May 14, 2009.
MOR/ryde, A rubber spring . . . heart of the Mor/ryde system, Aug. 1973.
MOR/ryde, Commercial Trailer Suspension, Jun. 1973.
MOR/ryde, Company Profile, downloaded from the World Wide Web at http://www.morrydede.com/php/about/profile/php on Feb. 28, 2008.
MOR/ryde, RL Rubber Leaf Suspension System, Owner's Manual, Mar. 12, 2003.
MOR/ryde, School Bus Suspension, Aug. 1973.
MOR/ryde, T/A Modular Rubber Suspension System, Service Manual, Mar. 5, 2003.
MOR/ryde, Tandem Axle Rubber Suspension Sytem, Service Manual, Suspension Codes: T01-01 and L01-01, Mar. 5, 2003.
MOR/ryde, The MOR/ryde Steer and Drive Axle Suspension Systems, Mar. 7, 2008.
Paul Macioce, Rouch Industrisies, Inc., Viscoelastic Damping 101, Sep. 9, 2002.
"Progressive Springs—Linear Springs," downloaded from the World Wide Web at http://www.scoobytuner.com/tuning/?tSfID1=1X6&tuningID=21 on Nov. 11, 2009.
"PT-Tuning," downloaded from the World Wide Web at http://autorepair.about.com/library/glossary/bldef-227.htm?p=1 on Nov. 11, 2009.
Wikipedia—File:Tie Plates.jpg. http://en.wikipedia.org/wiki/File:Tie_plates.jpg Downloaded from the World Wide Web Jul. 28, 2009.
Wikipedia—Tie plate. http://en.wikipedia.org/wiki/Tie_plate. Downloaded from the World Wide Web on Jul. 28, 2009.
Taiwan Search Report for TW Design Patent App. No. 100301028 dated Nov. 25, 2011.
Taiwan Search Report for TW Design Patent App. No. 100301032 dated Nov. 25, 2011.
Taiwan Search Report for TW Design Patent App. No. 100301033 dated Nov. 25, 2011.
International Search Report for PCT/US2011/049829 mailed Oct. 17, 2011.
International Search Report for PCT/US2012/045770, mailed Nov. 9, 2012, 12 pages.
Notice of Allowance for U.S. Appl. No. 29/369,287 mailed Mar. 1, 2012.
U.S. Appl. No. 13/178,773, filed Jul. 8, 2011, pp. 1-99.
U.S. Appl. No. 29/315,182, filed Jun. 2, 2009, pp. 1-16.
U.S. Appl. No. 29/369,285, filed Sep. 5, 2010, pp. 1-65.
U.S. Appl. No. 29/369,287, filed Sep. 5, 2010, pp. 1-7.
U.S. Appl. No. 29/396,890, filed Jul. 8, 2011, pp. 1-20.
U.S. Appl. No. 29/396,892, filed Jul. 8, 2011, pp. 1-11.
U.S. Appl. No. 29/396,893, filed Jul. 8, 2011, pp. 1-19.

(56) References Cited

OTHER PUBLICATIONS

About.com, Progressive Rate Spring, downloaded from the World Wide Web at http://autorepair.about.com/library/glossary/bldef-277.htm on Nov. 21, 2008.
Answers.com—tie plate. http://www.answers.com/topic/tie-plate. Downloaded from the World Wide Web on Jul. 28, 2009.
Elastomer, downloaded from the World Wide Web at http;//en.wikipedia.org/wiki/Elastomer on Nov. 24, 2008.
European Patent Office, Communication Relating to the Results of the Partial International Search, PCT/US2009/036662, Mar. 2, 2010.
European Patent Office, International Search Report for International Application No. PCT/US2009/036662, Feb. 17, 2010.
European Patent Office, International Search Report for International application No. PCT/US2009/056575, Mar. 3, 2010.
European Patent Office, Written Opinion for International application No. PCT/US2009/056575, Mar. 3, 2010.
European Patent Office, Written Opinion of the International Searching Authority for International Application No. PCT/US2009/036662, Feb. 17, 2010.
Hendrickson USA, L.L.C., Technical Procedure HUV 270t Heavy-duty Rubber Suspension, Subject: Service Instructions, Lit. No. 17730-269, Revision C, Feb. 2010.
Hendrickson, Haulmaxx Heavy-Duty Suspension, Jan. 2009.
Hendrickson, HN FR Series, HN FR Suspension 42-58K Fire/Rescue, Feb. 2009.
Hendrickson Mfg. Co., Tandem Division, Hendrickson Tandem Suspensions for GMC Trucks, Aug. 1979.
Hendrickson Mfg., Tandem Division, Wide spread equalizing beams, sales bulletin, May 1981.
European Patent Office, International Preliminary Report on Patentability for International Application No. PCT/US2009/056575, Mar. 29, 2011.
Hendrickson Suspension, A Boler Company, Hendrickson HNT Series, Feb. 1992.
Hendrickson Suspension, HN Series Premium Rubber, Hendrickson introduces a completely new concept in Walking Beam Suspension, Jun. 1993.
Hendrickson Suspension, RS Series rubber load cushion, Jul. 1991.
Hendrickson Suspension, Sales Engineering Update, Mar. 1993.
Hendrickson Technical Brochure for "Bus Air Ride Suspensions" H621 Oct. 1998.
Hendrickson Technical Brochure for "Non-Steerable Suspension Systems" H621 Dec. 2003.
Hendrickson Truck Supension Systems, A Boler Company, Sales engineering update, Subject: HN-402/462 Auxiliary Spring Assembly, Aug. 1998.
Hendrickson Truck Supension Systems, A Boler Company, Sales engineering update, Subject: Model Designation and Discontinuance, Aug. 1999.
Hendrickson Truck Supension Systems, A Boler Company, Sales engineering update, Subject: Equalizer Beam, Aug. 1999.
Hendrickson Truck Suspension Systems, A Boler Company, HN 402, Feb. 1996.
Hendrickson Truck Suspension Systems, A Boler Company, HN Series VariRate Spring System, May 1997.
Hendrickson Truck Suspension Systems, A Boler Company, HN Series VariRate Spring System, Nov. 1997.
Hendrickson Truck Suspension Systems, A Boler Company, HN Series VariRate Spring System, Sep. 1998.
Hendrickson Truck Suspension Systems, A Boler Company, HN Series VariRate Spring System, Jul. 1999.
Hendrickson Truck Suspension Systems, A Boler Company, R Series Solid Mount, Jul. 1999.
Hendrickson Truck Suspension Systems, A Boler Company, RS Series Rubber Load Cushion, Dec. 1996.
Hendrickson Truck Suspension Systems, A Boler Company, RS Series Rubber Load Cushion, Apr. 1998.
Hendrickson Truck Suspension Systems, A Boler Company, RS Series Rubber Load Cushion, Jun. 1999.
Hendrickson Truck Suspension Systems, A Boler Company, Technical Publication RS-340 thru 520, Subject: Springing: Frame Hangers, Load Cushions and Saddle Assembly, Jul. 1993.
Hendrickson Truck Suspension Systems, A Boler Company, Technical Publication HN Series Truck & Trailer Suspension No. 17730-198, Mar. 1993.
Hendrickson Truck Suspension Systems, A Boler Company, Technical Publication HN 402 Series, Subject: Service Instructions, Aug. 1996.
Hendrickson Truck Suspension Systems, A Boler Company, Technical Publication HN 402/462 Series, Subject: Service Instructions, Aug. 1998.
Hendrickson USA, L.L.C., Technical Procedure R/RS/RT Heavy Duty, Lit. No. 17730-149, Revision C, Jul. 2006.
Hendrickson, A Boler Company, Hendrickson Frame Hanger Selection Guide, May 1990.
Hendrickson, A Boler Company, Hendrickson RS Series, Single Axle Suspension, Sep. 1995.
Hendrickson, A Boler Company, HN Series Technical Sales Publication, Jun. 1997.
Hendrickson, A Boler Company, RS Series Rubber Load Cushion Suspensions, Mar. 1996.
Hendrickson, A Boler Company, RS Series Rubber Load Cushion Suspensions, Jul. 1996.
Hendrickson, A Boler Company, RS Series Rubber Load Cushion, Mar. 1998.
Hendrickson, Assembly Instructions Haulmaax Saddle Assembly, Subject: Service Kit No. 57974-048, Dec. 2008.
Hendrickson, Assembly Instructions Haulmaax, Subject: Outboard Frame Bracket for Paccar Vehicles Built after May 1, 2005 through Aug. 31, 2006, Oct. 2006.
Hendrickson USA, L.L.C., HUV, Lightweight Design, Premium Ride and Performance, Outstanding Durability, Nov. 2010.
Hendrickson, Assembly Instructions Haulmaax, Subject: Kit Nos. 64178-003 & 004, Feb. 2003.
Hendrickson, Assembly Instructions Haulmaax, Subject: Tie-bar Bolster Spring Kit Nos. 64179-037, Jun. 2006.
Hendrickson, Haulmaax Heavy Duty Suspension, Dec. 2003.
Hendrickson, Haulmaax Heavy Duty Suspension, Jan. 2007.
Hendrickson, Haulmaax Heavy Duty Suspension, Mar. 2005.
Hendrickson, Haulmaax Heavy Duty Suspension, Mar. 2008.
Hendrickson, Haulmaax Heavy Duty Suspension, Oct. 2001.
Hendrickson, HN Series VariRate Spring System, Nov. 2000.
Hendrickson, HN Series VariRate Spring System, Nov. 2005.
Hendrickson, Parts List Haulmaax, Dec. 2007.
Hendrickson, Parts List Haulmaax, Jul. 2003.
Hendrickson, Parts List Haulmaax, Jul. 2006.
Hendrickson, Parts List Haulmaax, May 2002.
Hendrickson, Parts List HN 402/462, Sep. 1997.
Hendrickson, Parts List HN Series, Dec. 2004.
Hendrickson, Parts List RS 400/460/480/520 Jan. 1998.
Hendrickson, Parts List RS Series, Apr. 2008.
Hendrickson, Parts List RS Series, Nov. 2004.
Hendrickson, RS Series Rubber Load Cushion, Feb. 2000.
Hendrickson, RS Series Rubber Load Cushion, Only Hendrickson makes choosing a heavy-duty suspension this easy, Jun. 1993.
Hendrickson, Technical Bulletin Haulmaax 460, Subject: Bolster Spring Assembly with Tie-bar, Jun. 2006.
Hendrickson, Technical Bulletin Haulmaax Series, Subject: Mandatory Shock Applications, Nov. 2004.
Hendrickson, Technical Bulletin Haulmaax, Subject: 54" Equalizing Beam Assembly, Oct. 2005.
Hendrickson, Technical Bulletin HN 402/462/522, Subject: Auxiliary Spring Shim Design, Oct. 2000.
Hendrickson, Technical Bulletin HN 402/462/522, Subject: Auxiliary Spring Shim Design, Dec. 2000.
International Searching Authority, International Search Report and Written Opinion for PCT/US2014/046954 mailed Oct. 29, 2014, 13 pages.

* cited by examiner

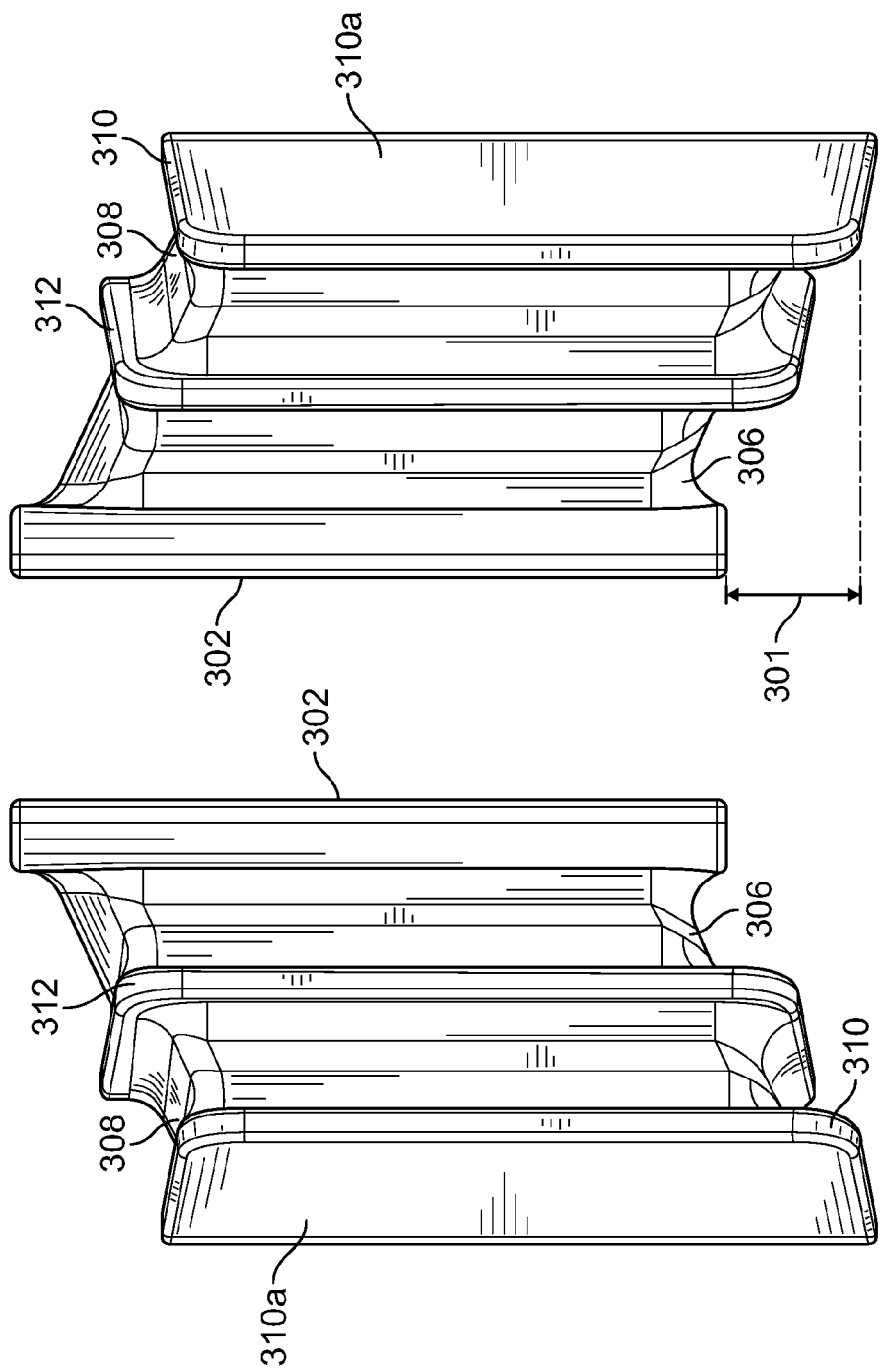

SHEAR SPRING USEFUL FOR VEHICLE SUSPENSION

RELATED APPLICATIONS

The present application is a continuation-in-part application of pending application Ser. No. 13/543,424 filed Jul. 6, 2012, which is a continuation-in-part of application Ser. No. 13/178,773 filed on Jul. 8, 2011, now U.S. Pat. No. 8,262,112, the contents of both applications are herein incorporated by reference in their entirety as if set forth herein.

BACKGROUND

The present invention generally relates to vehicle suspensions. More particularly, the present invention relates to vehicle suspensions having springs. Single spring rate suspensions and variable spring rate suspensions for use in vocational or heavy haul truck applications are known. Single spring rate suspensions have a fixed spring rate that generally must be set at a level that produces a suspension with either a comfortable ride or a stiff suspension exhibiting adequate roll stability. As a result, either roll stability or ride quality is compromised in single spring rate suspensions, depending upon the selected spring rate.

Variable spring rate suspensions overcome this deficiency of single spring rate suspensions by providing for multiple spring rates during operation. As the sprung load is increased, the spring rate is correspondingly increased. An example of a variable spring rate elastomeric spring suspension for use in vocational or heavy haul truck applications is shown in U.S. Pat. No. 6,585,286, the disclosure of which is hereby incorporated herein by reference. That suspension utilizes bolster springs and auxiliary springs to achieve its variable spring rate.

The assignee of the present invention disclosed a vehicle suspension having shear springs and a load cushion with a continuously increasing spring rate in U.S. application Ser. No. 12/876,158 which is entitled "Suspension Assembly With Tie-Plate" and was filed on Sep. 5, 2010, which is a continuation-in-part of U.S. patent application Ser. No. 12/545,828, now U.S. Pat. No. 8,052,166, which is entitled "Tie-plate and frame hanger of a suspension assembly" and was filed Aug. 22, 2009, which is a continuation-in-part of U.S. patent application Ser. No. 12/334,195, now U.S. Pat. No. 8,152,195, entitled "Modular Suspension System and Components Thereof" filed on Dec. 12, 2008, and a continuation-in-part of U.S. patent application Ser. No. 12/045,069, entitled "Elastomeric Spring Vehicle Suspension" filed on Mar. 10, 2008, now U.S. Pat. No. 7,926,836, each of which is assigned to Hendrickson USA, L.L.C. This application incorporates U.S. patent application Ser. Nos. 12/545,828, 12/334, 195, and 12/876,158, and U.S. Pat. Nos. 7,926,836, 8,052, 166, and 8,152,195 herein by reference. The present application includes improvements and advancements over the vehicle suspensions disclosed in the applications noted above.

SUMMARY

In one aspect a suspension is provided for supporting a longitudinally extending vehicle frame rail above an axle, the suspension having a first frame attachment portion adapted for connection to a vehicle frame rail, a first spring module attached to the first frame attachment portion, said first spring module having an opening, a first spring mount positioned within the opening of the first spring module, a first shear spring positioned between a first side wall of the first spring mount and a first side wall of the opening of the first spring module, a second shear spring positioned between a second side wall of the first spring mount and a second side wall of the opening of the first spring module, said first spring mount comprising an inboard part and an outboard part separate from the inboard part, a first through-hole positioned in at least one of the inboard or outboard parts of the first spring mount adapted to allow passage of a first connecting rod therethrough, wherein the first connecting rod connects the inboard part of the first spring mount together with the outboard part of the first spring mount, and wherein the first shear spring has a V-shaped outer surface, where the first shear spring is compressed between the first side wall of the first spring mount and the first side wall of the opening of the first spring module, and wherein the second shear spring has a V-shaped outer surface, where the second shear spring is compressed between the second side wall of the first spring mount and the second side wall of the opening of the first spring module.

In another aspect a suspension is provided where the first shear spring is comprised of a base plate having a flat upper surface and an upper plate having a V-shaped upper surface opposite the base adapted to mate with a corresponding V-shaped surface positioned on a first side wall of the first spring mount, wherein the upper plate has a flat lower surface parallel to the flat upper surface of the base plate, and wherein the second shear spring is comprised of a base plate having a flat upper surface and an upper plate having a V-shaped upper surface opposite the base adapted to mate with a corresponding V-shaped surface positioned on a second side wall of the first spring mount, wherein the upper plate has a flat lower surface parallel to the flat upper surface of the base plate.

In another aspect, a shear spring is provided having a base plate having a flat upper surface, and an upper plate having a V-shaped upper surface opposite the base plate adapted to mate with a corresponding V-shaped surface positioned on a side wall of a spring mount, the upper plate having a flat lower surface parallel to the flat upper surface of the base, and an elastomeric material positioned between the flat upper surface of the base plate and the flat lower surface of the upper plate.

The shear spring may also be configured where the upper plate has an apex that is located at a centerline drawn perpendicularly through a center of the upper plate and the base plate, and the shear spring may also be configured to have an intermediate plate having a flat upper surface and a flat lower surface that are parallel to the lower surface of the upper plate and to the upper surface of the base plate, where the compression and shear strain in each of the elastomer sections is equalized across an entire cross-section thereof.

BRIEF DESCRIPTION OF THE DRAWINGS

Exemplary embodiments of the invention are described herein with reference to the drawings, wherein like parts are designated by like reference numerals, and wherein:

FIG. 10 is an elevation view of the shear spring in FIG. 9;

FIG. 11 is another elevation view of shear spring shown in FIGS. 9 and 10;

DETAILED DESCRIPTION OF THE INVENTION

Figure 1:
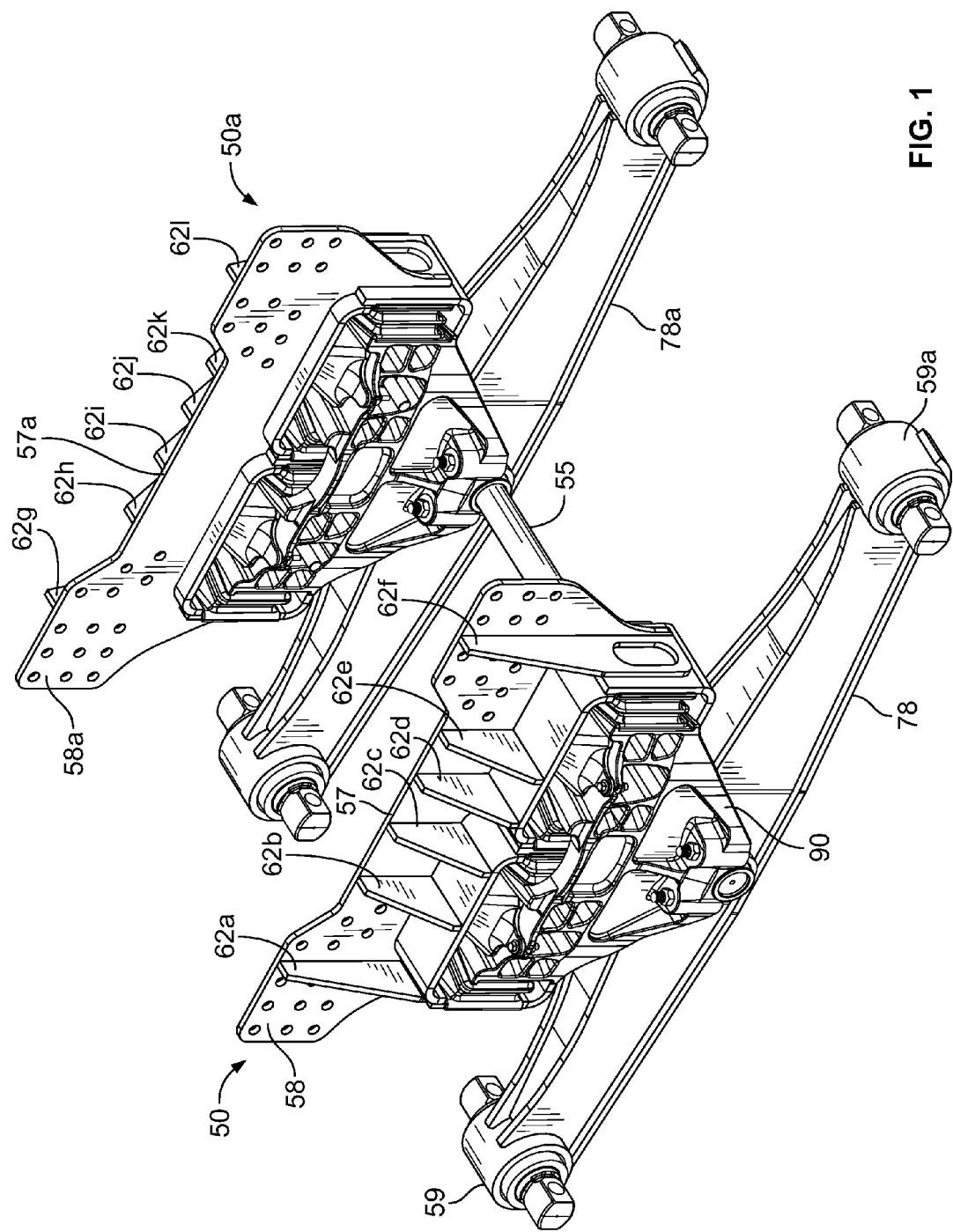
FIG. 1 is a perspective view of a vehicle suspension 50.

FIG. 1 is a perspective view of a vehicle suspension 50 having a frame attachment portion 58 that is adapted for attachment to a vehicle frame or frame rail. Vehicle suspension 50 is shown attached to a walking beam 78 positioned beneath the vehicle suspension 50. Also disclosed is a second vehicle suspension 50a having a frame attachment portion 58a that is adapted for attachment to a vehicle frame or frame rail on a side of the vehicle opposite the side to which vehicle suspension 50 is attachable to a vehicle frame or frame rail. Vehicle suspension 50a is shown attached to a walking beam 78a positioned beneath the vehicle suspension 50a. A cross tube 55 is attachable to vehicle suspensions 50 and 50a.

Vehicle suspension 50 is designed to support longitudinally extending vehicle frame rails (not shown) which can be of various types that are positioned above laterally extending vehicle axles. As will be appreciated by those skilled in the art, components of vehicle suspension 50 and the other suspensions described herein are duplicated on each side of the vehicle as shown in FIG. 1. It will also be appreciated that vehicle wheels may be mounted to the ends of the vehicle axles in a known manner. Further, it will be appreciated that the vehicle frame rails may be connected by one or more vehicle frame cross members.

Those skilled in the art will further understand that a suspension, arranged in accordance with the suspension 50 and the components thereof, alternatively may be attached to frame rails of a trailer (for example, a trailer that connects to a semi-tractor). The frame rails of a trailer may comprise frame rails such as those described above or another type of frame rail.

For purposes of this description, unless specifically described otherwise, hereinafter, "vehicle" refers to a vehicle or a trailer. In this way, for example, a vehicle frame refers to a vehicle frame or a trailer frame. Furthermore, for purposes of this description, the left side of a vehicle refers to a side of the vehicle on an observer's left-hand side when the observer faces the back of the vehicle, and the right side of the vehicle refers to a side of the vehicle on an observer's right-hand side when the observer faces the back of the vehicle. Furthermore still, for purposes of this description, "outboard" refers to a position further away from a center line, running from the front to the back of a vehicle, relative to "inboard" which refers to a position closer to that same center line.

Top edges 57 and 57a of frame attachments portions 58 and 58a, respectively, have a center portion that does not extend as far as the end portions of top edges 57 and 57a on both sides of the center portions. As an example, those center portions may be arranged in such configurations so as to allow frame attachment portions 58 and 58a to be attached to frame rails that have features that would interfere with the attachment of frame attachment portions having center portions that extend to the same level as the end portions.

FIG. 1 identifies walking beam ends 59 and 59a. In accordance with a first embodiment, frame attachment portion 58 may be attached to a frame rail on the left side of a vehicle and the frame attachment portion 58a may be attached to a frame rail on the right side of the vehicle such that the front end of the vehicle is closer to walking beam end 59 than it is to walking beam end 59a. In accordance with a second embodiment, frame attachment portion 58 may be attached to a frame rail on the right side of the vehicle and the frame attachment portion 58a may be attached to a frame rail on the left side of the vehicle, such that the front end of the vehicle is closer to walking beam end 59a than it is to walking beam end 59.

Figure 2:
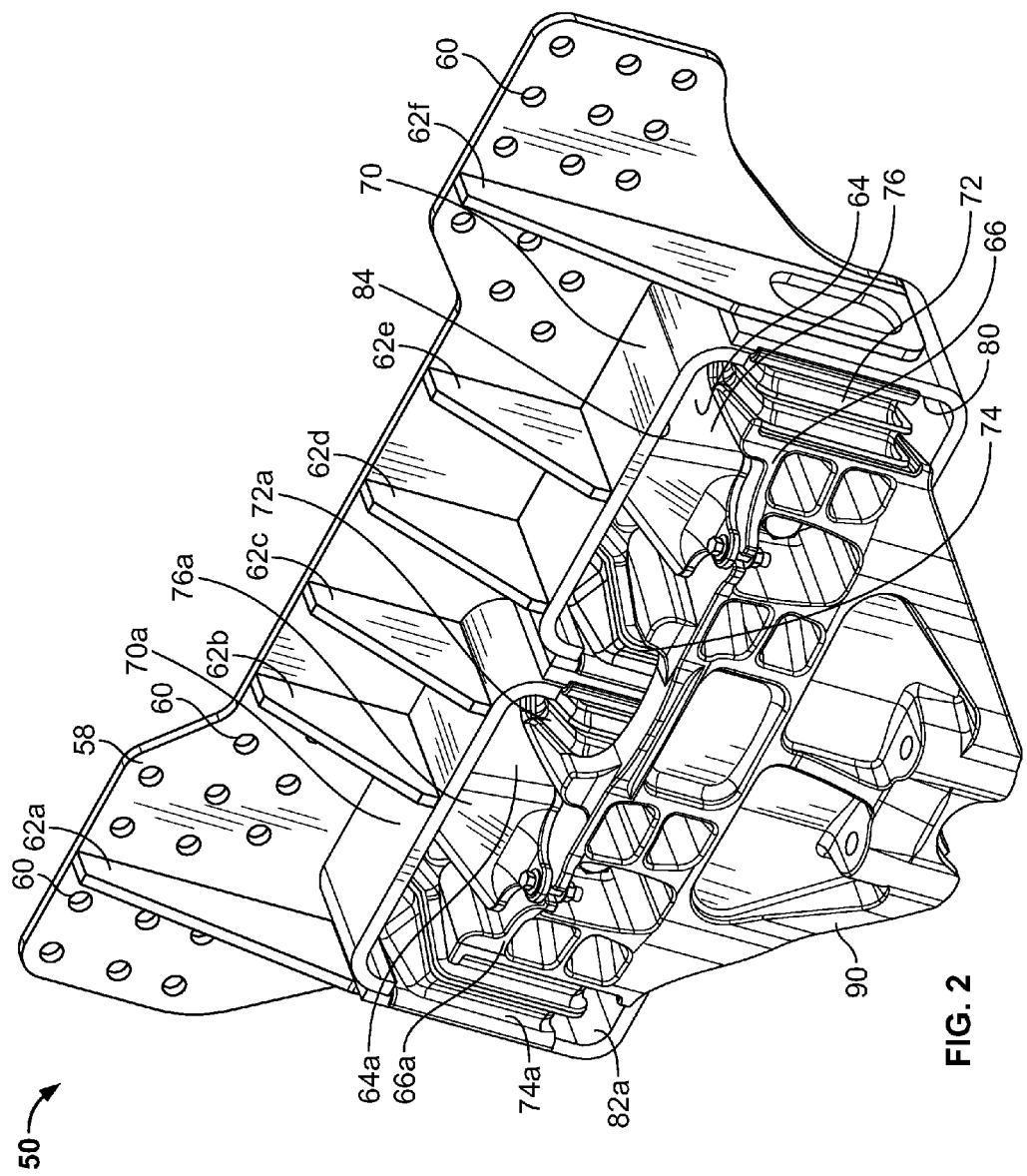
FIG. 2 is a perspective view of vehicle suspension 50 shown in FIG. 1.

FIG. 2 is a perspective view of vehicle suspension 50 (the same suspension shown in FIG. 1). Frame rail attachment holes 60 of frame attachment portion 58 are adapted for attaching frame attachment portion 58 to a vehicle frame or frame rail (not shown) using, for example, connecting rods, such as mounting bolts. Vehicle suspension 50 includes gussets 62a-f extending perpendicularly from the frame rail attachment portion 58 to provide additional support and rigidity to vehicle suspension 50.

A spring module 70 is attached to frame rail attachment portion 58. Spring module 70 includes an opening 64. Positioned within opening 64 are (i) at least a part of a spring mount 66, (ii) at least a part of a first shear spring 72 positioned between a first side wall of the spring mount 66 and a side wall 80 of spring module 70, (iii) at least a part of a second shear spring 74 positioned between a second side wall of the spring mount 66 and a second side wall of spring module 70, and (iv) at least a part of a load cushion 76 positioned on top of spring mount 66 and beneath the top wall 84 of spring module 70.

Similarly, but adjacent to spring module 70, a spring module 70a is attached to frame rail attachment portion 58. Spring module 70a includes an opening 64a. Positioned within opening 64a are (i) at least a part of a spring mount 66a, (ii) at least a part of a shear spring 72a positioned between a first side wall of the spring mount 66a and a side wall 80a (see FIG. 4) of spring module 70a, (iii) at least a part of a shear spring 74a positioned between a second side wall of the spring mount 66a and a side wall 82a of spring module 70, and (iv) at least a part of a load cushion 76a positioned on top of spring mount 66a and beneath the top wall 84a (see FIG. 3) of spring module 70a. As used herein, where it is stated that a component is positioned within the opening, that encompasses situations where the component is not entirely positioned within the opening. Thus, components partially, but not entirely, positioned within the opening are still positioned within the opening within the meaning of this specification.

Figure 3:
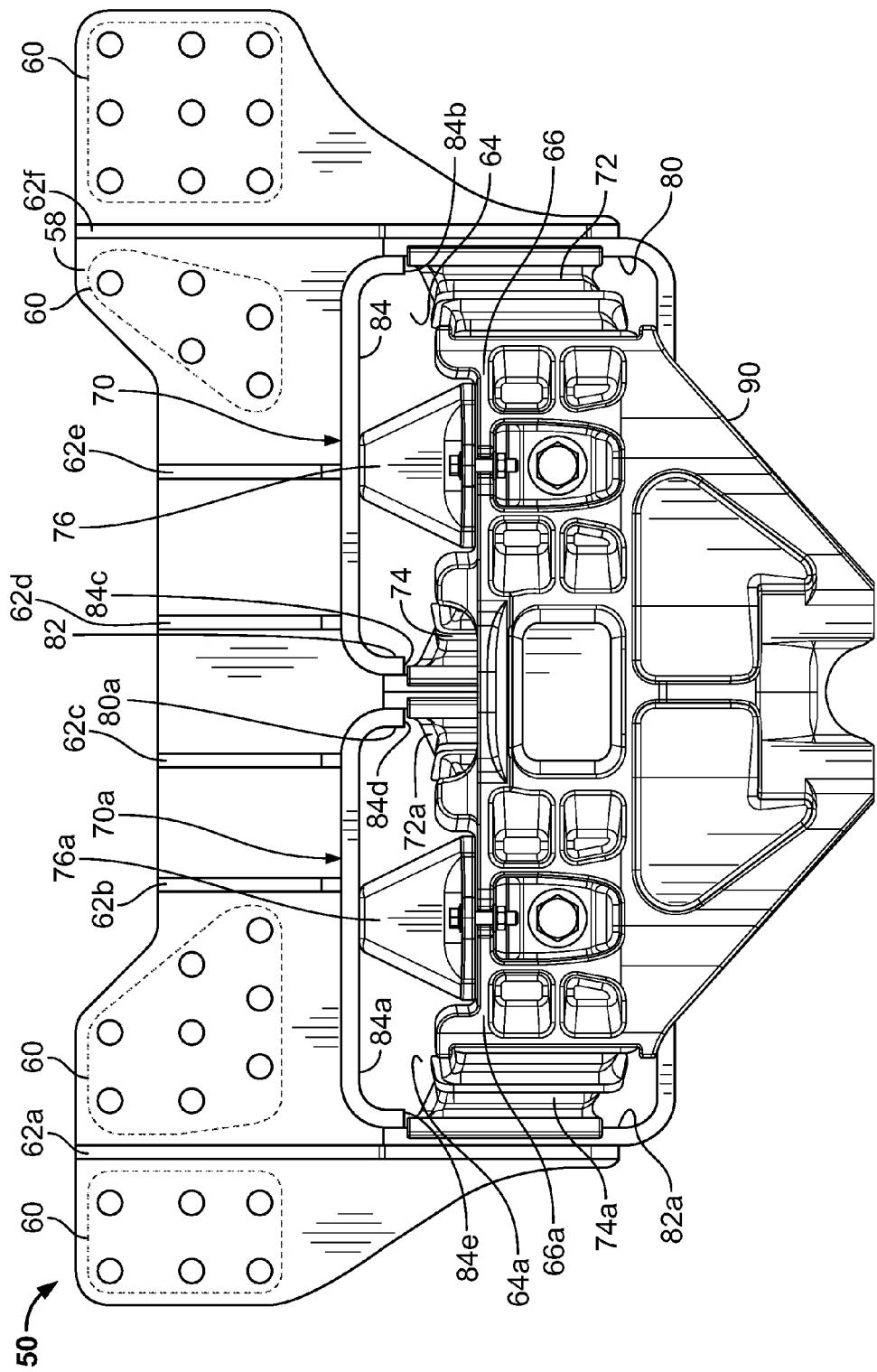
FIG. 3 is an elevation view of the vehicle suspension 50 shown in FIGS. 1 and 2.

FIG. 3 shows an elevation view of vehicle suspension 50 (i.e., the same suspension shown in FIGS. 1 and 2). Spring module 70 is shown attached to frame rail attachment portion 58. Spring module 70 includes an opening 64. Positioned within at least a portion of opening 64 are (i) a spring mount 66, (ii) a shear spring 72 positioned between a first side wall of spring mount 66 and a first side wall 80 of opening 64, (iii) a shear spring 74 positioned between a second side wall of spring mount 66 and a side wall of 82 of opening 64, and (iv) a load cushion 76 positioned on top of spring mount 66 and beneath a top wall 84 of opening 64.

A second spring module 70a is positioned adjacent spring module 70 and is also attached to frame rail attachment portion 58. Spring module 70a includes an opening 64a. Positioned within at least a portion of opening 64a are (i) a spring mount 66a, (ii) a third shear spring 72a positioned between a first side wall of spring mount 66a and a side wall 80a of opening 64a, (iii) a fourth shear spring 74a positioned between a second side wall of the spring mount 66a and a second side wall 82a of opening 64a, and (iv) a load cushion 76a positioned on top of spring mount 66a and beneath a top wall 84a of opening 64a.

Figure 4:
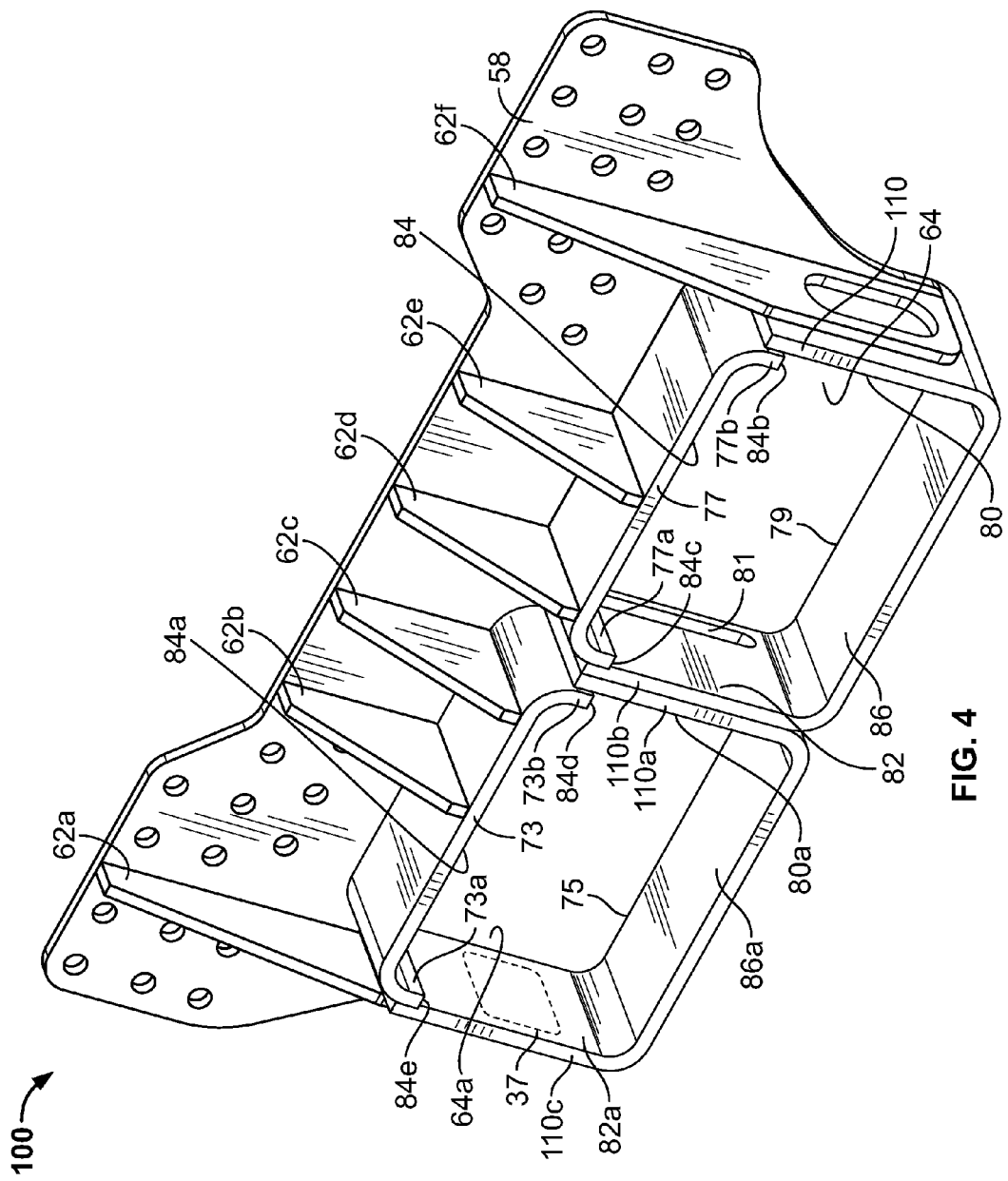
FIG. 4 is a perspective view of a frame hanger component of vehicle suspension 50 shown in FIGS. 1-3.
Figure 5:
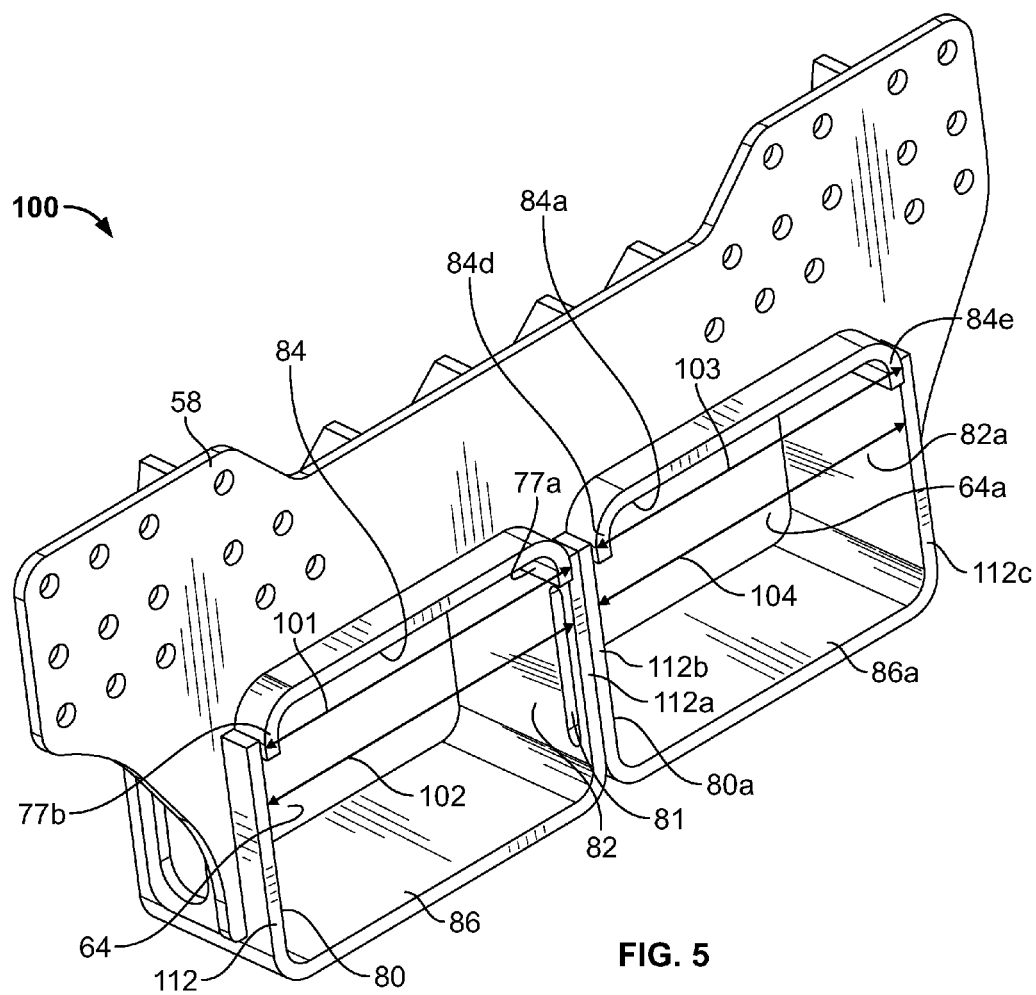
FIG. 5 is another perspective view of the frame hanger component of FIG. 4.

FIGS. 4 and 5 are perspective views of a frame hanger portion (or more simply, a "frame hanger") 100 that is a component of vehicle suspension 50 shown in FIGS. 1-3. Frame hanger 100 comprises frame attachment portion 58, gussets 62a-f, upper U-plates 73 and 77, and lower U-plates 75 and 79. Each of U-plates 73, 75, 77, and 79 can consist of a single plate formed from a single flat plate, or alternatively, can be fabricated from multiple flat plates. Alternately, the U-plates can be cast. Further, the entire opening 64 of spring module 70, or portions thereof, could be cast as well.

Upper U-plate 77 and lower U-plate 79 define opening 64 of spring module 70. Upper U-plate 77 includes flanges 77a and 77b and top wall 84. U-plate 79 includes side walls 80 and 82 and bottom wall 86. Preferably, a distance 101 (shown in FIG. 5) between the outer edges of flanges 77a and 77b is equal to or slightly less than a distance 102 (shown in FIG. 5) between walls 80 and 82 such that upper U-plate 77 fits between walls 80 and 82 and flanges 77a and 77b are operable as shear spring stops 84b and 84c for shear springs 72 and 74, respectively.

Similarly, upper U-plate 73 and lower U-plate 75 define opening 64a of spring module 70a. Upper U-plate 73 includes flanges 73a and 73b and top wall 84a. U-plate 75 includes side walls 80a and 82a and bottom wall 86a. Preferably, a distance 103 (shown in FIG. 5) between the outer edges of flanges 73a and 73b is equal to or slightly less than a distance 104 (shown in FIG. 5) between walls 80a and 82a such that upper U-plate 73 fits between walls 80a and 82a and flanges 73a and 73b are operable as shear spring stops 84e and 84d for shear springs 72a and 74a, respectively. Preferably, distance 101 equals distance 103, and distance 102 equals distance 104. FIG. 4 illustrates side edges 110, 110a, 110b, and 110c of side walls 80, 82, 80a, and 82a, respectively, and FIG. 5 illustrates side edges 112, 112a, 112b, and 112c of side walls 80, 82, 80a, and 82a, respectively.

It should be noted the top wall 84 of the U-plate 77 and/or the top wall 84a of U-plate 73 may include a dome-like configuration to control bulging of a progressive spring rate load cushion during loaded conditions thereby increasing the useful life of the load cushion. The load cushion may be an elastomeric progressive spring rate load cushion shaped to resemble a pyramid, and having a flattened top surface (see FIG. 14 described below). The top of the load cushion nests within the dome-like configuration during loading. The dome-like configuration may be formed in top wall 84 or 84a by a stamping or punching operation where the top wall of the plate is plastically deformed. Alternately, a dome could be cast or forged into the top wall of the opening. In addition, a domed insert (e.g., a cast or forged dome insert) could be attached (e.g., by welding or bolting) to the top wall to provide a top wall with a dome-like configuration.

Lower U-plate 79 includes a weld-slot 81 through which a weld bead (not shown) for welding lower U-plate 79 to lower U-plate 75 can reside without extending outside of weld-slot 81. In accordance with an example embodiment, the weld bead within weld-slot 81 may be the only weld bead within opening 64, such that opening 64 includes no weld beads that can act as ramps upon which shear springs 72 or 74 can ride on to avoid shear spring stops 84b or 84c, respectively.

Similarly, U-plate 75 includes a weld-slot (not shown) through which a weld bead (not shown) for welding lower U-plate 75 to lower U-plate 79 can reside without extending outside of the weld-slot within U-plate 75. In accordance with an example embodiment, the weld bead within the weld-slot within U-plate 75 may be the only weld bead within opening 64a, such that opening 64a includes no weld beads that can act as ramps upon which shear springs 72a or 74a can ride on to avoid shear spring stops 84d or 84e, respectively. Preferably, the weld-slot within U-plate 75 has the same shape and orientation as weld-slot 81 and is located closer to edge 110a of wall 86a than to edge 112b of wall 86a.

FIG. 4 further illustrates a pocket 37 positioned on side wall 82a. Pocket 37 is shown in dashed lines because pocket 37 is not required for use with shears springs configured as shear springs 72, 72a, 74, 74a, and 300. Rather pocket 37 might be used with shear springs having a flat base plate without outwardly extending flanges (described below). In accordance with embodiments in which pockets are used to retain shear springs, such pockets are typically located on the opposing side walls of the spring module. Details regarding pockets are shown and described in U.S. Pat. No. 7,926,836.

It should be noted that while the above embodiments are shown constructed using U-shaped plates, U-shaped plates are not required. In fact, the top wall, bottom wall, and first and second side walls that define the opening could each be separate plates, or otherwise constructed without using U-shaped plates, although using U-shaped plates to define the opening is preferred in the above embodiments.

Figure 6:
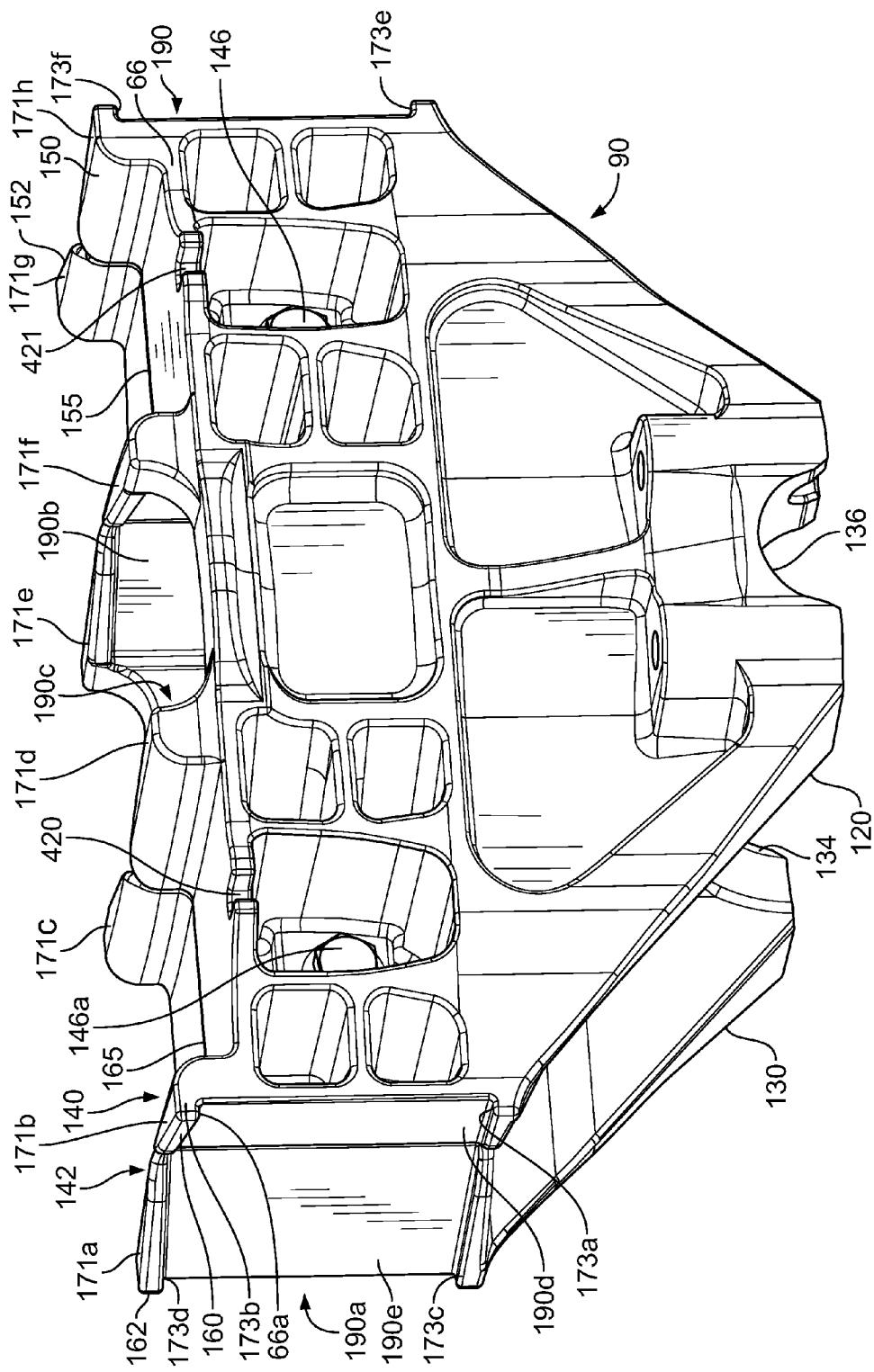
FIG. 6 is a perspective view of a saddle assembly shown in FIGS. 1-3.
Figure 7:
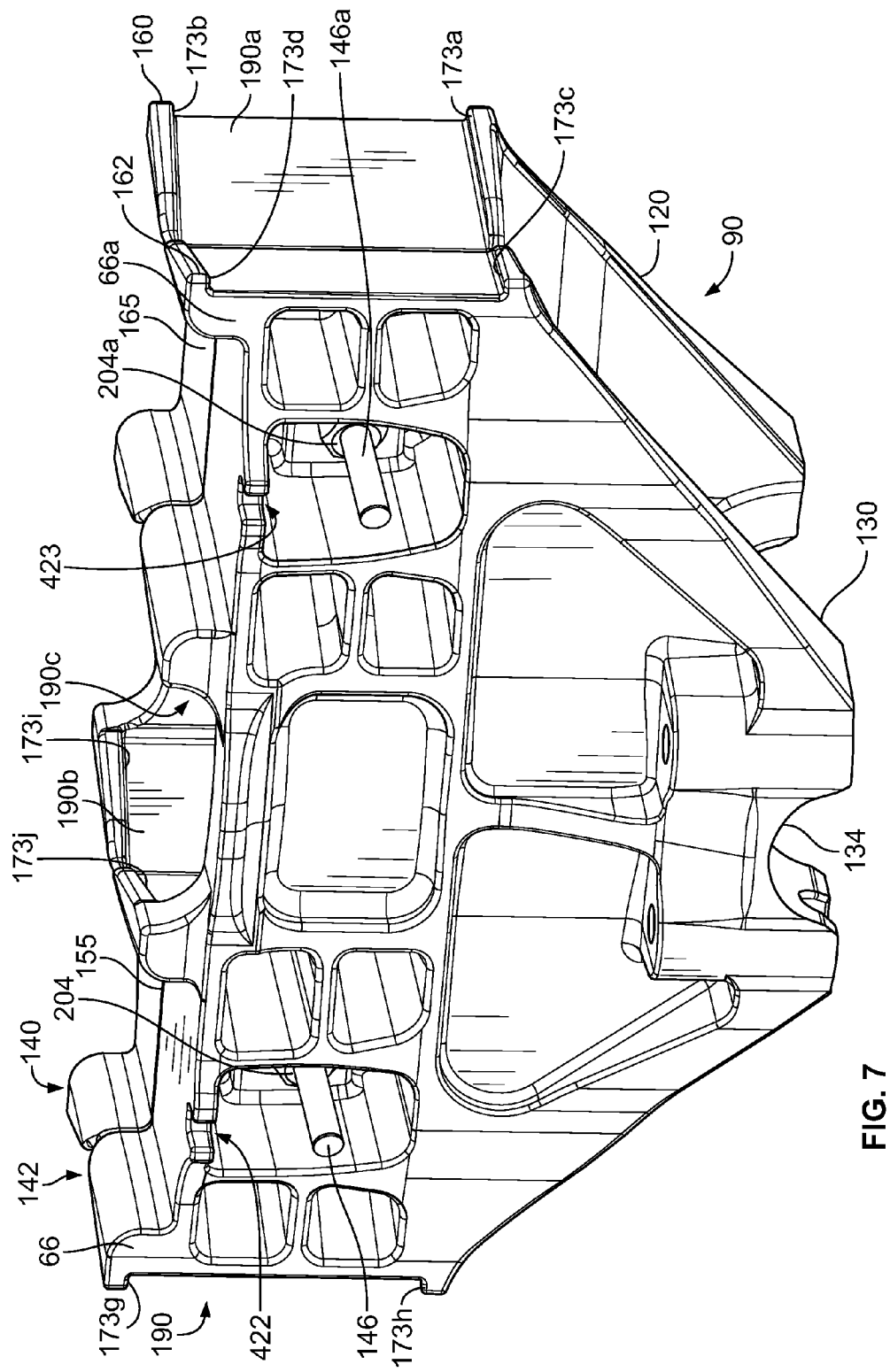
FIG. 7 is another perspective view of the saddle assembly shown in FIG. 6.
Figure 8:
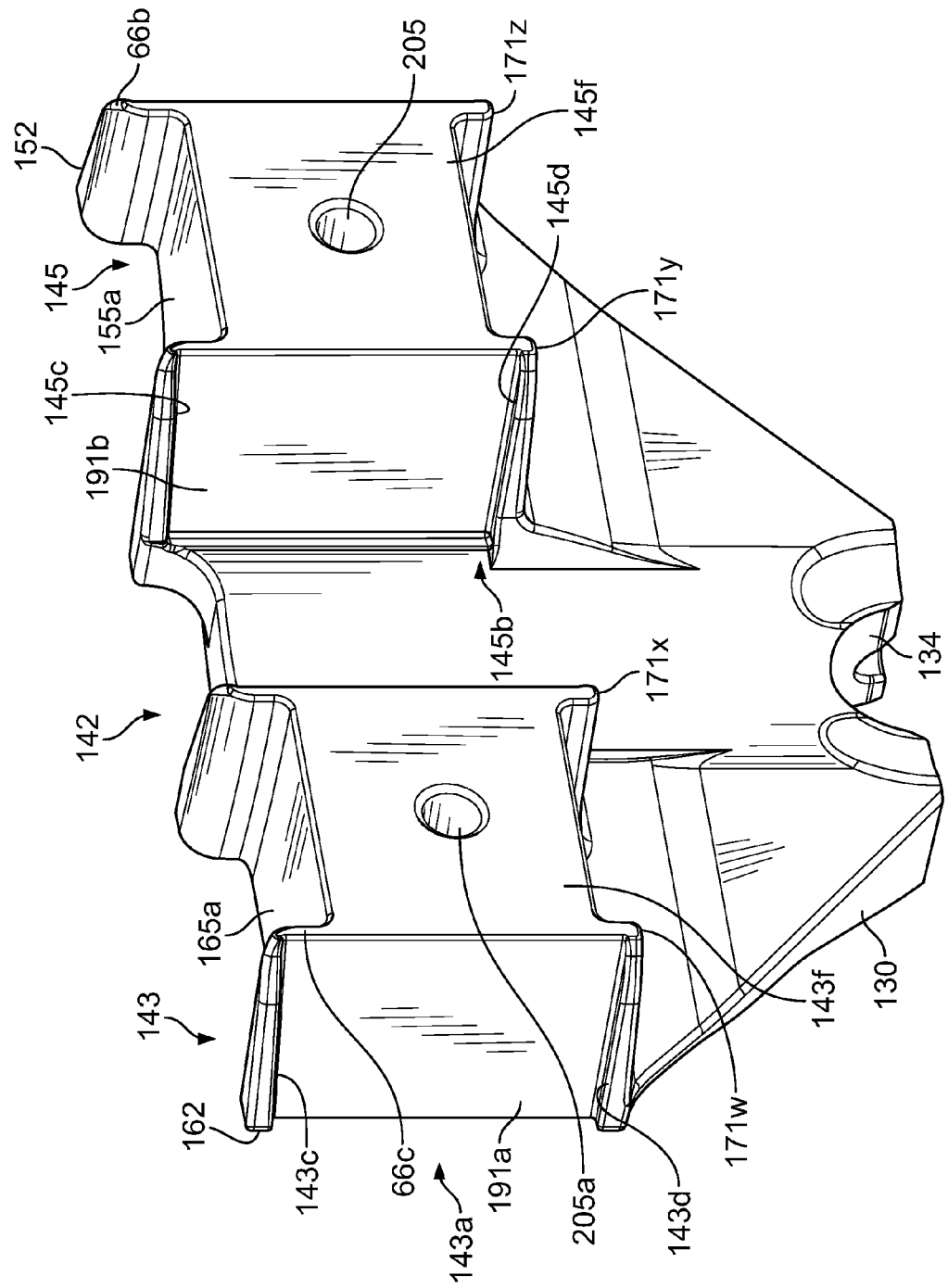
FIG. 8 is a perspective view of a portion of the saddle assembly shown in FIGS. 6 and 7.
Figure 8A:
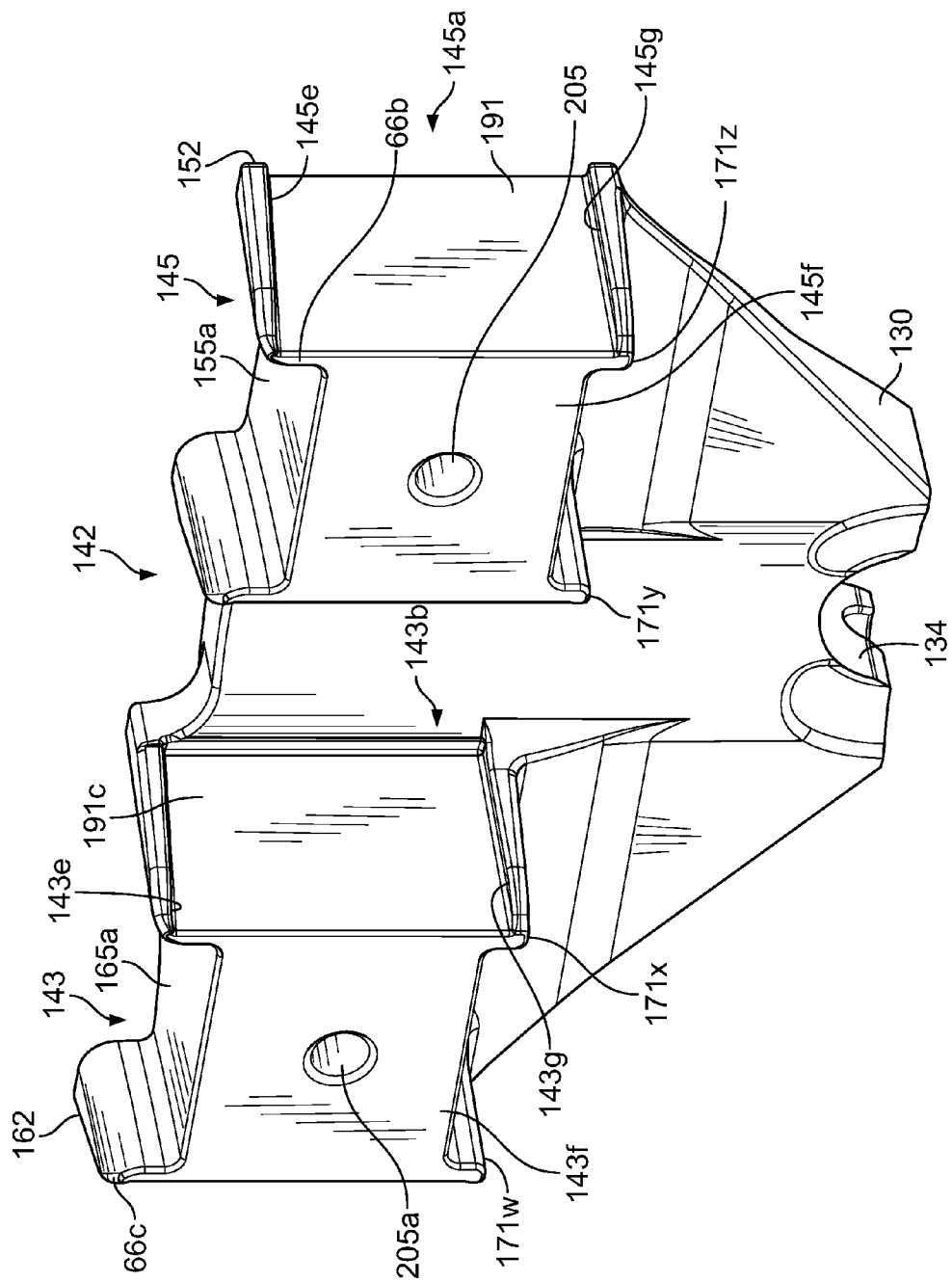
FIG. 8A is another perspective view of the portion of the saddle assembly shown in FIGS. 6 and 7.

FIGS. 6 and 7 are perspective views of a saddle assembly 90 that is shown in FIGS. 1-3 and that comprises an outboard saddle 120 and an inboard saddle 130. FIGS. 8 and 8A are perspective views of outboard saddle 120. In accordance with the embodiments described herein, inboard saddle 130 may be identical to outboard saddle 120. Alternatively, inboard saddle 130 may be identical to outboard saddle 130 except that the mounting holes (e.g., mounting holes 205, 205a) into which connecting rods 146 and 146a are installed in one of those saddles may be tapped holes and the mounting holes in the other saddle may be untapped holes.

Saddles 120, 130 each include upper and bottom portions. Each upper portion of saddles 120, 130 includes two spring mount portions. Each of the two spring mount portions of saddle 120 interface to corresponding spring mount portions of saddle 130 to form respective spring mounts 66 and 66a. The bottom portion of outboard saddle 120 includes a bottom mount section 136, and the bottom portion of inboard saddle 130 includes a bottom mount section 134. Those bottom mount sections may be conical, spherical, or wedge shaped, and may form a mechanical joint when attached to a walking beam as is known in the art. Furthermore, the bottom portions of outboard saddle 120 and inboard saddle 130 may be similar to the bottom portions of saddles disclosed in U.S. Pat. No. 7,926,836.

As shown in one or more FIGS. 6, 7, 8, and 8A, the upper portion of outboard saddle 120 is identified as upper portion 140, and the upper portion of inboard saddle 130 is identified as upper portion 142. As shown in FIG. 8 and/or FIG. 8A, upper portion 142 includes a spring mount portion 143 and a spring mount portion 145. Spring mount portion 143 includes spring mount side portions 143a and 143b and spring mount portion interface 143f. Similarly, spring mount portion 145 includes spring mount side portions 145a and 145b and spring mount portion interface 145f. Each spring mount side portion of upper portions 140 and 142 includes a pair of flanges and a tapered surface.

As shown in FIG. 8, spring mount side portion 143a includes flanges 143c and 143d and tapered surface 191a, and spring mount side portion 145b includes flanges 145c and 145d and tapered surface 191b. As shown in FIG. 8A, spring mount side portion 143b includes flanges 143e and 143g and tapered surface 191c, and spring mount side portion 145a includes flanges 145e and 145g and tapered surface 191. Each flange on the spring mount side portions include a surface that is operable as a positive-stop to restrict a shear spring from moving beyond the positive-stop as the shear spring is moving in a direction towards the positive-stops. Examples of the shear spring positive-stops on the spring mount side portions shown in FIGS. 6 and 7 includes flange surfaces 173a, 173b, 173c, 173d, 173e, 173f, 173g, 173h, 173i, and 173j.

Upper portions 140, 142 of saddles 120, 130 include a number of significant advantages over the saddles and saddle assemblies shown in U.S. Pat. No. 7,926,836. As one example, the upper portions 140, 142 of saddles 120, 130 are designed to be drawn together (e.g., drawn in contact with each other) by connecting rods 146 and 146a. In that way, spring mount portion interface 143f is drawn into contact with a corresponding spring mount portion interface on upper portion 140 and spring mount portion interface 145f is drawn into contact with another corresponding spring mount portion interface on upper portion 140.

In accordance with this design, the upper portions 140, 142 may serve as spring mounts. In particular, the upper portions 140, 142 include first ends 150, 152 thereof that together form first load cushion mounting surface 155 on first spring mount 66 that is adapted to have a first load cushion mounted thereon. Similarly, upper portions 140, 142 also include second ends 160, 162 thereof that together form second load cushion mounting surface 165 on second spring mount 66a that is adapted to have a second load cushion mounted thereon. Of course, while two load cushion mounting surfaces are shown, only one, or perhaps three or more load cushion mounting surfaces could be provided on the upper portions 140, 142. Thus, spring mounts 66 and 66a are integrally attached to the saddle, unlike the saddle shown in U.S. Pat. No. 7,926,836. Indeed, spring mounts 66 and 66a are preferably integrally formed with the saddles 120 and 130, as shown in FIG. 6. With this design, the need for separate spring mounts is eliminated. Of course, spring mounts integral with the saddle are not required and spring mounts that are separate from the saddle may be used for particular applications, as shown for example in FIG. 27.

As mentioned above, the upper portions 140, 142 of the outboard saddle 120 and inboard 130 are connected together. As discussed in greater detail below, a threaded connecting rod may be a bolt, screw, or other suitable fastener and may be used to connect the saddles together. As illustrated in FIG. 6, one end of connecting rods 146 and 146a can be seen indicating where the connection of the saddles may be accomplished.

FIG. 7 further illustrates the threaded shank portions of connecting rods 146 and 146a. The threaded portion of the connecting rod 146 can be seen extending through the saddles 120, 130 and with nut 204 attached to the threaded portion so as to connect the saddles together. Similarly, the threaded portion of the connecting rod 146a can be seen extending through the saddles 120, 130 and with nut 204a attached to the threaded portion so as to connect the saddles together.

Depending on the application, the disclosed vehicle suspensions may not utilize load cushions on the top surface of the spring mounts, and thus the load cushion mounting surfaces 155 and 165 may not be necessary. However, even in the absence of load cushion mounting surfaces, with the design of the saddle assembly shown in FIGS. 6 and 7, the upper portions 140, 142 may still serve as a spring mount. In particular, the upper portions 140, 142 include first ends 150, 152 thereof that together form a first V-shaped side wall 190 of spring mount 66, that is adapted to contact and compress a first shear spring having a corresponding V-shaped surface (not shown, but see below).

Similarly, upper portions 140, 142 also include second ends 160, 162 thereof that together form a second V-shaped side wall 190a of the spring mount 66a, that is adapted to contact and compress a second shear spring having a corresponding V-shaped top surface (also not shown, but see below). While V-shaped side walls 190 and 190a are disclosed, the saddles could be designed such that only ends 150 and 152 or ends 160 and 162 include a V-shaped side wall. Again, with the design shown in FIG. 6, the need for a separate spring mount to contact a shear spring is eliminated.

As described above, there are two openings (64 and 64a) in vehicle suspension 50. The saddle assembly 90 also includes a third V-shaped wall 190b positioned between side walls 190 and 190a, as well as a fourth V-shaped wall 190c opposite from V-shaped wall 190b and between side walls 190 and 190a. V-shaped walls 190b and 190c, along with side walls 82 and 80A, respectively, are also adapted to contact and compress additional shear springs having corresponding V-shaped surfaces (not shown, but see below).

Furthermore, upper portion 142 of inboard saddle 130 includes positive-stops 171a, 171c, 171e, and 171g. Similarly, upper portion 140 of outboard saddle 120 includes positive-stops 171b, 171d, 171f, and 171h. Each of the foregoing positive-stops extends upward above load cushion mounting surfaces 155, 165, and is operable to prevent vehicle suspension 50 from having a longer than desired stroke. Those positive-stops are most-likely put into use when load cushions are not mounted to saddle assembly 90 or if the load cushion(s) mounted to saddle assembly 90 are compressed to a level below the upper surfaces of the positive-stops. During such use, the positive-stops can contact top walls 84 and 84a so as to limit the stroke of vehicle suspension 50. Furthermore still, as shown in FIG. 8 and/or FIG. 8A, upper portion 142 of inboard saddle 130 includes positive-stops 171w, 171x, 171y, and 171z. Each of the foregoing positive-stops, as well as similarly positioned positive-stops on upper portion 140 of outboard saddle 120, is operable to prevent vehicle suspension 50 from having a longer than desired stroke. The positive-stops 171w, 171x, 171y, and 171z are most-likely put into use during a rebound motion of vehicle suspension 50. During such use, the positive-stops can contact bottom walls 86 and 86a so as to limit the stroke of vehicle suspension 50. FIG. 8 and/or FIG. 8A further illustrates surface 155a which provides one half of load cushion mounting surface 155 shown in FIGS. 6 and 7, and surface 165a which provides one half of load cushion mounting surface 165 shown in FIGS. 6 and 7. Thus, surface 155a is part of an inboard part 66b of first spring mount 66 shown in FIGS. 6 and 7, and surface 165a is part of inboard part 66c of second spring mount 66a shown in FIGS. 6 and 7.

FIG. 8 also illustrates tapered surface 191a that forms one half of V-shaped wall 190a at end 162 of saddle assembly 90, and tapered surface 191b that forms one half of V-shaped wall 190b shown in FIGS. 6 and 7. Further, through-hole 205 is shown in inboard part 66b of first spring mount 66 which comprises half of spring mount 66, and through-hole 205a is shown in inboard part 66c of second spring mount 66a which comprises half of second spring mount 66a. As can be seen from FIGS. 7 and 8, connecting rod 146 extends through through-hole 205 and connecting rod 146a extends through through-hole 205a.

FIG. 8A also illustrates tapered surface 191 that forms one half of V-shaped wall 190 at end 152 of saddle assembly 90, and tapered surface 191c that forms one half of V-shaped wall 190c shown in FIGS. 6 and 7.

The frame hanger 100 of vehicle suspension 50 shown in FIGS. 4 and 5 may comprise cast or fabricated metal or composite material, including iron, steel, or aluminum. As shown in FIG. 4, frame hanger 100 is fabricated with gussets 62a-f, and sheet steel may be used to make frame attachment portion 58. Frame hanger 100 could also be cast with any suitable castable material. Similarly, the saddles may comprise cast or fabricated metal or composite material. Depending on the application, the metal may, for example, be nodular ductile iron (or more simply, ductile iron), steel, such as a high strength low alloy steel, or aluminum. Typically, high strength low alloy steels are a preferred material to use for the frame hanger and the saddle, although aluminum is often desired when weight considerations are of greater importance.

Figure 9:
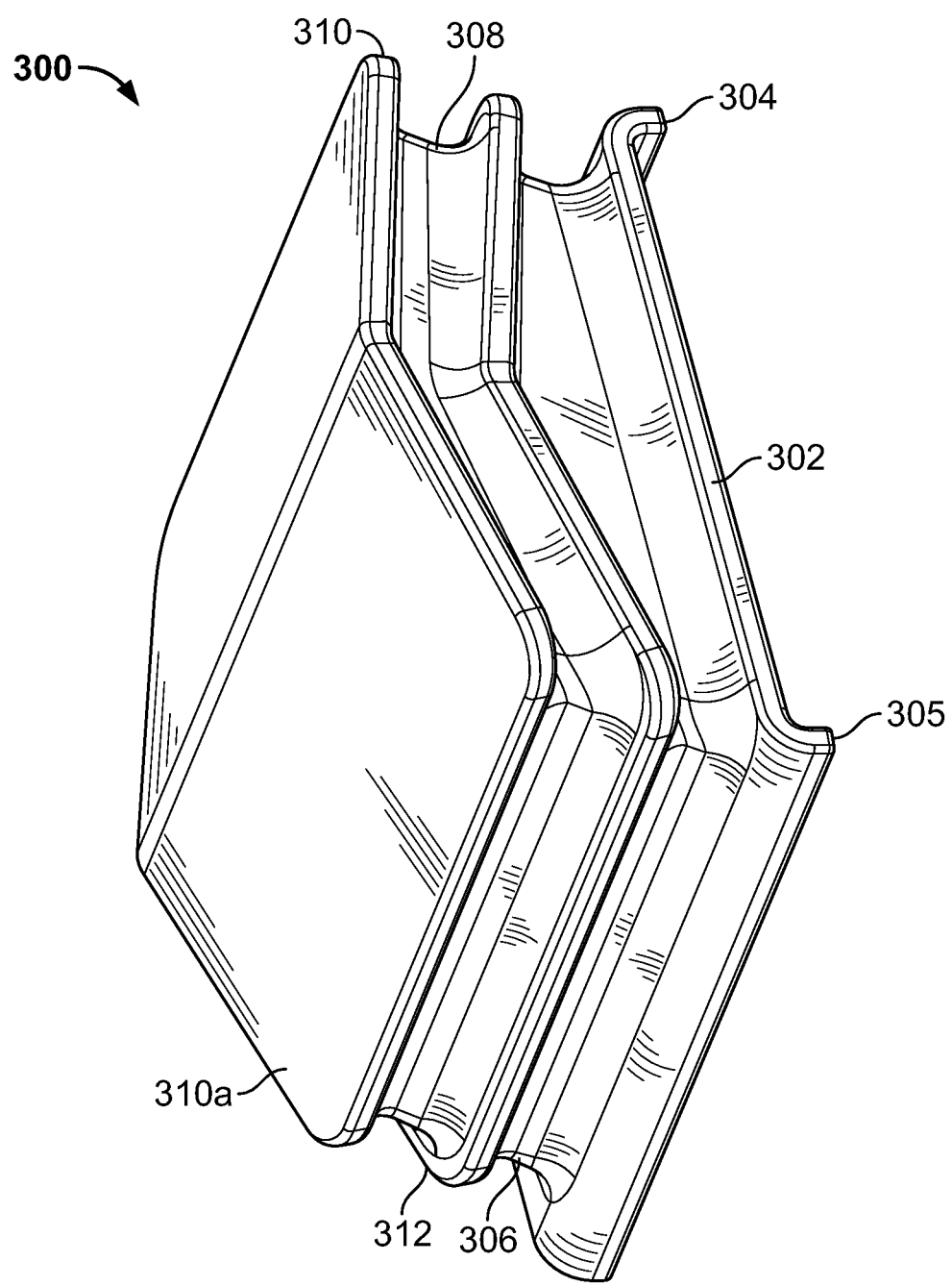
FIG. 9 is a perspective view of a shear spring used in the vehicle suspension shown in FIGS. 1-3.
Figure 12:
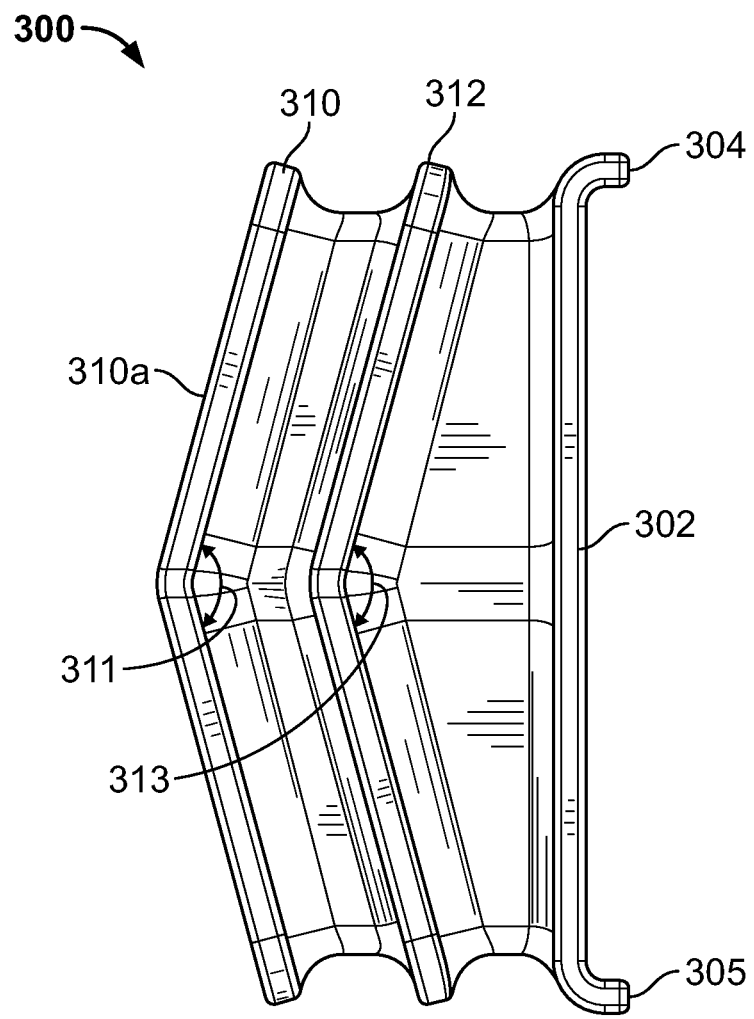
FIG. 12 is a plan view of the shear spring shown in FIG. 9.
Figure 13:
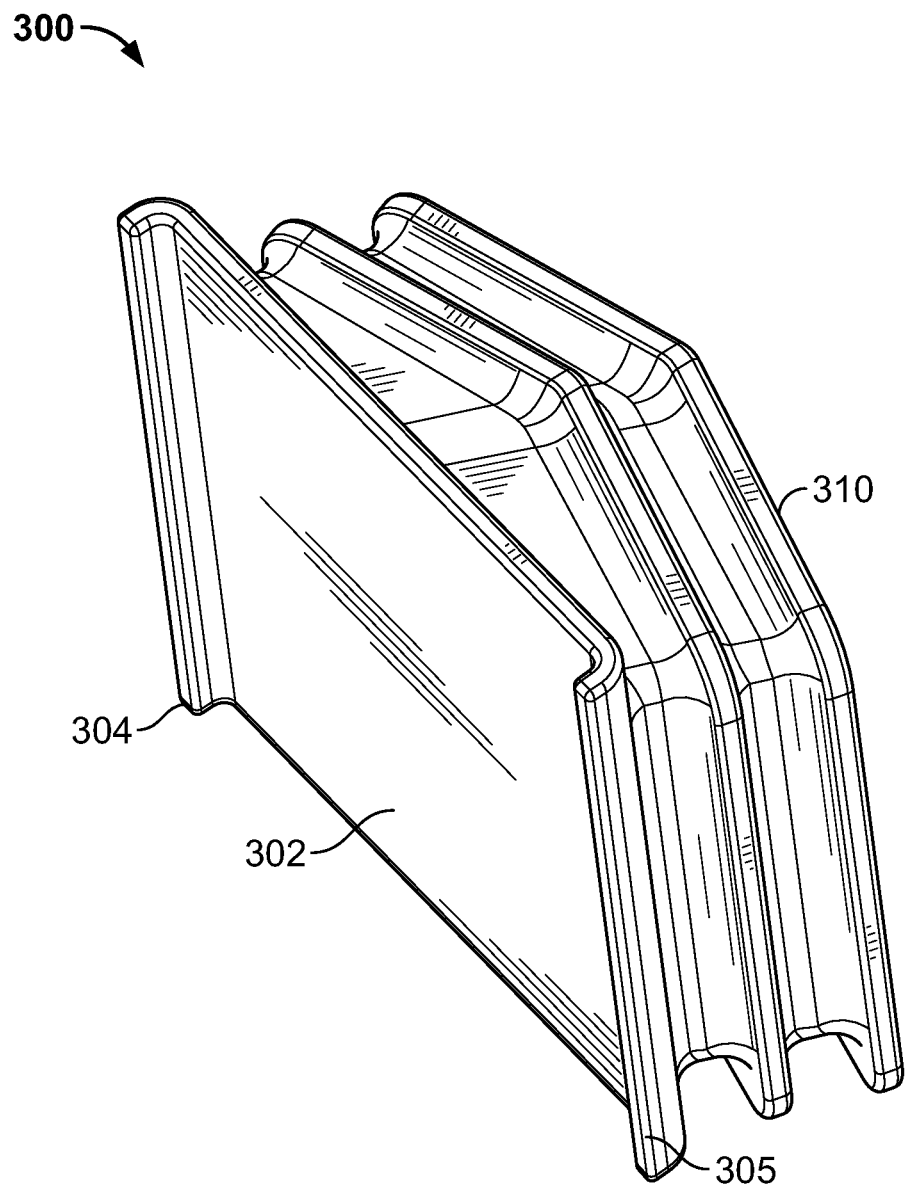
FIG. 13 is another perspective view of shear spring shown in FIGS. 9-12.

FIGS. 9 and 13 are perspective views of a shear spring 300, which is sometimes referred to as a V-spring. Any of the shear springs disclosed in the example embodiments, such as shear springs 72, 72a, 74, and 74a, may be arranged as shear spring 300. As shown in FIG. 9, shear spring 300 includes a base plate 302, a V-shaped plate 310, and an intermediate plate 312. V-shaped plate 310 results in shear spring 300 having a V-shaped wall 310a that is adapted to contact a corresponding V-shaped side wall of a spring mount. Shear spring 300 includes an elastomeric section 306 between base plate 302 and intermediate plate 312, and an elastomeric section 308 between intermediate plate 312 and V-shaped plate 310. Alternatively, the shear spring could be made without one or more of plates 302, 310, and 312. For example, the shear spring could be all elastomer, have a base plate 302 without plates 310 and 312, have base plate 302 and plate 312 but no intermediate plate 312, etc. Furthermore, base plate 302 could also be V-shaped like plates 310 and 312 such that all three plates are V-shaped. In such a case, the side wall of the opening contacting base plate 302 could also have a corresponding V-shape. Moreover, the shear spring 300 is shown having the geometry of a preferred embodiment. It will be appreciated that the base plate 302 may not even include a plate as noted above. Further, the base or base plate 302 of the shear spring 300 could also be affixed to the side walls of the opening in the spring module using fasteners, bolts, etc. in a known and conventional manner. Thus, the shear spring is not required to have, but may have, the geometry shown in FIGS. 9-13.

FIGS. 10 and 11 are elevational views of shear spring 300. Shear spring 300 has a free-state vertical offset 301 between its end plates (i.e., base plate 302 and V-shaped plate 310). Preferably, the free-state vertical offset 301 is equal to half the vertical travel of vehicle suspension 50. This is done to minimize a couple induced in shear spring 300 by virtue of the compression load acting on shear spring 300 applied at both end plates. A couple is a moment induced when equal and opposing forces are acting on a body but are not collinear. The effect of the couple on shear spring 300 is to induce rotation within the spring that could cause the spring to rotate within a spring module sufficiently enough to relieve the shear spring's compression and put the elastomeric sections (e.g., elastomeric sections 306 and 308) into tension. Offsetting both endplates of shear spring 300 by a distance equal to half of the suspension's vertical travel results in couples at the fully stroked and rebound conditions being equal but opposite in direction (the magnitude of these couples is half that of a spring with no offset or an offset equal to that of the vertical travel of vehicle suspension 50).

A shear spring is typically constructed from relatively flat first and second end plates with an elastomer connected between them. This spring will then have compressive and shear rates corresponding to the chosen material, cross-section, and thickness of elastomer. If one were to insert a third plate between the first and second end plates; such that, it subdivides the elastomer thickness into two separate, but not necessarily equal, thickness; the spring's compressive rate would increase while the shear rate would not be affected. Because the spring's plates are all relatively flat, the spring's shear rates in mutually perpendicular directions are the same.

If the spring has one or more plates with form; such that, the form confines the elastomer at least partially in one of the shear directions (use of V-plates is one way); the spring is no longer acting in pure shear in the confining direction. Rather, the spring is acting in a combination of shear and compression in the confining direction. The result is the confined shear direction having a higher effective shear rate than the unconfined shear direction. Just like above where the addition of plates to subdivide the rubber increases the compressive rate of the spring, the addition of formed plates will increase the compressive rate portion of the effective shear rate resulting in even higher effective shear rates.

FIG. 12 is a plan view of shear spring 300 comprising base plate 302, V-shaped plate 310, and intermediate plate 312. Base plate 302 includes a first flange 304 extending from a first end thereof away from V-shaped plate 310 and a second flange 305 extending from a second end thereof also away from V-shaped plate 310. Base plate 302 is adapted to contact a first side wall of a spring module opening of a vehicle suspension (for example, side wall 80 of opening 64 in the spring module of vehicle suspension 50). Frictional forces acting on shear spring 300, a side wall of a spring module opening, and a V-shaped side wall of a spring mount provide a primary means to prevent lateral movement of shear spring 300. The first flange 304 and the second flange 305 of base plate 302 are designed to extend beyond first and second side edges of a side wall of a spring module opening to secondarily restrict lateral movement of shear spring 300 with respect to vehicle suspension 50.

Intermediate plate 312 provides additional resistance to lateral shear forces acting on shear spring 300, such as lateral shear forces in a direction from flange 304 to flange 305 or from flange 305 to flange 304. Intermediate plate 312 is shown as having a V-shaped configuration with the same angle as V-shaped plate 310. However, intermediate plate 312 could have a larger or smaller angle for the V-shape as desired. Further, intermediate plate 312 could be omitted or additional intermediate plates (e.g., intermediate V-shaped plates) could be included between V-shaped plate 310 and base plate 302. Alternatively, an intermediate plate (e.g., intermediate plate 312) could be a flat plate, like the flat portion of base plate 302 between flanges 304 and 306, and additional plates could be added depending on the application or desired performance.

The V-shaped plates 310 and 312 may be bent from straight plates. Since V-shaped plate 310 has a V-shape, V-shaped plate 310 has an angle that is less than 180 degrees. FIG. 12 illustrates an included angle 311 formed by V-shaped plate 310 and an included angle 313 formed by intermediate plate 312. In the embodiments in which intermediate plate 312 has a V-shape, the included angles 311 and 313 are preferably the same number of degrees. The number of degrees (°) of included angles 311 and 313 may be a number of degrees that fall within any of a plurality of angle ranges including, but not limited to, the angle ranges of (i) 90° to 179°, (ii) 90° to 170°, or (iii) 115° to 125°. In accordance with that latter range, the included angles 311 and 313 may, for example, be 115°, 116°, 117°, 118°, 119°, 120°, 121°, 122°, 123°, 124°, 125° or some non-whole number angle between any two of those listed angles.

In accordance with the disclosed embodiments, shear spring 300 may be constructed of elastomeric sections 306 and 308 bonded to plates 302, 310, and 312. Elastomeric sections 306 and 308 may comprise an elastomeric material (i.e., an elastomer) such as natural rubber, synthetic rubber, styrene butadiene, synthetic polyisoprene, butyl rubber, nitrile rubber, ethylene propylene rubber, polyacrylic rubber, high-density polyethylene, thermoplastic elastomer, a thermoplastic olefin (TPO), urethane, polyurethane, a thermoplastic polyurethane (TPU), or some other type of elastomer. In this regard and in particular, elastomeric sections 306 and 308 may comprise an elastomer defined as American Society of Testing and Materials (ASTM) D2000 M4AA 717 A13 B13 C12 F17 K11 Z1 Z2. In this case, Z1 represents natural rubber and Z2 represents a durometer selected to achieve a desired shear rate. The selected durometer may be based on a given predefined scale, such as the Shore A scale, the ASTM D2240 type A scale, or the ASTM D2240 type D scale. In a preferred embodiment, in accordance with the Shore A scale, Z2, for example, is preferably 70±5. In another embodiment, in accordance with the Shore A scale, Z2 is, for example, within the range of 50 to 80. Other examples of Z2 and ranges for Z2 are also possible.

In another respect, elastomeric sections 306 and 308 may comprise a viscoelastomeric material that (i) has elastic characteristics when the shear spring 300 is under a load within a given range and when that load is removed, and (ii) has non-elastic characteristics (for example, does not return to an original non-loaded shape) if the applied load exceeds the greatest load of the given range. The given range may extend from no load to a maximum expected load plus a given threshold. The given threshold accounts for possible overloading of shear spring 300. As an example, the viscoelastomeric material may comprise amorphous polymers, semi-crystalline polymers, and biopolymers. Other examples of the viscoelastomeric material are also possible.

In accordance with the example embodiments, elastomeric sections 306 and 308 may also comprise one or more fillers. The filler(s) may optimize performance of elastomeric sections 306 and 308. The fillers may include, but are not limited to, wax, oil, curing agents, and/or carbon black. Such fillers may optimize performance by improving durability and/or tuning elastomeric sections 306 and 308 for a given shear load and/or a given compressive load applied to elastomeric sections 306 and 308. Improving durability through the use of fillers may include, for example, minimizing a temperature rise versus loading characteristic of elastomeric sections 306 and 308 and/or maximizing shape retention of elastomeric sections 306 and 308.

Shear spring 300 may be formed, for example, by inserting the plates 302, 310, and 312 into a mold (not shown). The plates may each be coated with a coating material. As an example, the coating material may comprise a material comprising zinc and phosphate, modified with calcium. The coating material may have a coating weight of 200-400 milligrams per square foot. Other examples of the coating material are also possible. A bonding agent may be applied to the coated plates for bonding the plates 302, 310, and 312 to elastomeric sections 306, 308. As an example, the bonding agent may comprise Chemlok® manufactured by the Lord Corporation, Cary, N.C., USA. Other examples of the bonding agent are also possible. Applying the coating material and/or applying the bonding agent may occur prior to, during, and/or after insertion of the plates 302, 310, 312 into the mold. After applying the coating material and the bonding agent, the elastomeric material (while in a pourable form) may be inserted into the mold to form the elastomeric sections 306, 308.

In a preferred embodiment, any exposed portion of the plates 302, 310, and 312 (for example, a portion of the plates not covered by the elastomeric material) is protected against corrosion by a means other than the elastomeric material. In other embodiments, some exposed portions of the plates 302, 310, and 312 (e.g., the edges of the plates) may not be protected against corrosion, whereas any other exposed portions of the plates are protected against corrosion.

The plates 302, 310, and 312 can be made of any of a variety of suitable materials, including, but not limited to, iron, steel, aluminum, plastic, a composite material, or some other material. The plates 302, 310, 312 may be fully, or at least substantially, encapsulated in elastomer to further enhance their corrosion resistance and friction at the mating suspension members. As an example, plates 302, 310, and 312 can comprise plates having a thickness between a range of 0.125 inches (3.175 mm) to 0.25 inches (6.35 mm).

In accordance with an example embodiment, the desired vertical shear rate of the shear spring 300 is approximately 615 N/mm (or approximately 3,500 pound force per inch (i.e., $lb_f/in$)), and the initial compressive spring rate of the shear spring 300 is approximately 5,700 N/mm (or approximately 32,500 $lb_f/in$).

Figure 14:
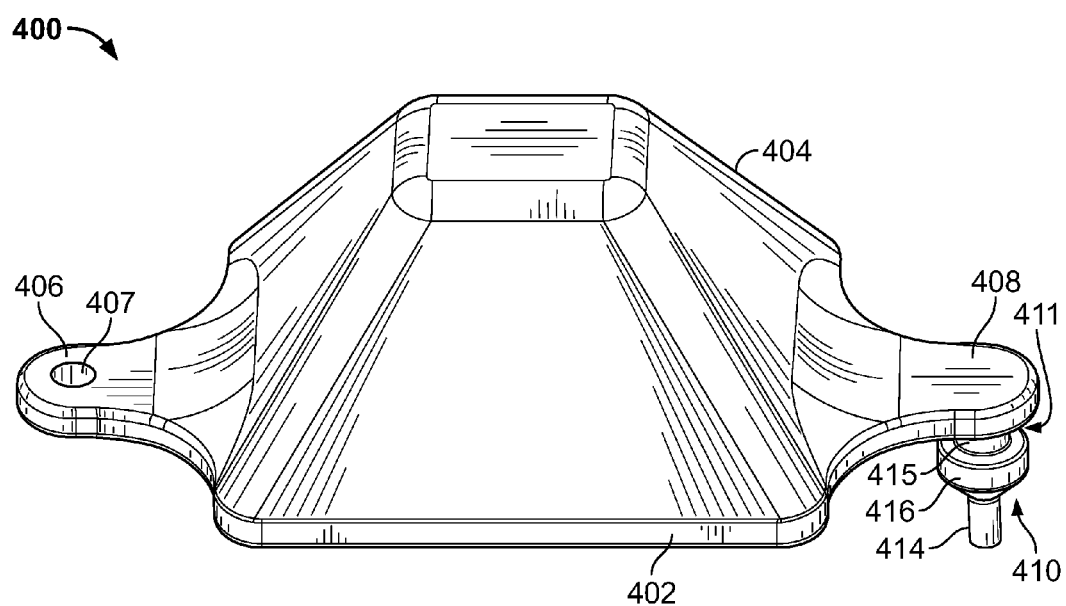
FIG. 14 is a perspective view of a load cushion used in the vehicle suspension of FIGS. 1-3.
Figure 15:
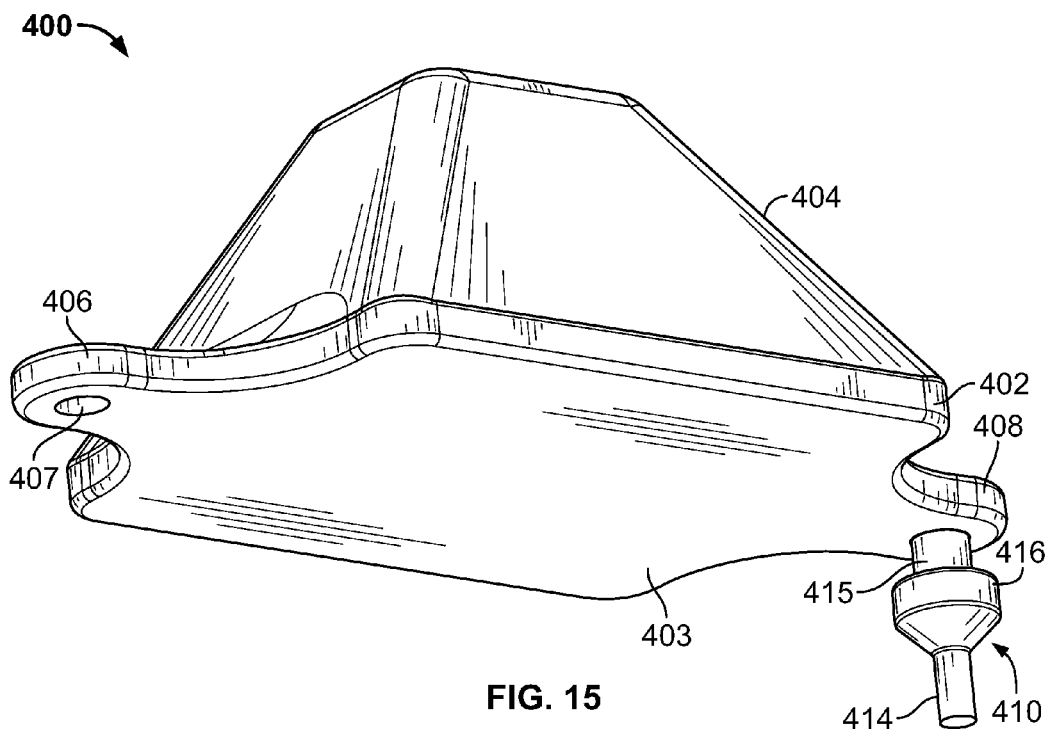
FIG. 15 is another perspective view of the load cushion of FIG. 14.
Figure 16:
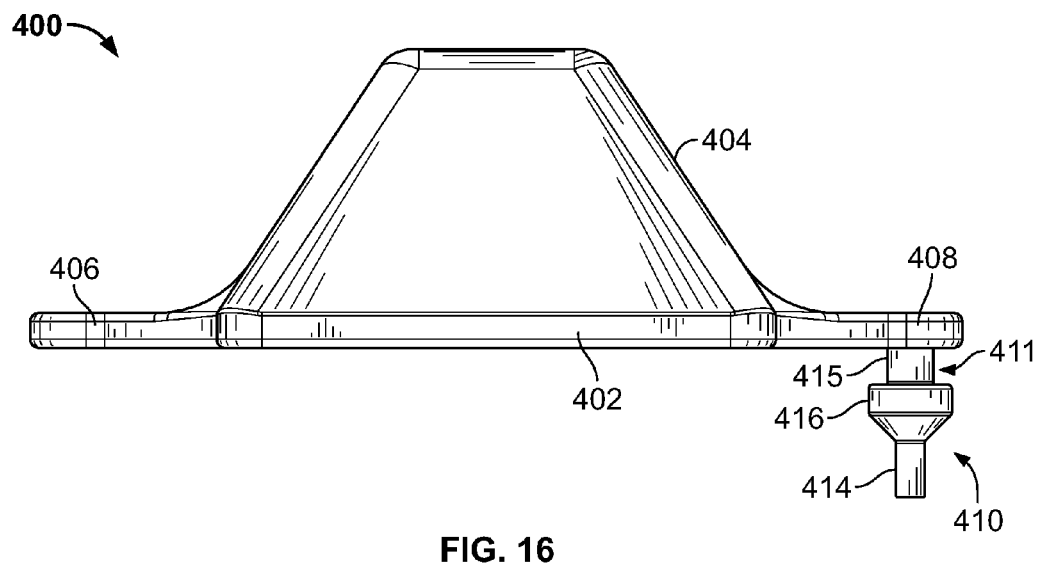
FIG. 16 is an elevation view of the load cushion of FIGS. 14 and 15.
Figure 17:
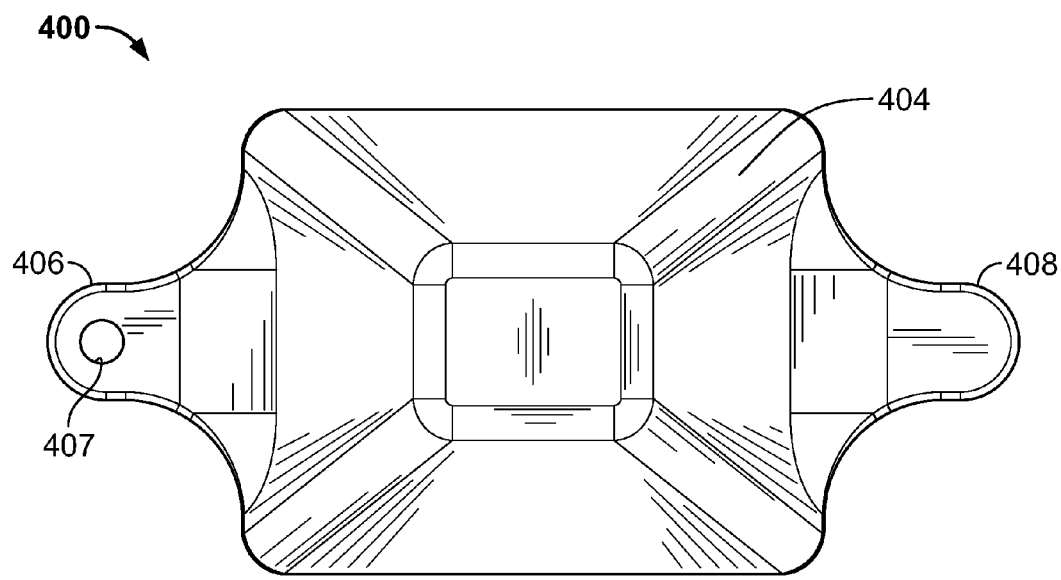
FIG. 17 is a plan view of the load cushion shown in FIGS. 14-16.
Figure 18:
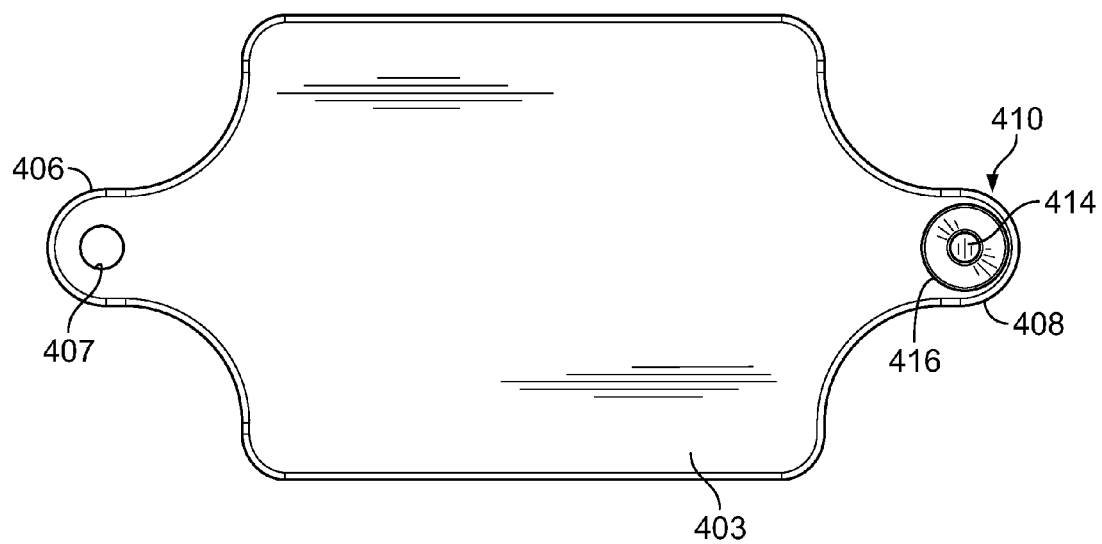
FIG. 18 is another plan view of the load cushion shown in FIGS. 14-17.

FIGS. 14 and 15 are perspective views of an example load cushion 400 for use in vehicle suspension 50. FIG. 16 is an elevation view of load cushion 400 and FIGS. 17 and 18 are top and bottom plan views, respectively, of load cushion 400. Any of the load cushions disclosed in the example embodiments, such as load cushions 76 and 76a, may be arranged as load cushion 400.

As shown in one or more of FIGS. 14, 15, and 16, load cushion 400 includes a base 402, a load cushion portion 404, a mounting extension 406 with a mounting hole 407, and a mounting extension 408. A load cushion retainer 410, integral with load cushion 400, extends from mounting extension 408. Load cushion portion 404 is positioned between mounting extensions 406 and 408 and, as shown in FIG. 14, above base 402. The load cushion base 402 may comprise a metal plate that is either solid or includes gaps or voids, or may comprise elastomeric material or a combination thereof.

Load cushion portion 404 may be designed to have at least one tapered wall, and generally, similarly shaped horizontal cross sections of different sizes throughout. The size change factor, or ratio of similitude, is a function of the taper of at least one tapered wall. The horizontal cross sections can be any geometric shape desired for packaging, weight or aesthetics. Additionally, or alternatively, the horizontal cross sections can be selected to obtain a desired vertical spring rate for load cushion 400.

Load cushion retainer 410 includes a load cushion retainer grip (or more simply, a grip) 414, a load cushion retainer shaft (or more simply, a shaft) 415, and a load cushion retainer disc (or more simply, a disc) 416. The shaft 415 extends between an outer surface 402a (see, FIG. 15) of base 402 and a retention surface 411 of disc 416. Grip 414 extends away from disc 416 from a portion of disc 416 opposite retention surface 411. The diameters of grip 414, shaft 415, and disc 416 may be different. For example, and as shown in FIG. 15, a diameter of shaft 415 is smaller than a diameter of disc 416, and a diameter of grip 414 is generally smaller (although not necessarily smaller) than the diameters of shaft 415 and disc 416.

A length of shaft 415 may be selected with respect to a height of a saddle assembly recess, such as one of recesses 420 and 421 of saddle 120 or one of recesses 422 and 423 of saddle 130. Typically, the length of shaft 415 is 10-15% less than the recess height. This allows the retainer to "clamp" itself into place. Furthermore, the diameter of shaft 415 may be selected with respect to a width of the saddle assembly recess. As an example, the length of shaft 415 may be selected to be slightly greater than the height of a saddle assembly recess and the diameter of shaft 415 may be selected to be slightly less than the depth and/or the width of the saddle assembly recess so that the shaft 415 can be positioned within the saddle assembly recess by hand.

Grip 414 may be used to pull or push shaft 415 into a saddle assembly recess, as well as to pull or push shaft 415 out of the saddle assembly recess. Load cushion retainer 410 may flex while grip 414 is pulled or pushed. A diameter of shaft 415, and thus the width of the saddle assembly recess, may be selected to be large enough such that load cushion retainer 410 is not torn from outer surface 402a while a force to pull or push grip 414 is applied to load cushion retainer 410.

Mounting load cushion 400 to load cushion mounting surface 155 or 165 of the inboard and outboard saddles 120, 130 may include positioning shaft 415 into a recess on a load cushion mounting surface, such as either of recesses 420 and 423 on load cushion mounting surface 165 (shown in FIGS. 6 and 7), or either of recesses 421 and 422 on load cushion mounting surface 155 (shown in FIGS. 6 and 7). After shaft 415 is positioned within a saddle assembly recess of either the inboard or outboard saddle, a fastener, such as a bolt, a screw, a cotter pin, a hitch pin, a pine-tree style pin, a clevis pin, or some other type of fastener or combination of fasteners, can be inserted into mounting hole 407 and into the other saddle. In one respect, the other saddle may include a saddle assembly recess as shown in FIGS. 5 and 6. In another respect, the other saddle may include a tapped or non-tapped hole to which the fastener can be installed for retaining load cushion 404 at mounting extension 406. That tapped or non-tapped hole may be a through-hole. Furthermore, the load cushion retainer could also be positioned elsewhere on the load cushion.

Figure 19:
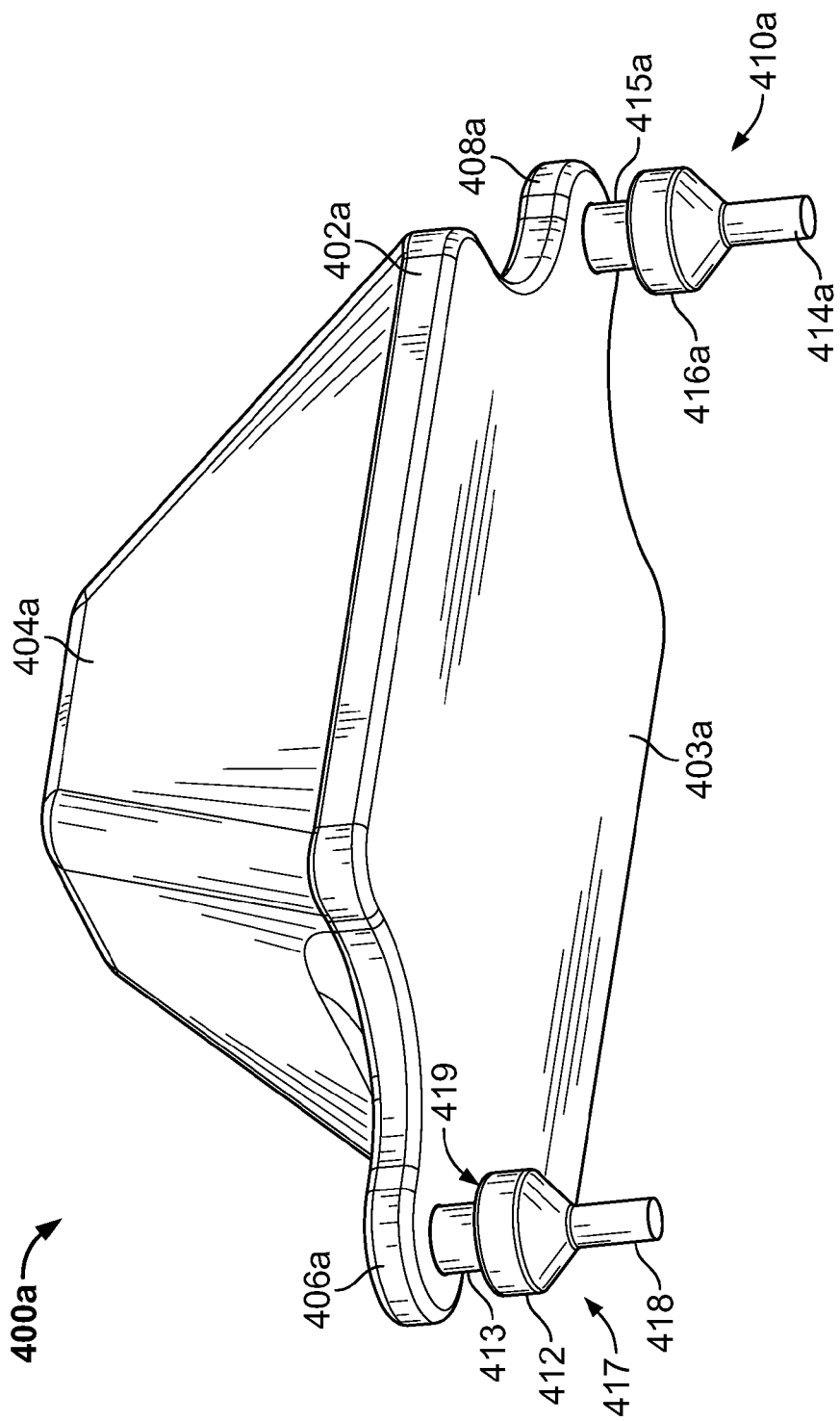
FIG. 19 is a perspective view of a load cushion.

FIG. 19 is a perspective view illustrating an alternative load cushion 400a. Any of the load cushions disclosed in the example embodiments, such as load cushions 76 and 76a, may be arranged as load cushion 400a. Load cushion 400a includes a base 402a, a load cushion portion 404a, a mounting extension 406a, and a mounting extension 408a. Base 402a, load cushion portion 404a, and mounting extension 408a are the same as base 402, load cushion portion 404, and mounting extension 408, respectively, of load cushion 400. Load cushion portion 404a is positioned between mounting extensions 406a and 408a and, as shown in FIG. 19, above base 402a.

A load cushion retainer 417, integral with load cushion 400a, extends from mounting extension 406a. Load cushion retainer 417 includes a load cushion retainer grip (or more simply, a grip) 418, a load cushion retainer shaft (or more simply, a shaft) 413, and a load cushion retainer disc (or more simply, a disc) 412. Shaft 413 extends between an outer surface 403a of base 402a and a retention surface 419 of disc 412. Grip 418 extends away from disc 412 from a portion of disc 412 opposite retention surface 419. The foregoing components of load cushion retainer 417 may be configured similar to like named components of load cushion retainer 410 shown in FIG. 14.

Mounting load cushion 400a to load cushion mounting surface 155 or 165 of inboard and outboard saddles 120, 130 may include positioning shaft 415a into a recess on a load cushion mounting surface, such as either of recesses 421 and 423 on load cushion mounting surface 165 (shown in FIGS. 6 and 7), or either of recesses 420 and 422 on load cushion mounting surface 155 (shown in FIGS. 6 and 7). After shaft 415a is positioned or while shaft 415a is being positioned within a saddle assembly recess of either the inboard or outboard saddle, shaft 413 is positioned within another saddle assembly recess on the same load cushion mounting surface that includes the saddle assembly recess in which shaft 415a was or is being positioned. Grips 414a and 418 may be pushed or pulled for enabling easier installation of shafts 413 and 415a into respective recesses.

Figure 20:
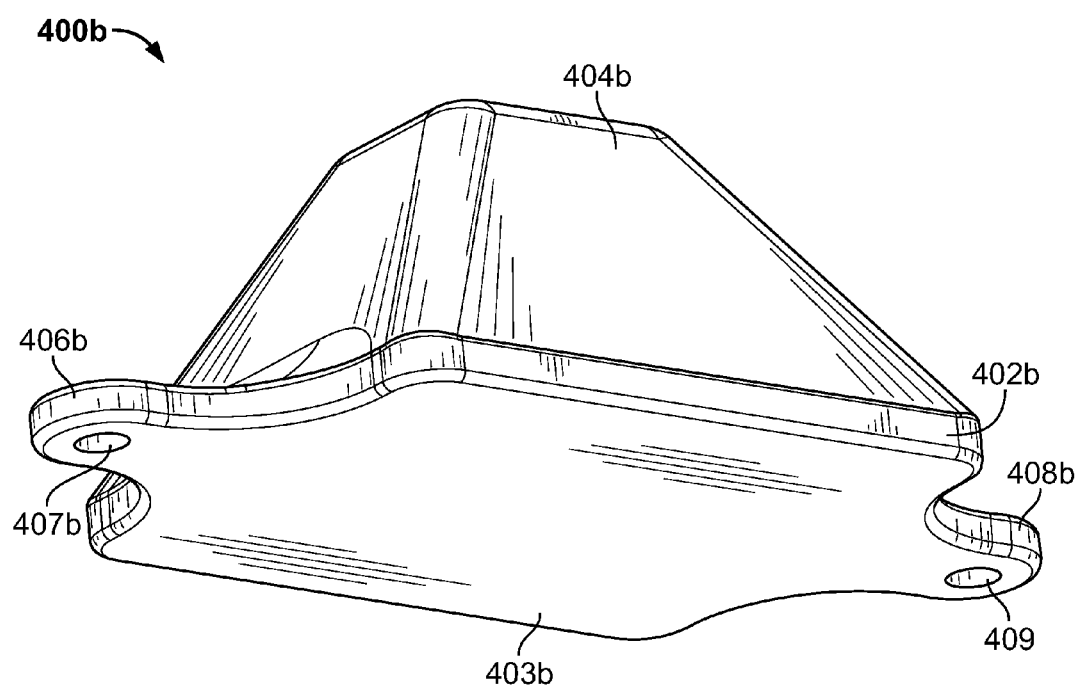
FIG. 20 is a perspective view of a load cushion.

FIG. 20 is a perspective view illustrating an alternative load cushion 400b. Any of the load cushions disclosed in the example embodiments, such as load cushions 76 and 76a, may be arranged as load cushion 400b. Load cushion 400b includes a base 402b, a load cushion portion 404b, a mounting extension 406b, and a mounting extension 408b. Base 402b, load cushion portion 404b, and mounting extension 406b are the same as base 402, load cushion portion 404, and mounting extension 406, respectively, of load cushion 400. Load cushion portion 404b is positioned between mounting extensions 406b and 408b and, as shown in FIG. 20, above base 402b.

Mounting extension 406b includes a mounting hole 407b. Similarly, mounting extension 408b includes a mounting hole 409. Mounting load cushion 400b to load cushion mounting surface 155 or 165 of inboard and outboard saddles 120, 130 may include aligning mounting holes 407b and 409 with a respective saddle assembly recess of either of load cushion mounting surface 155 or 165. A fastener separate from load cushion 400b, such as a bolt, a screw, a cotter pin, or some other type of fastener, can be inserted into mounting hole 407 and into a saddle assembly recess, such as one of saddle assembly recesses 420, 421, 422, or 423 shown in FIGS. 6 and 7. Alternatively, a saddle to which load cushion 404b is to be mounted may include a tapped or non-tapped hole to which the separate fastener can be installed for retaining load cushion 404 at mounting extension 406b. That tapped or non-tapped hole may be a through-hole. The opposite saddle may include a similarly configured tapped or non-tapped hole to which another separate fastener can be installed for retaining load cushion 404 at mounting extension 408b.

Figure 32:
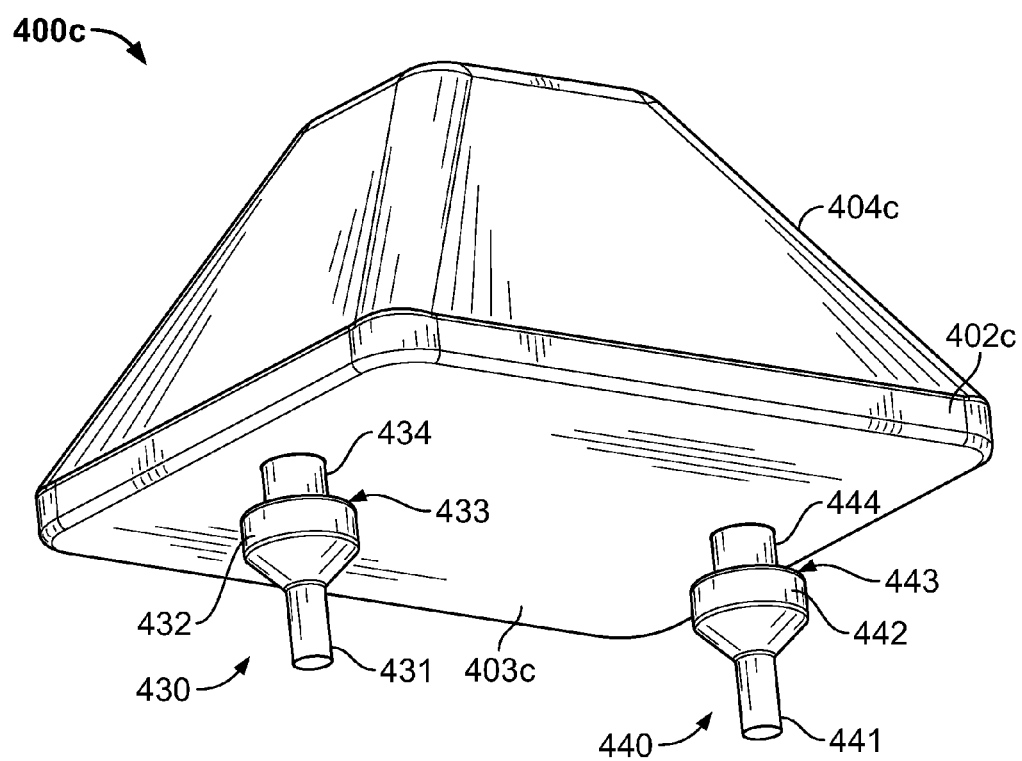
FIG. 32 is a load cushion having two load cushion retainers extending from the base.

Alternately, as shown in FIG. 32, load cushion 400c having base 402c may include a first load cushion retainer 430 comprising a first load cushion 430 extending from base 402c as well as a second load cushion retainer 440 also extending from base 402c.

Load cushions 400, 400a, 400b, and 400c preferably have a continuously increasing spring rate as an applied load increases and a continuously decreasing spring rate as an applied load decreases. Thus, the example vehicle suspensions, described herein, that use any of load cushions 400, 400a, 400b, and 400c can advantageously have a continuously increasing spring rate as an applied load increases and a continuously decreasing spring rate as an applied load decreases. Load cushions 400, 400a, 400b, and 400c act in compression and do not undergo tensile loading, so load cushions 400, 400a, 400b, and 400c also have increased fatigue life over other springs (for example, elastomer springs) that are subjected to such loading.

In accordance with example embodiments, each load cushion 400, 400a, 400b, and 400c is an elastomeric progressive spring rate load cushion shaped to resemble a pyramid. In one respect, the base and load cushion portion of load cushions 400, 400a, 400b, and 400c are made of elastomer and do not include any plates or any bonding agents for bonding plates to elastomer. In another respect, the base of load cushions 400, 400a, 400b, and 400c may include a plate (which can be referred to as a base plate) made of any of a variety of suitable materials, including, but not limited to, iron, steel, aluminum, plastic, and a composite material. As an example, the base plate can comprise a plate having a thickness between a range of 0.125 inches (3.175 mm) to 0.25 inches (6.35 mm). The base plate can be encapsulated in elastomer and/or bonded to the load cushion portion using a bonding agent. The base plate dimensions and shape can be varied to any dimension or shape desired for packaging, weight, and aesthetics. Preferably, each load cushion base is dimensioned to (i) match the top surface of a spring mount described herein, such as spring mount 66 or 66a, (ii) locate mounting holes and/or load cushion retainer for securing the load cushion base to the spring mount, and (iii) minimize overall mass.

The size and dimensions of the elastomer used for the progressive spring rate load cushions 400, 400a, 400b, and 400c may be optimized for the vertical spring rate requirements. For the present application, the vertical spring rate for the progressive spring rate load cushions 400, 400a, 400b, and 400c continuously increases with increasing load and continuously decreases with decreasing load, defining a curvilinear shape with no discontinuities on a graph illustrating spring rate as a function of sprung load.

Preferably, load cushion portion 404 has a shape closely resembling a pyramid with a flattened top surface, as shown. With this preferred shape, the vertical spring rate for the load cushion 400 linearly increases with increasing load and linearly decreases with decreasing load. In that regard, load cushion 400 is operable as a progressive spring rate load cushion. In one embodiment, the cross section of load cushion portion 404 adjacent base 402 is 120 millimeters (mm) by 150 mm, the cross section of the top surface of load cushion portion 404 is 45 mm by 56 mm, the height of the load cushion portion 404 is 71 mm, and the height of base 402 is 9 mm. Other example dimensions of portions of load cushion 400 are also possible. For a given geometry, the spring rate of load cushion 400 may be optimized by varying the durometer of the elastomer. By varying the durometer, a family of interchangeable progressive spring rate load cushions can be created.

Figure 21A:
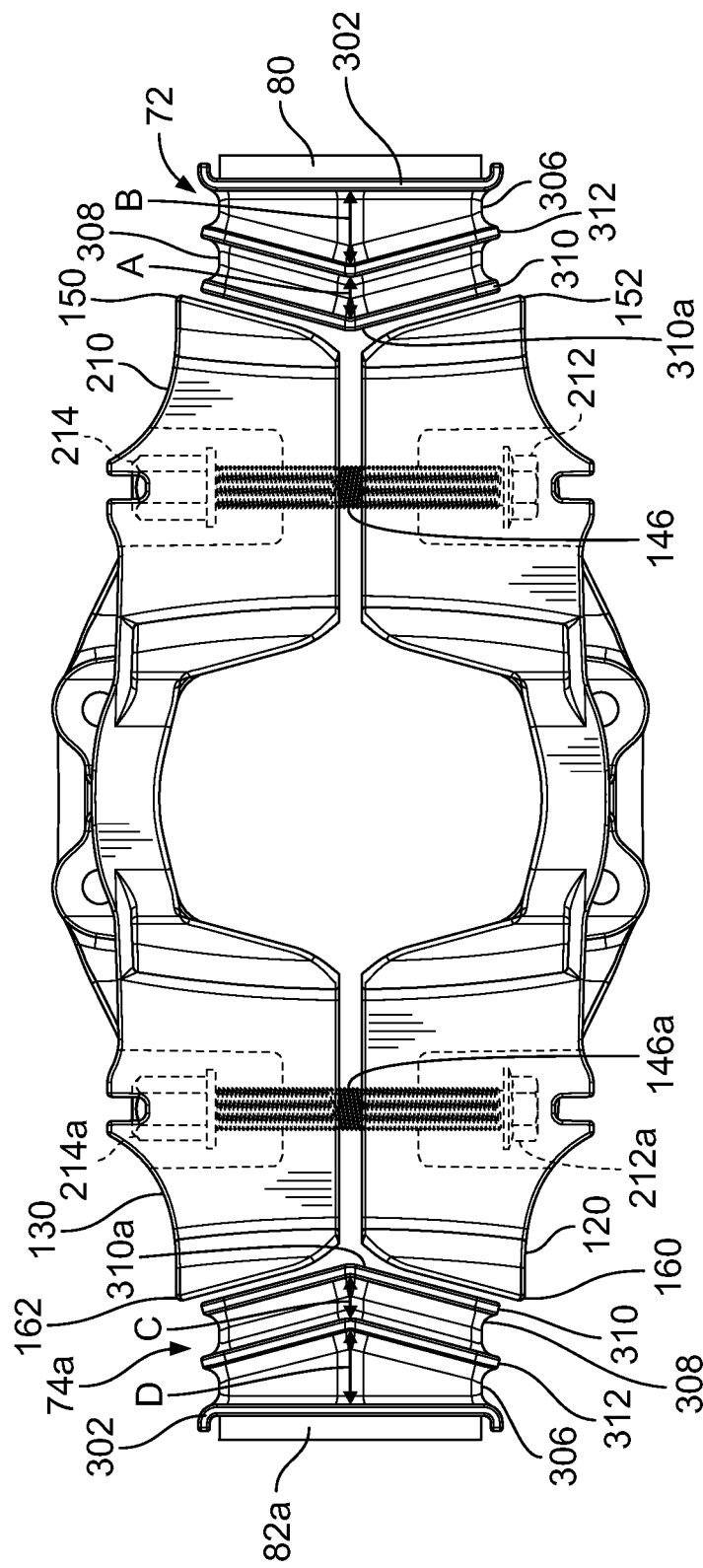
FIG. 21a is a top view of an inboard saddle and an outboard saddle prior to being drawn together by two connecting rods.
Figure 21B:
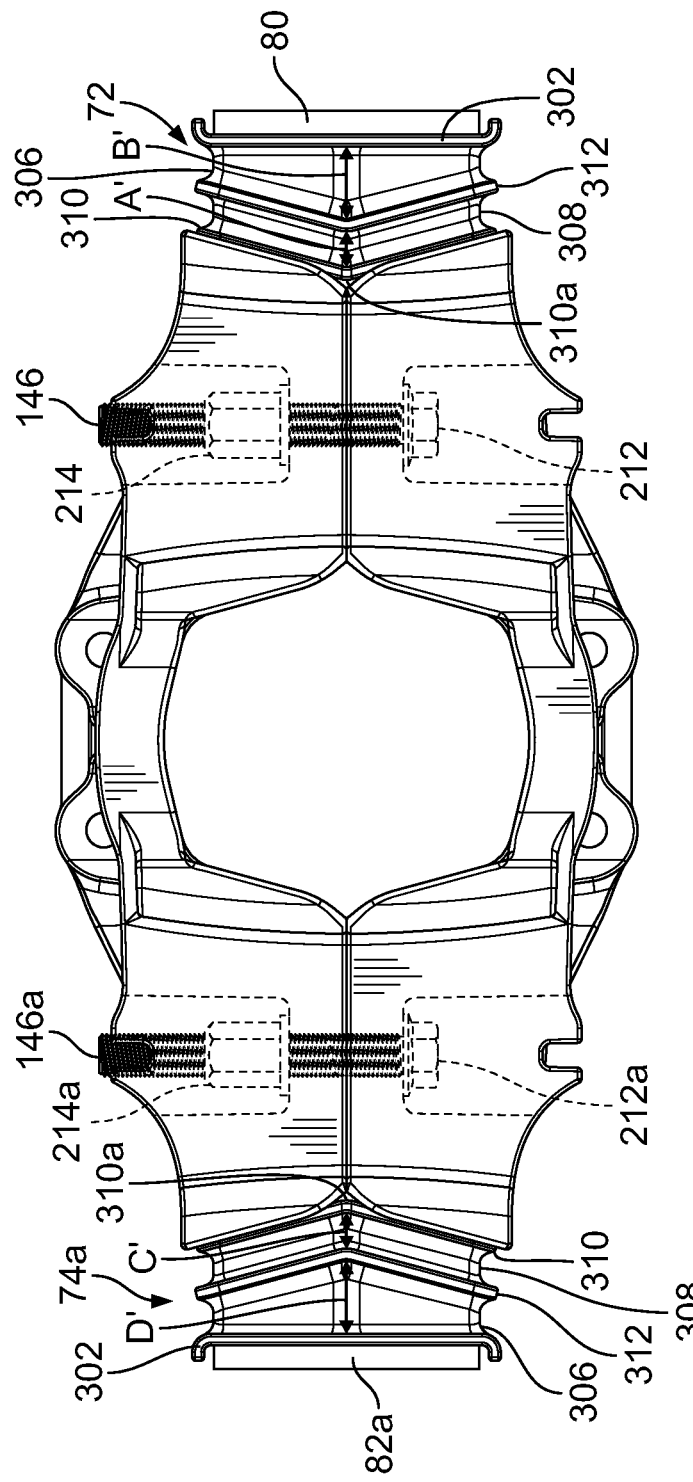
FIG. 21b is a top view of the saddles in FIG. 21a after they have been drawn together by the connecting rods.

FIGS. 21a and 21b are top views of inboard saddle 130 and outboard saddle 120. FIG. 21a shows inboard saddle 130 and outboard saddle 120 before a first connecting rod 146 and a second connecting rod 146a are used to draw inboard saddle 130 and outboard saddle 120 together. FIG. 21a shows connecting rod 146 extending through the inboard saddle and the outboard saddle with end 212 and nut 214 that will be tightened against the inboard saddle and outboard saddle to draw them together into contact. Similarly FIG. 21a shows connecting rod 146a extending through inboard saddle 130 and outboard saddle 120 with end 212a and nut 214a that will be tightened against the inboard saddle and the outboard saddle to draw them together into contact. Preferably, the ends 212 and 212a of connecting rods 146 and 146a are located within the outboard saddle such that the opposing ends of those connecting rods will not be in positions in which the opposing ends can make contact with tires or wheels that attach to axles connected to vehicle suspension 50.

FIGS. 21a and 21b illustrate shear spring 72 adjacent to first ends 150 and 152, and shear spring 74a adjacent to second ends 160 and 162. Shear spring 72 has V-shaped wall 310a adapted to contact the V-shaped side wall 190 of spring mount 66 (see FIGS. 6 and 7), wherein the shear spring 72 is positioned between side wall 80 of the opening of the first spring module and the V-shaped side wall 190. Prior to shear spring 72 being placed under a compression load by side wall 80 and V-shaped wall 190, the distance between V-shaped plate 310 of shear spring 72 and intermediate plate 312 of shear spring 72 is denoted by the letter "A," and the distance between intermediate plate 312 of shear spring 72 and base plate 302 of shear spring 72 is denoted by the letter "B."

Similarly, FIGS. 21a and 21b illustrate shear spring 74a adjacent to second ends 160 and 162. Shear spring 74a has a V-shaped wall 310a adapted to contact the V-shaped side wall 190a of spring mount 66a (see FIGS. 6 and 7), wherein the shear spring 74a is positioned between side wall 82a of the opening of the second spring module and the V-shaped side wall 190a. Prior to shear spring 74a being placed under a compression load by side wall 82a and V-shaped wall 190a, the distance between V-shaped plate 310 of shear spring 74a and intermediate plate 312 of shear spring 74a is denoted by the letter "C," and the distance between intermediate plate 312 of shear spring 74a and base plate 302 of shear spring 74a is denoted by the letter "D."

FIG. 21b shows inboard saddle 130 and outboard saddle 120 after nuts 214 and 214a have been tightened onto connecting rods 146 and 146a to draw inboard saddle 130 and outboard saddle 120 into contact with each other. While tightening nuts 214 and 214a onto connecting rods 210 and 210a together they also serve to cause (i) shear spring 72 to be compressed between V-shaped side wall 190 and side wall 80 of the opening of the first spring module 70, and (ii) shear spring 74a to be compressed between V-shaped side wall 190a and side wall 82a of the opening of the second spring module 70a. The tapered surfaces of the V-shaped side wall 190 contact and compress shear spring 72 by a wedging action in which the elastomeric sections 306 and 308 of shear spring 72 are compressed. Similarly, the tapered surfaces of the V-shaped side wall 190a contact and compress shear spring 74a by a wedging action in which the elastomeric sections 306 and 308 of shear spring 74a are compressed. As shown and described herein, the V-shaped surface of the shear spring 72 contacts a corresponding V-shaped side wall 190 during compression, wherein the surfaces are preferably shown to be linear and in contact along nearly the entire surface of the shear spring. It will be noted that it is not necessary, although desirable, that the entire V-shaped surface of the shear spring 72 is in contact with the V-shaped wall 190 during compression. Moreover, it is possible that one or both of the contacting surfaces could be curvilinear provided that the surfaces provide a wedging action that serves to compress the shear spring 72. For example, the surfaces of the V-shaped wall 190 and the shear spring 72 do not necessarily need to be linear as shown in the above Figures, although linear surfaces are preferred.

As shown in FIG. 21b, the elastomeric sections 306 and 308 of shear spring 72 are compressed such that the distance between V-shaped plate 310 and intermediate plate 312 (denoted as A') is less than distance A shown in FIG. 21a, and the distance between intermediate plate 312 and base plate 302 (denoted as B') is less than distance B shown in FIG. 21a. Similarly, the elastomeric sections 306 and 308 of shear spring 74a are compressed such that the distance between V-shaped plate 310 and intermediate plate 312 (denoted as C') is less than distance C shown in FIG. 21a, and the distance between intermediate plate 312 and base plate 302 (denoted as D') is less than distance D shown in FIG. 21a.

Thus, with reference to FIGS. 2 and 3, vehicle suspension 50 may be assembled by using a method including the steps of (i) providing a frame attachment portion 58 adapted for connection to a vehicle frame rail having a spring module 70 attached to the frame attachment portion 58 wherein the spring module 70 has an opening 64 defined by a top wall 84, a bottom wall 86, and first and second side walls 80, 82 of the spring module, (ii) positioning a first part 66b of a first spring mount 66 within the opening 64, (iii) positioning a first shear spring 72 between a first tapered surface of the first spring mount 66 and a first side wall 80 of the opening 64 of the first spring module 70, (iv) positioning a second shear spring 74a between a second tapered surface of the first spring mount 66 and second side wall 82 of the opening 64 of the first spring module 70, (v) positioning a second part of the first spring mount 66 within the opening 64, (vi) placing a first threaded connecting rod 164 through a through-hole in at least one of the first part of the first spring mount 66 or the second part of the first spring mount 66, and (vii) tightening the first threaded connecting rod 164 to draw together the first part of the first spring mount 66 and the second part of the first spring mount 66, and to compress the first shear spring 72 between the first side wall 190 of the first spring mount 66 and the first side wall 80 of the opening 64 of the first spring module 70, and also to compress the second shear spring 74a between the second side wall 190b of the first spring mount 66 and the second side wall 82 of the opening 64 of the first spring module 70.

In this method of assembling a vehicle suspension, the need for separate spring mounts is eliminated. In addition, other prior art systems required the use of a funnel and difficult compression techniques of the shear spring to position the spring mount and one or more shear spring properly within the vehicle suspension. However, with this method, these problems have been eliminated because the shear springs are compressed by the wedging action of the V-shaped surfaces of the side walls of the spring mount and corresponding V-shaped side walls on the shear springs. The V-shaped surface of the spring mount side walls is formed by tightening the nut onto the connecting rod that passes through the inboard and outboard parts of the spring mount.

In addition, the disclosed vehicle suspension construction also provides significant advantages for servicing and disassembling the vehicle suspensions. For example, if a shear spring needs to be replaced, the serviceman can gradually decompress the shear spring (e.g., reduce the compressive forces acting on the shear springs) within the vehicle suspension by loosening the nuts or connecting rods that were used do draw spring mount portions together to form a spring mount, in a staged and staggered method. The following examples of staged and staggered shear spring decompression methods are applicable to vehicle suspension 50 using two connecting rods 146 and 146a.

First example of staged and staggered method to decompress shear springs:

Step A1—Turn connecting rod 146 or nut 214 X number of degrees in a direction that causes nut 214 to move away from end 212.

Step A2—Turn connecting rod 146a or nut 214a X number of degrees in a direction that causes nut 214a to move away from end 212a.

Step A3—Repeat steps A1 and A2 until the shear springs retained by saddle assembly 90 are decompressed.

Second example of staged and staggered method to decompress shear springs:

Step B1—Turn connecting rod 146 or nut 214 X number of degrees in a direction that causes nut 214 to move away from end 212.

Step B2—Turn connecting rod 146a or nut 214a (X times 2) number of degrees in a direction that causes nut 214a to move away from end 212a.

Step B3—Turn connecting rod 146 or nut 214 (X times 2) number of degrees in a direction that causes nut 214 to move away from end 212.

Step B4—Repeat steps B2 and B3 until the shear springs retained by saddle assembly 90 are decompressed.

In the foregoing examples, X may equal 360° or some other number of degrees. Other examples of staged and staggered method to decompress shear springs are also possible. Prior art systems posed more challenges because there was not a simple way to slowly ease the compressive forces on the shear springs when removing them from the vehicle suspensions.

Staged and staggered methods may also be used to place shear spring in compression. The following examples of staged and staggered shear spring compression methods are applicable to vehicle suspension 50 using two connecting rods 146 and 146a.

First example of staged and staggered method to compress shear springs:

Step C1—Turn connecting rod 146 or nut 214 X number of degrees in a direction that causes nut 214 to move towards end 212.

Step C2—Turn connecting rod 146a or nut 214a X number of degrees in a direction that causes nut 214a to move towards end 212a.

Step C3—Repeat steps C1 and C2 until the shear springs retained by saddle assembly 90 are compressed as desired.

Second example of staged and staggered method to compress shear springs:

Step D1—Turn connecting rod 146 or nut 214 X number of degrees in a direction that causes nut 214 to move towards end 212.

Step D2—Turn connecting rod 146a or nut 214a (X times 2) number of degrees in a direction that causes nut 214a to move towards end 212a.

Step D3—Turn connecting rod 146 or nut 214 (X times 2) number of degrees in a direction that causes nut 214 to move towards end 212.

Step D4—Repeat steps D2 and D3 until the shear springs retained by saddle assembly 90 are compressed as desired.

In the foregoing examples, X may equal 360° or some other number of degrees. Other examples of staged and staggered method to compress shear springs are also possible.

In the example embodiments described herein, threaded connecting rods 146 and 146a may be arranged in any one of a variety of configuration. Preferably, the connecting rods are M-20×1.5, class 10.9, bolts with sufficient threads to allow for each bolt to pass through both the inboard and outboard saddles and to engage corresponding nuts when the shear springs to be compressed via tightening of the bolts are in an uncompressed state. A shank of each bolt may, for example, be threaded from the bolt head to the shank end opposite the bolt head. Alternatively, each connecting rod could, for example, comprise a different type of bolt, or a screw, or some other suitable fastener. For instance, each connecting rod could be a rod with two threaded ends or a rod threaded from end to end. In this regard, inboard and outboard parts of the saddle could be drawn together to compress a set of shear springs by installing the threaded connecting rod into a hole tapped into one of the inboard and outboard parts of the saddle and using a nut on the opposite end of the connecting rod, or by using a respective nut threaded onto opposite ends of the threaded connecting rod. Also, each connecting rod could itself be round, square, or of some other geometric shape.

Figure 22:
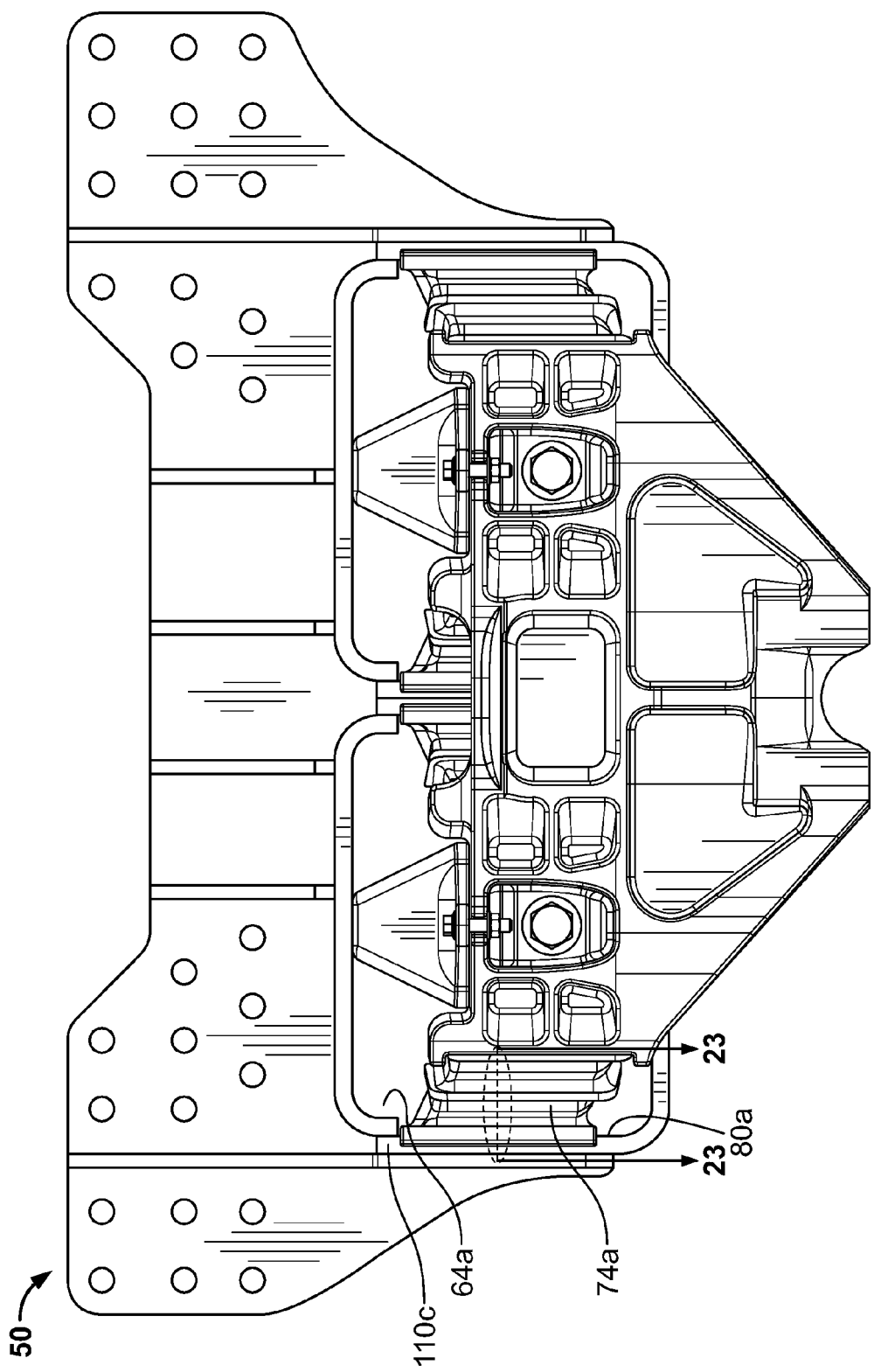
FIG. 22 is a view of the outboard side of vehicle suspension 50.

FIG. 22 is a view of the outboard side of vehicle suspension 50 having a line 23-23 extending through shear spring 74a, first side wall 80a of the second opening 64a, and V-shaped side wall 190a of spring mount 66a.

Figure 23:
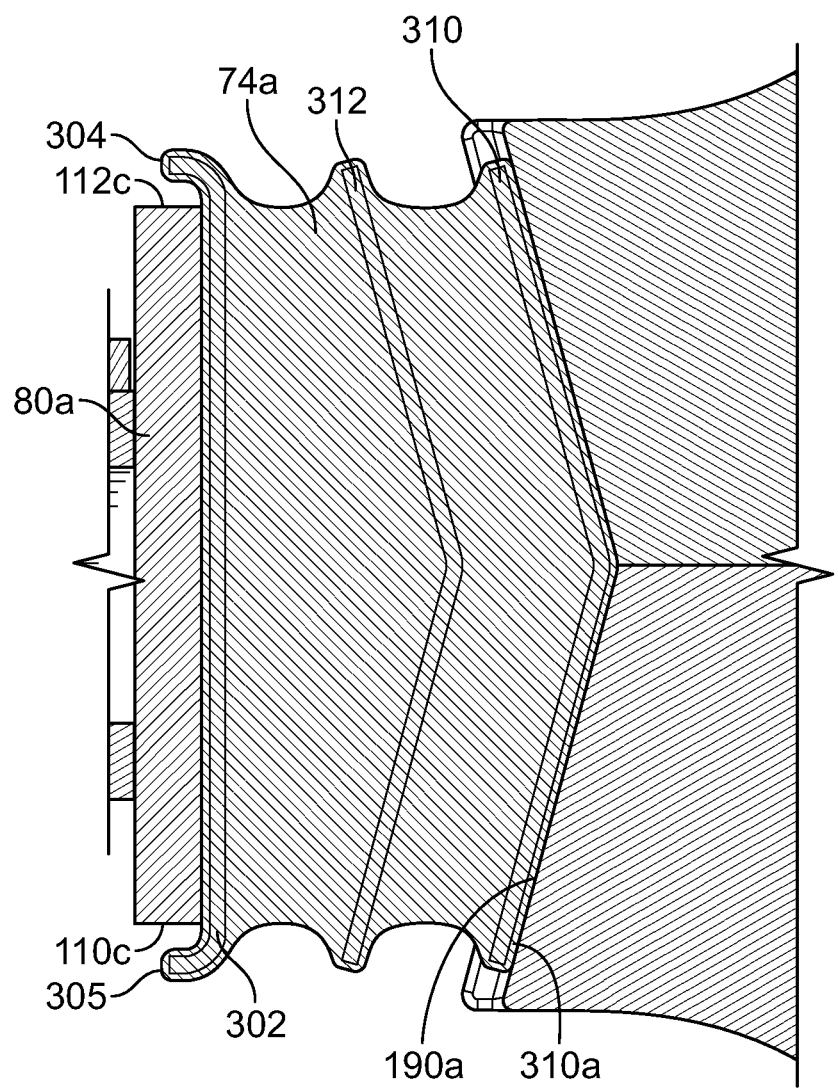
FIG. 23 is a cross sectional top view of the vehicle suspension 50 of FIG. 22 along line 23-23 shown in FIG. 22.

FIG. 23 is a cross sectional top view of vehicle suspension 50 along line 23-23 shown in FIG. 22. In particular, shear spring 74a is shown in compression between side wall 80a and V-shaped side wall 190a of the second spring mount 66a. The V-shaped wall 310a of shear spring 74a is in contact with V-shaped side wall 190a and shear spring 74a is wedged against side wall 80a. Base plate 302 of shear spring 74 abuts side wall 80a. Frictional forces acting on shear spring 74a, side wall 80a, and V-shaped side wall 190a provide a primary means to prevent lateral movement of shear spring 74a. Base plate 302 includes flange 304 that extends from an end of base plate 302 in a direction away from the V-shaped plate 310. Similarly flange 305 extends from another end of base plate 302 in a direction away from V-shaped plate 310. In this manner, flanges 304 and 305 and side wall 80a can secondarily restrict lateral movement of the shear spring 74. For example, side wall 112c can restrict lateral movement of shear spring 74 when flange 304 is in contact with side wall 112c, and side wall 110c can restrict lateral movement of shear spring 74 in an opposite direction when flange 305 is in contact with side wall 110c.

Figure 24:
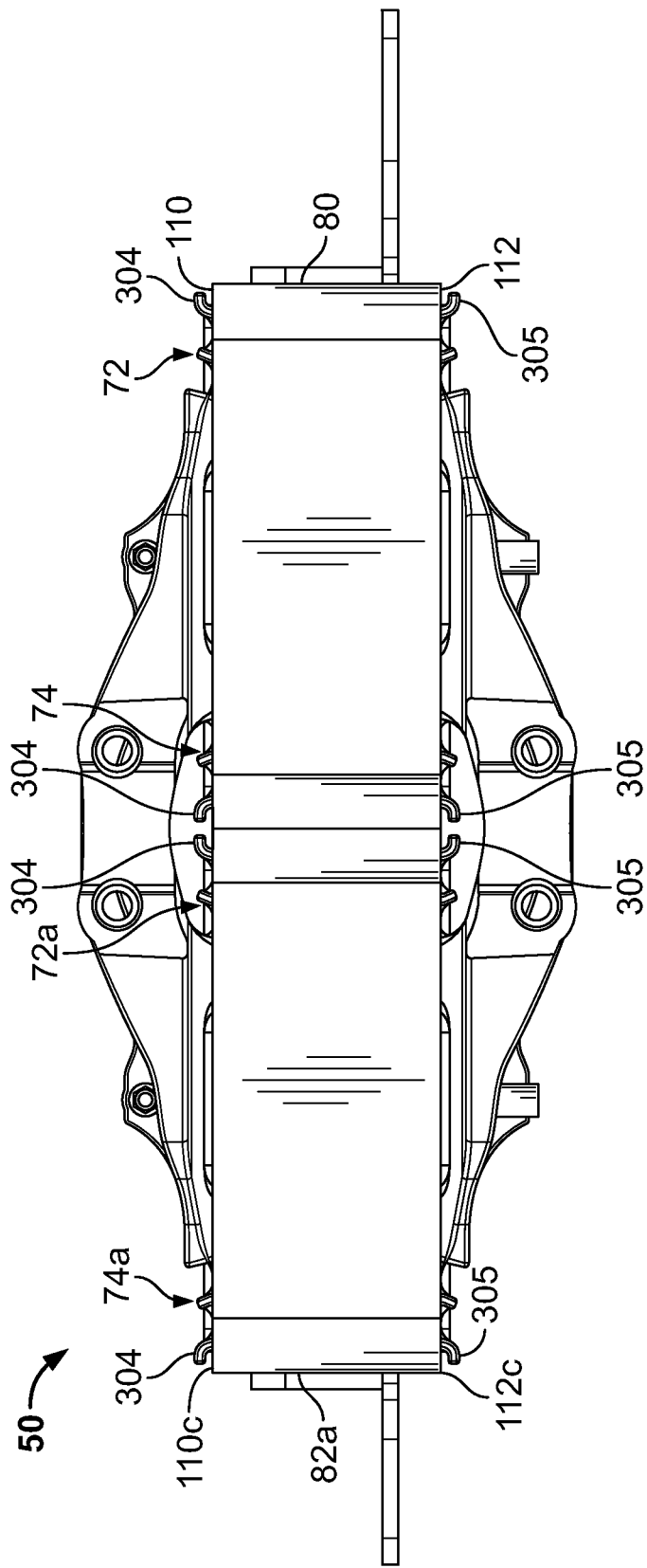
FIG. 24 is a bottom view of the vehicle suspension 50 shown in FIGS. 2 and 3.

FIG. 24 is a bottom view of vehicle suspension 50 shown in FIGS. 2 and 3, where the flanges 304 and 305 of the shear springs are shown extending beyond the spring modules that comprise those shear springs. In particular, flanges 304 and 305 of shear spring 74a are shown as extending beyond side edges 110c and 112c of side wall 82a, and flanges 304 and 305 of shear spring 72 are shown as extending beyond side edges 110 and 112 of side wall 80.

Figure 25A:
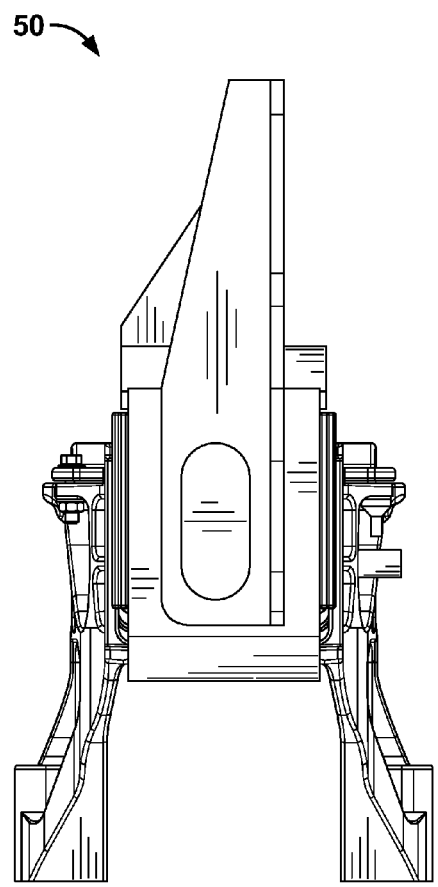
FIG. 25a is an elevation view of the vehicle suspension 50 shown in FIGS. 2 and 3.
Figure 25B:
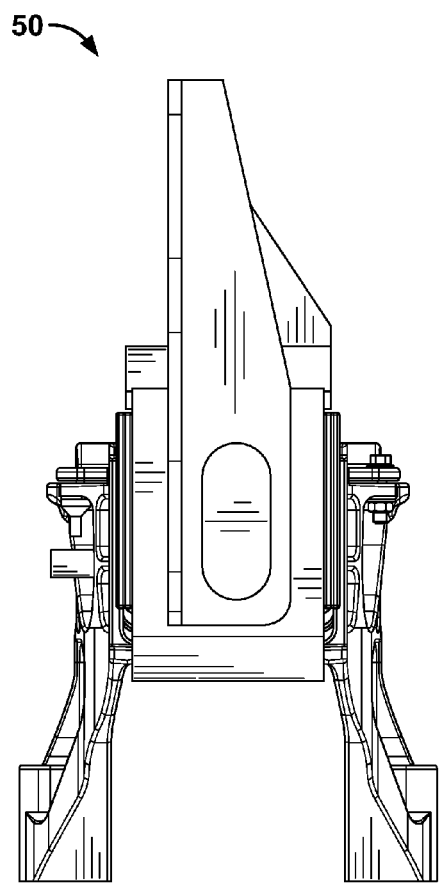
FIG. 25b is another elevation view of the vehicle suspension 50 shown in FIGS. 2 and 3.

FIGS. 25a and 25b are elevational views of vehicle suspension 50 shown in FIGS. 2 and 3.

Figure 26:
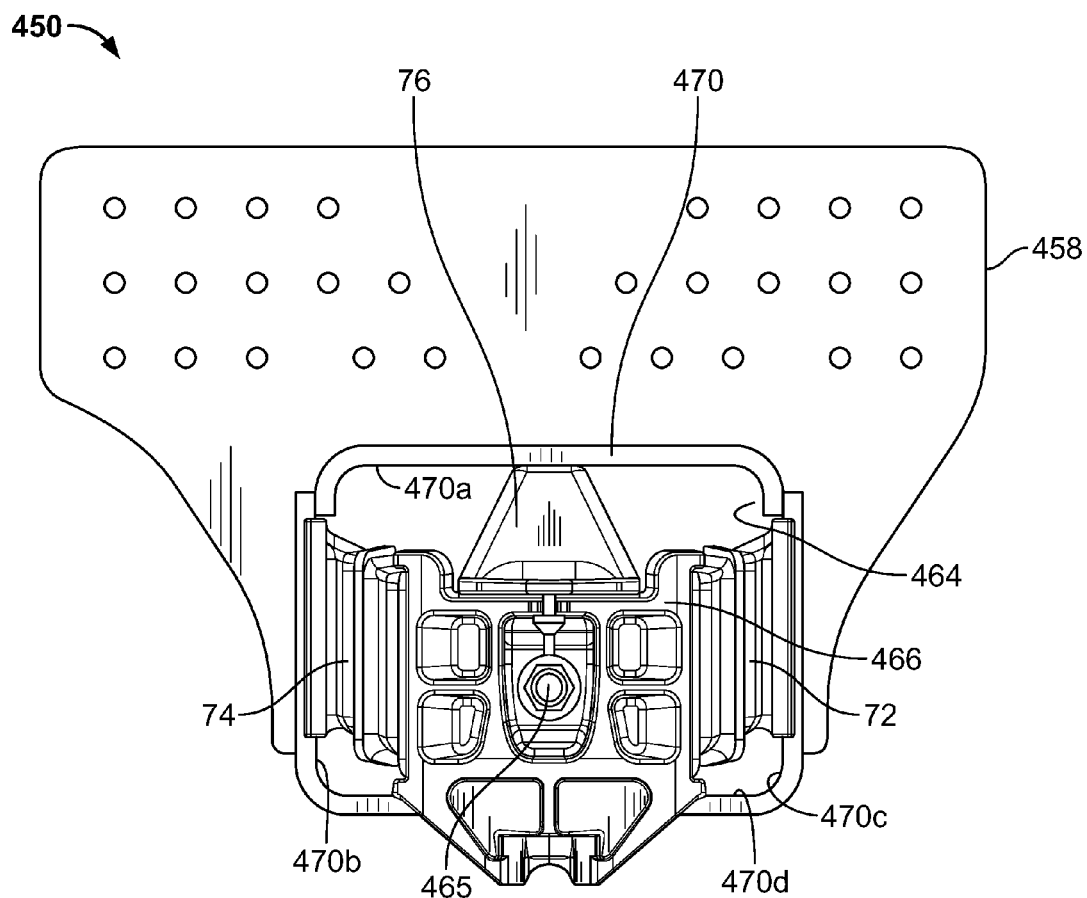
FIG. 26 is a view of an alternate embodiment showing vehicle suspension 450.

FIG. 26 illustrates an alternate embodiment showing vehicle suspension 450 having a frame attachment portion 458 attached to spring module 470, and having a single opening 464 defined by top wall 470a, side walls 470b and 470c, and bottom wall 470d. Shown positioned within opening 464 are first shear spring 72, second shear spring 74, and load cushion 76 which are the same as the shear springs and load cushion described in FIGS. 1-25 above. Also shown is spring mount 466 which includes separate inboard and outboard spring mount portions. A connecting rod 465 is used to draw the inboard and outboard spring mount portions of spring mount 466 together and to compress shear springs 72 and 74 between spring mount 466 and side walls 470c and 470b, respectively, of spring module 470. Drawing the inboard and outboard spring mount portions form V-shaped walls that abut the V-shaped walls of shear springs 72 and 74.

Figure 27:
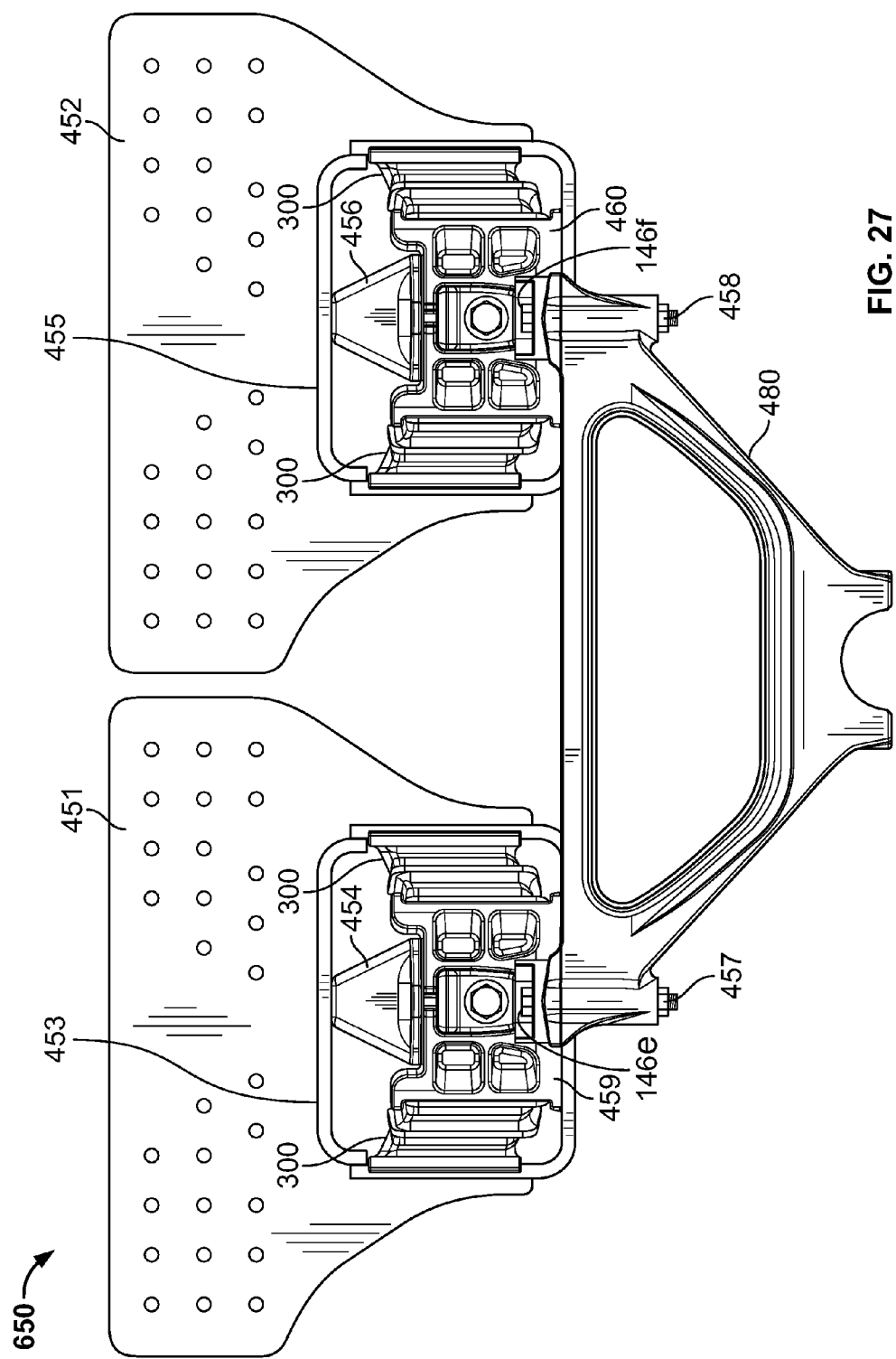
FIG. 27 is a view of vehicle suspension 650.

FIG. 27 illustrates a vehicle suspension 650 comprising a pair of frame attachment portions 451 and 452 that are attached to each other via a saddle 480. Frame attachment portions 451 and 452 include spring modules 453 and 455, respectively.

Spring module 453 includes a pair of shear springs 300 (as described above) that are retained in compression between opposing side walls of spring module 453 and a spring mount 459. Spring module 453 further includes a load cushion 454 that may be configured like any of load cushions 400, 400a, and 400b shown in one or more of FIGS. 14-20. Spring mount 459 may be configured like spring mount 766, described below with respect to FIG. 29, in that spring mount 459 may include a mounting bracket similar to mounting bracket 770 of spring mount 766. A threaded connecting rod 146e and nut 457 may be used to attach saddle 480 to the mounting bracket of spring mount 459.

Similarly, spring module 455 includes a pair of shear springs 300 (as described above) that are retained in compression between opposing side walls of spring module 455 and a spring mount 460. Spring module 455 further includes a load cushion 456 that may be configured like any of load cushions 400, 400a, and 400b shown in one or more of FIGS. 14-20. Spring mount 460 may be configured like spring mount 766, described below with respect to FIG. 29, in that spring mount 460 may include a mounting bracket similar to the mounting bracket 770 of spring mount 766. A threaded connecting rod 146f and nut 458 may be used to attach saddle 480 to the mounting bracket of spring mount 460.

Figure 28:
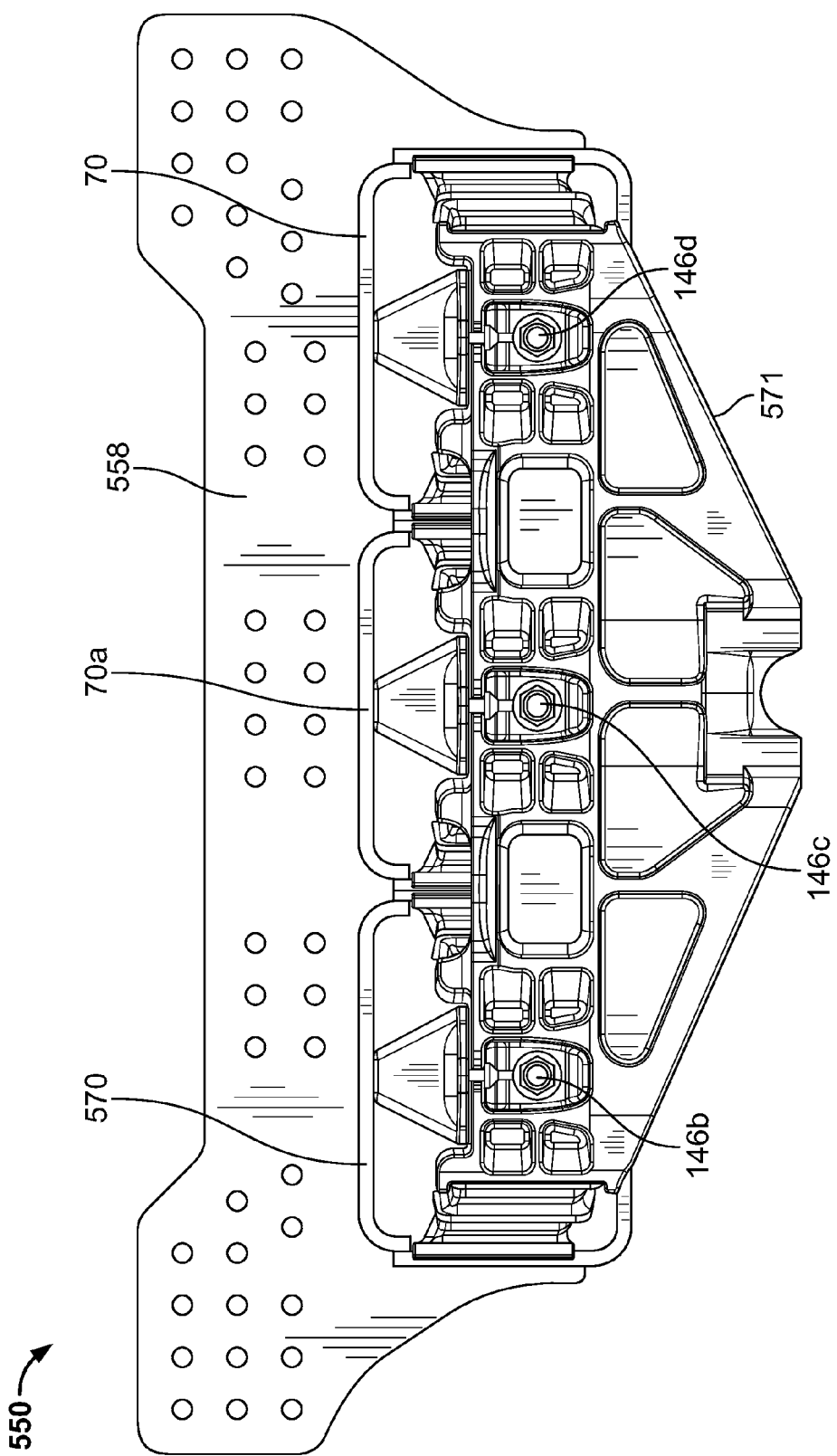
FIG. 28 is a view of an alternate vehicle suspension 550.

FIG. 28 illustrates an alternate vehicle suspension 550 having frame rail attachment portion 558 attached to first spring module 70 and second spring module 70a having shear springs, spring mounts and load cushions constructed in the same manner as described above with respect to FIGS. 1-25. Vehicle suspension 550 further includes a third spring module 570 adjacent to the second spring module 70a, wherein the shear springs, load cushion, and spring mount with spring module 570 are also constructed in the same manner as described above with respect to FIGS. 1-25.

Vehicle suspension 550 further includes a saddle assembly 571 comprising two separate saddles connected by connecting rods 146b, 146c, and 146d. Saddle assembly 571 includes six V-shaped walls for compressing each of one of the six shear springs contained within vehicle suspension 550 as those V-shaped walls are formed by tightening nuts onto connecting rods 146b, 146c, and 146d. Loosening the nuts on those connecting rods, preferably in a staged and staggered manner, allows for removing the compressive forces placed on the six shear springs contained within vehicle suspension 550.

Figure 29:
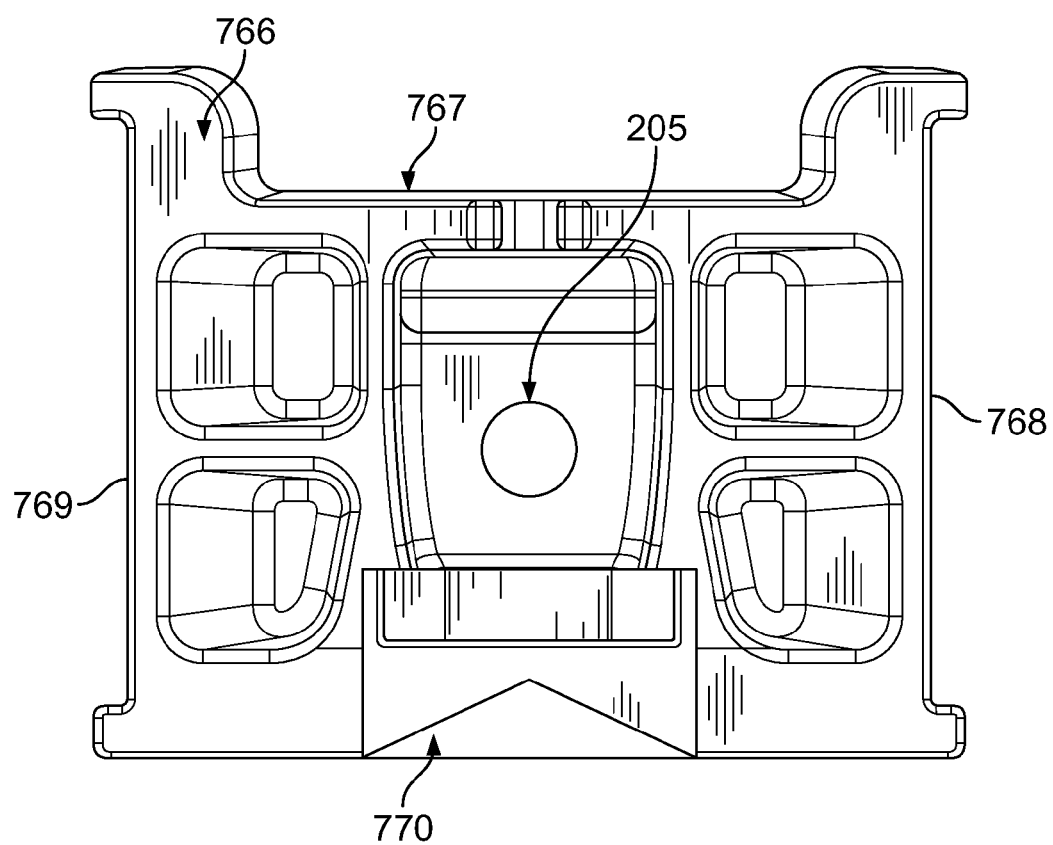
FIG. 29 is a view of a spring mount.

FIG. 29 illustrates a spring mount 766 having a through-hole 205, a load cushion mounting surface 767, and V-shaped walls 768 and 769. Spring mount 766 is a spring mount that is not integrally connected to a saddle as is the case with spring mount 66 shown in FIGS. 1-25. However, spring mount 766 does use a connecting rod to draw together an inboard part and an outboard part of the spring mount in the same manner as shown in one or more of FIGS. 1-25 and described above. Spring mount 766 may be used in connection with the shear springs and load cushion shown in one or more of FIGS. 1-25 and described above. However, spring mount 766 is instead attached to a saddle using mounting bracket 770. Thus, as is known in the art, the spring mount 766 may be attached to a saddle, for example, in the manner described in U.S. Pat. No. 7,926,836.

Figure 30:
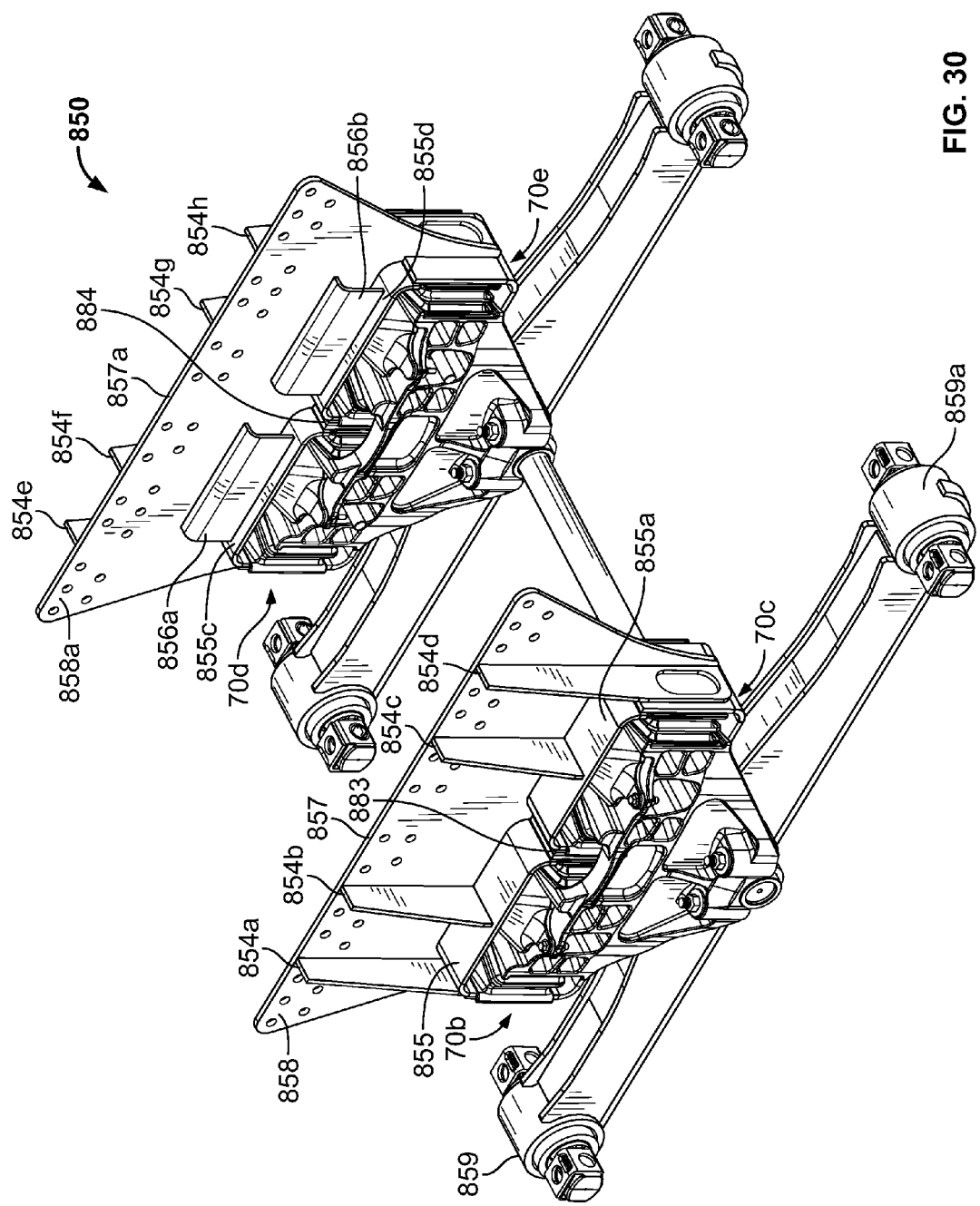
FIG. 30 is a perspective view of another example vehicle suspension.

FIG. 30 illustrates vehicle suspension 850. Vehicle suspension 850 comprises a saddle assembly similar to the saddle assembly 90 of vehicle suspension 50, shear springs similar to the shear spring 300 described above, and load cushions similar to any of the load cushions 400, 400a, and 400b described above. Vehicle suspension 850 has some notable differences when compared to vehicle suspension 50. Those differences include: (i) frame rail attachment portions 858 and 858a have geometries that differ from the geometries of frame rail attachment portions 58 and 58a, (ii) the set of gussets including gussets 854a, 854b, 854c, 854d, 854e, 854f, 854g, and 854h have geometries that differ from the geometries of set of gussets including gussets 62a, 62b, 62c, 62d, 62e, and 62f, and (iii) vehicle suspension 850 includes frame hanger attachment portion strengtheners, such as strengtheners 856a and 856b, on an inboard side of its frame rail attachment portions.

Furthermore, a filler plate 883 is attached between adjacent spring modules 70b and 70c of vehicle suspension 850, and a filler plate 884 is attached between spring modules 70d and 70e of vehicle suspension 850. Each side wall of a lower U-plate that is adjacent to filler plates 883 or 884 and that forms a part of an openings of spring modules 70b, 70c, 70d, or 70e may include 2 weld-slots through which weld beads for welding that side wall to the adjacent filler plate. Each of those weld-slots may have the size and shape of weld-slot 81 described above.

Frame hanger attachment portion strengtheners are typically used in embodiments in which the distances between the tops of the spring module (e.g., tops 855, 855a) and the top edge of the frame attachment portions (e.g., edges 857), and the distance between spring module tops 855c, 855d and the top edge 857a, exceed a given threshold distance.

In FIG. 30, the top edges 857 and 857a are straight, and walking beam ends 859 and 859a are identified. In accordance with a first embodiment in which vehicle suspension 850 is installed in a vehicle, walking beam end 859 is closer to a front end of the vehicle than walking beam end 859a. In accordance with a second embodiment in which vehicle suspension 850 is installed in a vehicle, walking beam end 859a is closer to the front end of the vehicle than walking beam end 859.

Figure 31:
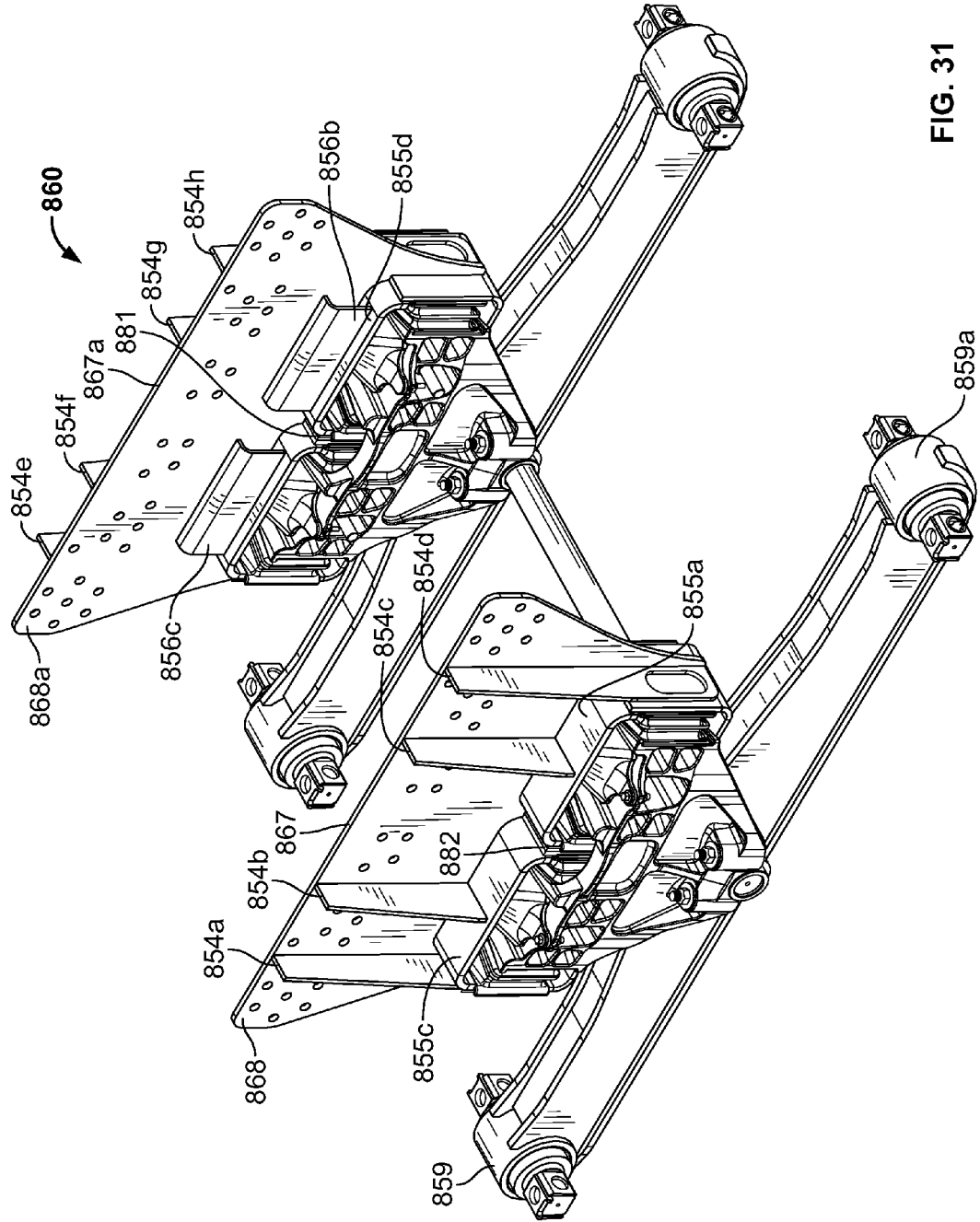
FIG. 31 is a perspective view of another example vehicle suspension.

FIG. 31 illustrates vehicle suspension 860, which is the same as vehicle suspension 850 shown in FIG. 30, except that frame rail attachment portions 868 and 868a have geometries that differ from the geometries of frame rail attachment portions 858 and 858a. Those geometries may differ, at least in part, because the geometries have different patterns and/or quantities of frame rail attachment holes between the frame hanger attachment portion strengtheners and the top edges of the frame hanger attachment portions.

In FIG. 31, the top edges 867 and 867a are straight, and walking beam ends 859 and 859a are identified. In accordance with a first embodiment in which vehicle suspension 860 is part of a vehicle, walking beam end 859 is closer to a front end of the vehicle than walking beam end 859a. In accordance with a second embodiment in which vehicle suspension 860 is part of a vehicle, walking beam end 859a is closer to the front end of the vehicle than walking beam end 859.

Figure 33:
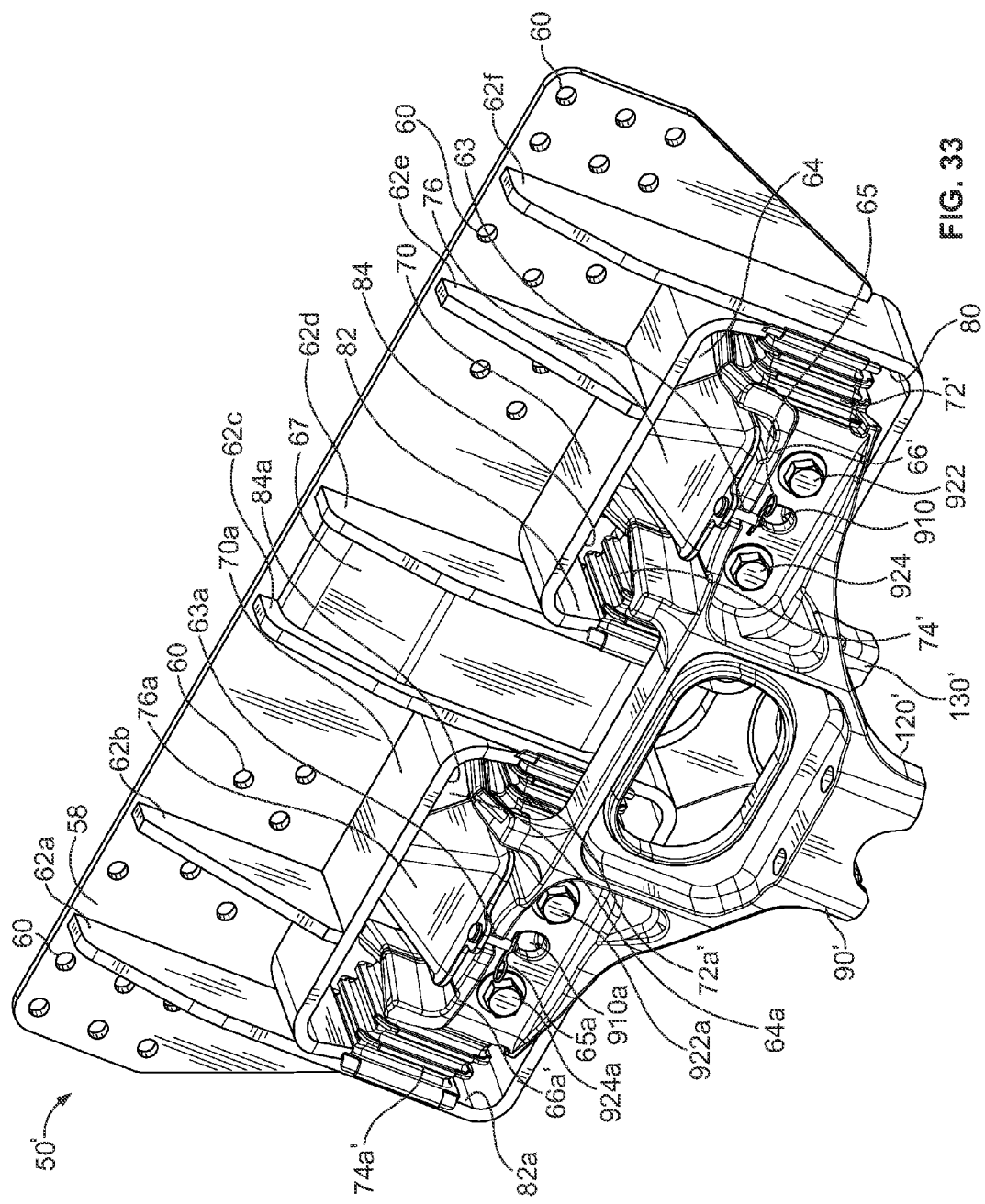
FIG. 33 is a perspective outboard view of vehicle suspension 50' which is a modified version of vehicle suspension 50 shown in FIG. 2.

FIG. 33 is a perspective outboard view of vehicle suspension 50' which is a slightly modified version of the vehicle suspension 50 shown in FIGS. 1-3. In FIGS. 33-36, the same numerals will be used to identify the same or similar components of the vehicle suspension 50 in FIG. 1, and different numerals or prime numbers will be used to denote differences between the vehicle suspension 50 shown in FIGS. 1-3 and the vehicle suspension 50' shown in FIGS. 33-36.

The vehicle suspension 50' shown in FIGS. 33-36 may be used as a substitute for the vehicle suspension 50 or vehicle suspension 50a shown in FIG. 1. Therefore, the vehicle suspension 50' has a frame attachment 58 that is adapted for attachment to a vehicle frame or frame rail. Vehicle suspension 50' could be attached to walking beam 78 positioned beneath the vehicle suspension 50 in FIG. 1. In addition, vehicle suspension 50' could also be substituted for vehicle suspension 50a as it is adapted for attachment to a vehicle frame or frame rail on a side of the vehicle opposite the side to which vehicle suspension 50 is attachable to a vehicle frame or frame rail, with the term vehicle including a motorized vehicle or trailer.

Vehicle suspension 50' includes frame rail attachment holes 60 of frame attachment portion 58 that are adapted for attaching frame attachment portion 58 to a vehicle frame or frame rail (not shown) using, for example, connecting rods, such as mounting bolts. Vehicle suspension 50' includes gussets 62a-f extending perpendicularly from the frame rail attachment portion 58 to provide additional support and rigidity to vehicle suspension 50'.

A spring module 70 is attached to frame rail attachment portion 58. Spring module 70 includes an opening 64. Positioned within opening 64 are (i) at least a part of a spring mount 66', (ii) at least a part of a first shear spring 72' positioned between a first side wall of the spring mount 66' and a side wall 80 of spring module 70, (iii) at least a part of a second shear spring 74' positioned between a second side wall of the spring mount 66' and a second side wall 82 of spring module 70, and (iv) at least a part of a load cushion 76 positioned on top of spring mount 66' and beneath the top wall 84 of spring module 70.

Similarly, but adjacent to spring module 70, a spring module 70a is attached to frame rail attachment portion 58. Spring module 70a includes an opening 64a. Positioned within opening 64a are (i) at least a part of a spring mount 66a', (ii) at least a part of a shear spring 72a' positioned between a first side wall of the spring mount 66a' and a side wall 80a of spring module 70a, (iii) at least a part of a shear spring 74a' positioned between a second side wall of the spring mount 66a' and a side wall 82a of spring module 70a, and (iv) at least a part of a load cushion 76a positioned on top of spring mount 66a' and beneath the top wall 84a of spring module 70a.

Vehicle suspension 50' shown in FIG. 33 further includes a through-hole 910 and a through-hole 910a that extend through both the outboard saddle 120' and inboard saddle 130' of saddle assembly 90'. The upper portions of the outboard saddle 120' and inboard saddle 130' are connected together and form spring mounts 66' and 66a'. The outboard saddle 120' and the inboard saddle 130' may be drawn together in the same manner described above in the description of FIGS. 21a and 21b using threaded rods 146 and 146a shown in FIG. 6. The threaded rods may be a bolt, screw, or other suitable fastener and may be used to connect the saddles together. Alternately, the outboard saddle 120' and inboard saddle 130' may be drawn together using a press, such as a pneumatic or hydraulic press, or weighted device.

Once the outboard saddle 120' and inboard saddle 130' are drawn together and connected by threaded rods 146 and 146a, then connecting rods 922 and 924 which are positioned on the sides of through hole 910 are used to hold the inboard and outboard portions of spring mount 66' together, and connecting rods 922a and 924a which are positioned on the sides of through hole 910a are used to hold the inboard and outboard portions of spring mount 66a' together. Connecting rods 922, 924, and 922a and 924a are shown in FIG. 33-36 as threaded bolts that extend all the way through the outboard saddle 120' and the inboard saddle 130'. Nuts are used on the inboard side of the saddle assembly 90'; however, the nuts could also be used on the outboard side of the saddle assembly 90'. In addition, connecting rods 922, 924, and 922a and 924a could also extend through either outboard saddle 120' or inboard saddle 130' and thread into a tapped hole in the other saddle, and therefore do not need to extend through both outboard saddle 120' and inboard saddle 130'.

Furthermore, the connecting rods 922, 924, and 922a and 924a are shown as threaded in FIGS. 33-36, but are not required to be. For example, the connecting rods 922, 924, and 922a and 924a could comprise a non-threaded rod held in place by a cotter pin in a manner similar to rod 63 that holds load cushion 76 in position on spring mount 66' with cotter pin 65 or rod 63a that holds load cushion 76a in position on spring mount 66a' with cotter pin 65a. Moreover, connecting rods are not required to have round cross-section, but the connecting rods could also have an oval, square, rectangular, polygonal, or other geometric cross-section. In a preferred embodiment the connecting rods may comprise an M20 fine pitch fastener 10.9 class or grade.

As shown in FIGS. 33-36, after connecting rods 922, 924, and 922a and 924a have connected the outboard saddle 120' and 130' together, the threaded rods 146 and 146a used to drawn the outboard saddle 120' and inboard saddle 130' together may be removed. Alternatively, the threaded rods 146 and 146a may remain in place. In addition, while two connecting rods are used in connection with a spring mount, it is possible to include only one connecting rod or additional connecting rods as desired, provided that they provide sufficient strength to hold outboard saddle 120' and inboard saddle 130' together during operation.

An additional difference between vehicle suspension 50' and vehicle suspension 50 is that vehicle suspension 50' includes gusset spacer 67 positioned between gussets 62c and 62d that provides additional strength and rigidity to the vehicle suspension 50'. However, gusset spacer 67 could also be used on vehicle suspension 50 if desired.

Figure 34:
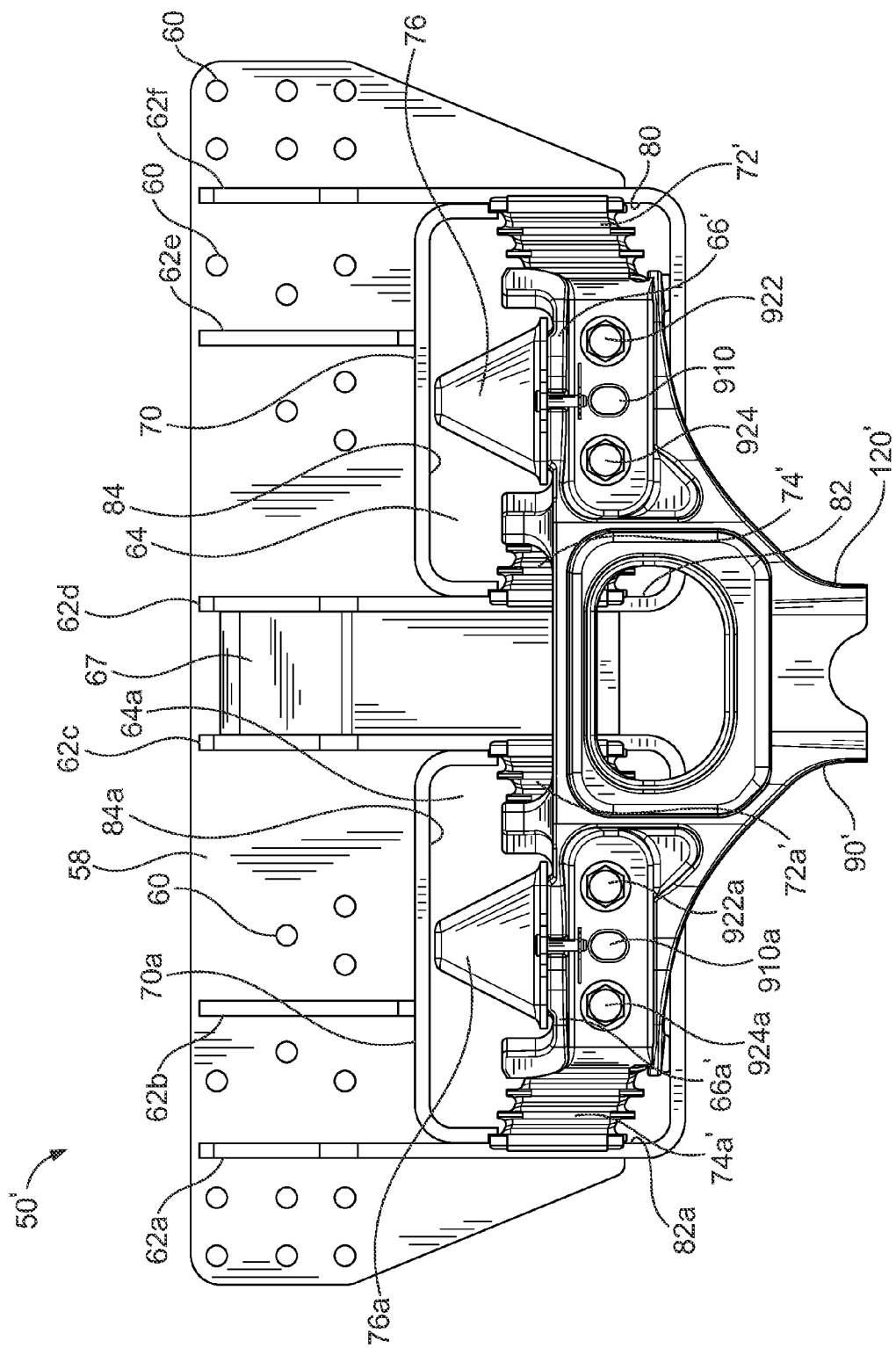
FIG. 34 is an outboard view of the vehicle suspension 50' shown in FIG. 33.

FIG. 34 shows an outboard view of vehicle suspension 50' shown in FIG. 33. Spring module 70 is shown attached to frame rail attachment portion 58. Spring module 70 includes an opening 64. Positioned within at least a portion of opening 64 are (i) a spring mount 66', (ii) a shear spring 72' positioned between a first side wall of spring mount 66' and a first side wall 80 of opening 64, (iii) a shear spring 74' positioned between a second side wall of spring mount 66' and a side wall of 82 of opening 64, and (iv) a load cushion 76 positioned on top of spring mount 66' and beneath a top wall 84 of opening 64.

A second spring module 70a is positioned adjacent spring module 70 and is also attached to frame rail attachment portion 58. Spring module 70a includes an opening 64a. Positioned within at least a portion of opening 64a are (i) a spring mount 66a', (ii) a third shear spring 72a' positioned between a first side wall of spring mount 66a' and a side wall 80a of opening 64a, (iii) a fourth shear spring 74a' positioned between a second side wall of the spring mount 66a' and a second side wall 82a of opening 64a, and (iv) a load cushion 76a positioned on top of spring mount 66a' and beneath a top wall 84a of opening 64a. Connecting rods 922 and 924 are shown positioned on the sides of through hole 910 and are used to hold the inboard and outboard portions of spring mount 66' together, and connecting rods 922a and 924a are shown positioned on the sides of through hole 910a and are used to hold the inboard and outboard portions of spring mount 66a' together.

Figure 35:
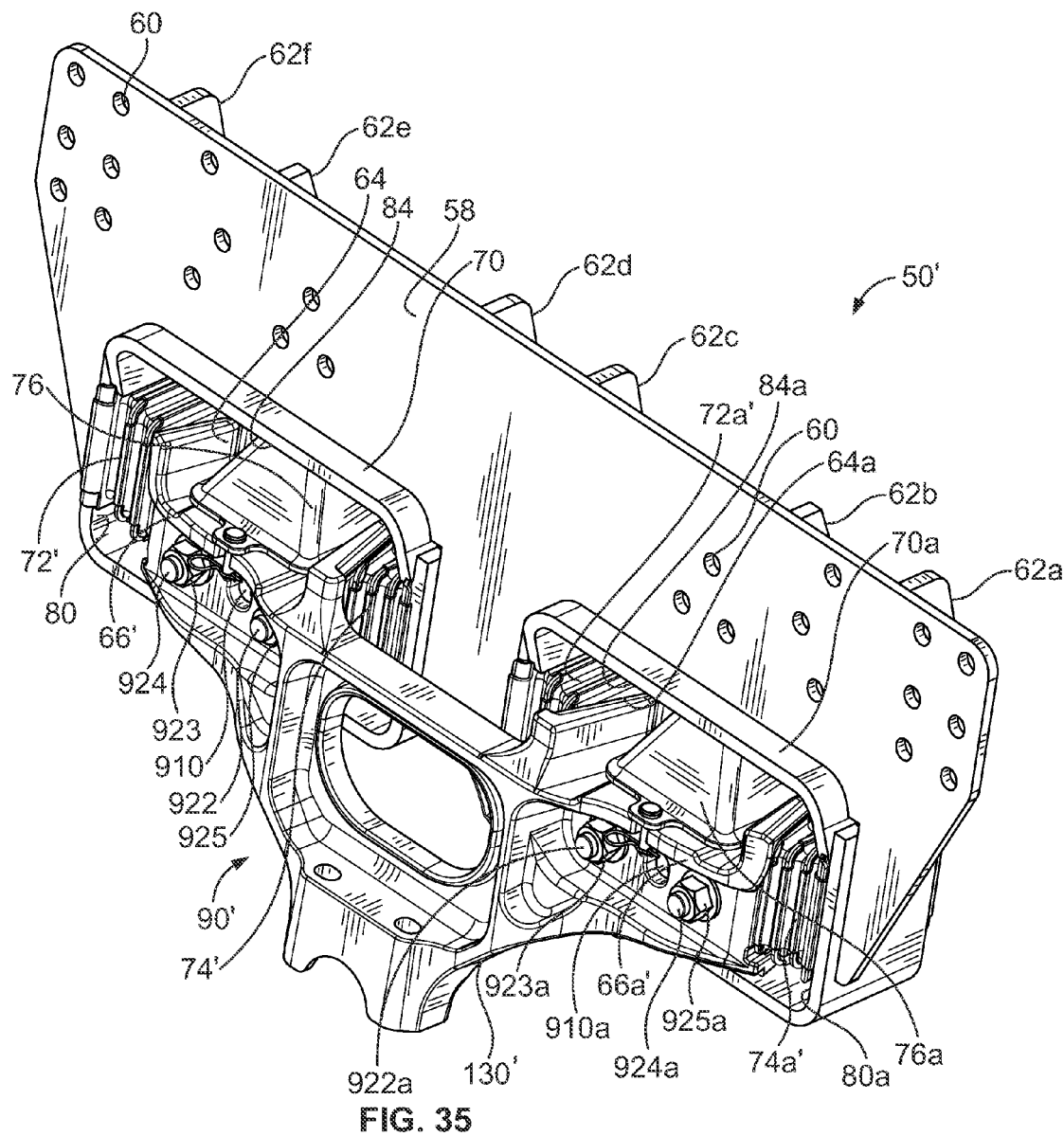
FIG. 35 is a perspective inboard view of vehicle suspension 50' shown in FIGS. 33 and 34.

FIG. 35 is a perspective inboard view of vehicle suspension 50' shown in FIGS. 33 and 34. Vehicle suspension 50' includes frame rail attachment holes 60 of frame attachment portion 58 that are adapted for attaching frame attachment portion 58 to a vehicle frame or frame rail (not shown) using, for example, connecting rods, such as mounting bolts. Vehicle suspension 50' includes gussets 62a-f extending perpendicularly from the frame rail attachment portion 58 to provide additional support and rigidity to vehicle suspension 50'.

A spring module 70 is attached to frame rail attachment portion 58. Spring module 70 includes an opening 64. Positioned within opening 64 are (i) at least a part of a spring mount 66', (ii) at least a part of a first shear spring 72' positioned between a first side wall of the spring mount 66' and a side wall 80 of spring module 70, (iii) at least a part of a second shear spring 74' positioned between a second side wall of the spring mount 66' and a second side wall of spring module 70, and (iv) at least a part of a load cushion 76 positioned on top of spring mount 66' and beneath the top wall 84 of spring module 70.

Similarly, but adjacent to spring module 70, a spring module 70*a* is attached to frame rail attachment portion 58. Spring module 70*a* includes an opening 64*a*. Positioned within opening 64*a* are (i) at least a part of a spring mount 66*a*', (ii) at least a part of a shear spring 72*a*' positioned between a first side wall of the spring mount 66*a*' and a side wall 80*a* of spring module 70*a*, (iii) at least a part of a shear spring 74*a*' positioned between a second side wall of the spring mount 66*a*' and a side wall 82*a* of spring module 70*a*, and (iv) at least a part of a load cushion 76*a* positioned on top of spring mount 66*a*' and beneath the top wall 84*a* of spring module 70*a*.

Vehicle suspension 50' shown in FIG. 35 further includes a through-hole 910 and a through-hole 910*a* that extend through both the outboard saddle 120' (shown in FIG. 33) and inboard saddle 130' of saddle assembly 90'. The upper portions of the outboard saddle 120' (shown in FIG. 33) and inboard saddle 130' are connected together. The outboard saddle 120' and the inboard saddle 130' may be drawn together in the same manner described above in the description of FIGS. 21*a* and 21*b* using threaded rods 146 and 146*a* shown in FIG. 6. The threaded rod may be a bolt, screw, or other suitable fastener and may be used to connect the saddles together.

Once the outboard saddle 120' and inboard saddle 130' are drawn together and connected by threaded rods 146 and 146*a*, then connecting rods 922 and 924 which are positioned on the sides of through hole 910 are used to hold the inboard and outboard portions of spring mount 66' together, and connecting rods 922*a* and 924*a* which are positioned on the sides of through hole 910*a* are used to hold the inboard and outboard portions of spring mount 66*a*' together. Connecting rods 922, 924, and 922*a* and 924*a* are shown in FIG. 33-36 as threaded bolts that extend all the way through the outboard saddle 120' and the inboard saddle 130'. Nuts 923 and 925, and 923*a* and 925*a* are shown used on the inboard side of the saddle assembly 90'; however, the nuts could also be used on the outboard side of the saddle assembly 90'. In addition, connecting rods 922, 924, and 922*a* and 924*a* could also extend through either outboard saddle 120' or inboard saddle 130' and thread into a tapped hole in the other saddle, and therefore do not need to extend through both outboard saddle 120' and inboard saddle 130'.

Figure 36:
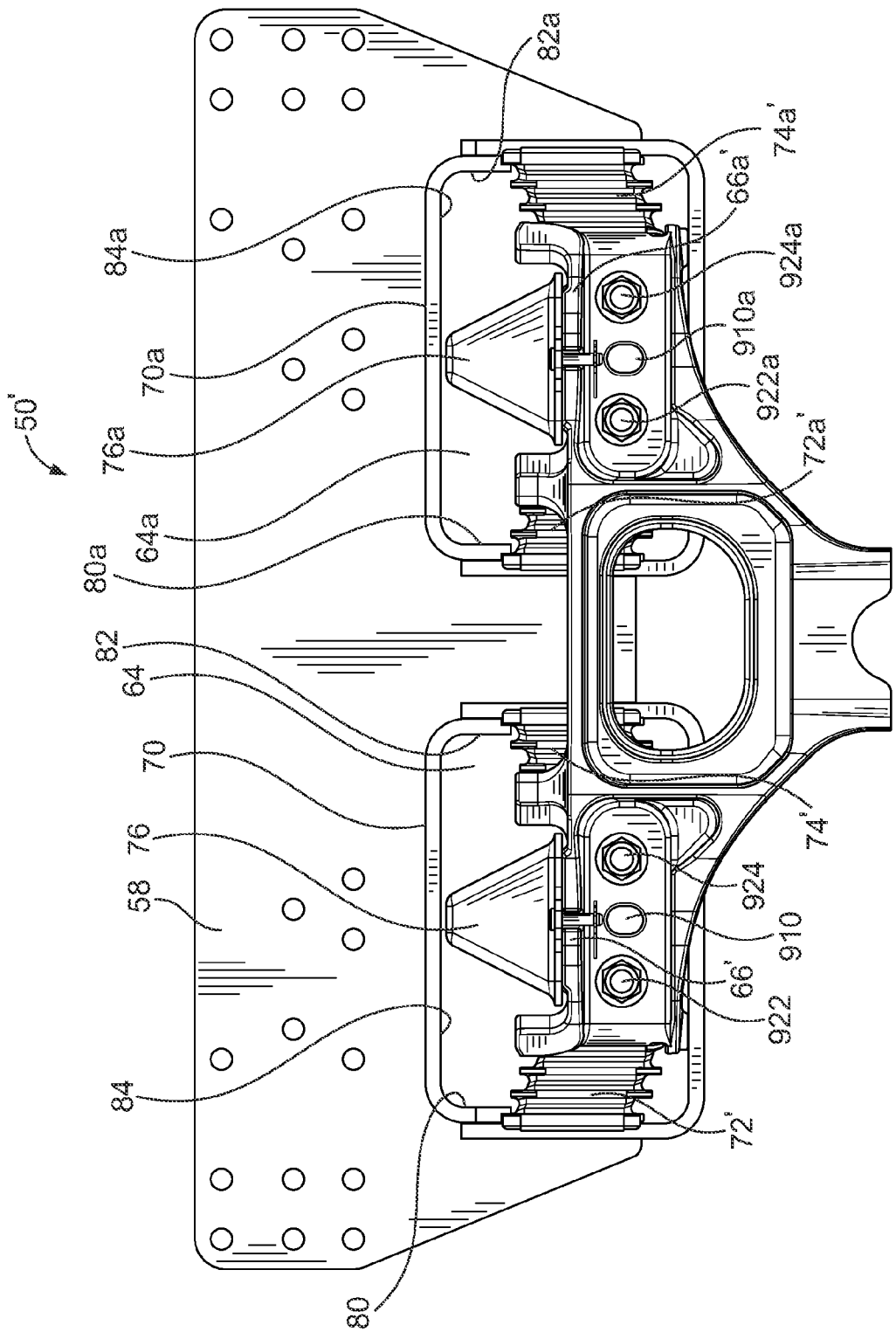
FIG. 36 is an inboard view of the vehicle suspension 50' shown in FIG. 35.

FIG. 36 shows an inboard view of vehicle suspension 50' shown in FIGS. 33-35. Spring module 70 is shown attached to frame rail attachment portion 58. Spring module 70 includes an opening 64. Positioned within at least a portion of opening 64 are (i) a spring mount 66', (ii) a shear spring 72' positioned between a first side wall of spring mount 66' and a first side wall 80 of opening 64, (iii) a shear spring 74' positioned between a second side wall of spring mount 66' and a side wall of 82 of opening 64, and (iv) a load cushion 76 positioned on top of spring mount 66' and beneath a top wall 84 of opening 64.

A second spring module 70*a* is positioned adjacent spring module 70 and is also attached to frame rail attachment portion 58. Spring module 70*a* includes an opening 64*a*. Positioned within at least a portion of opening 64*a* are (i) a spring mount 66*a*', (ii) a third shear spring 72*a*' positioned between a first side wall of spring mount 66*a*' and a side wall 80*a* of opening 64*a*, (iii) a fourth shear spring 74*a*' positioned between a second side wall of the spring mount 66*a*' and a second side wall 82*a* of opening 64*a*, and (iv) a load cushion 76*a* positioned on top of spring mount 66*a*' and beneath a top wall 84*a* of opening 64*a*. Connecting rods 922 and 924 are shown positioned on the sides of through hole 910 and are used to hold the inboard and outboard portions of spring mount 66' together, and connecting rods 922*a* and 924*a* are shown positioned on the sides of through hole 910*a* and are used to hold the inboard and outboard portions of spring mount 66*a*' together.

Figure 37:
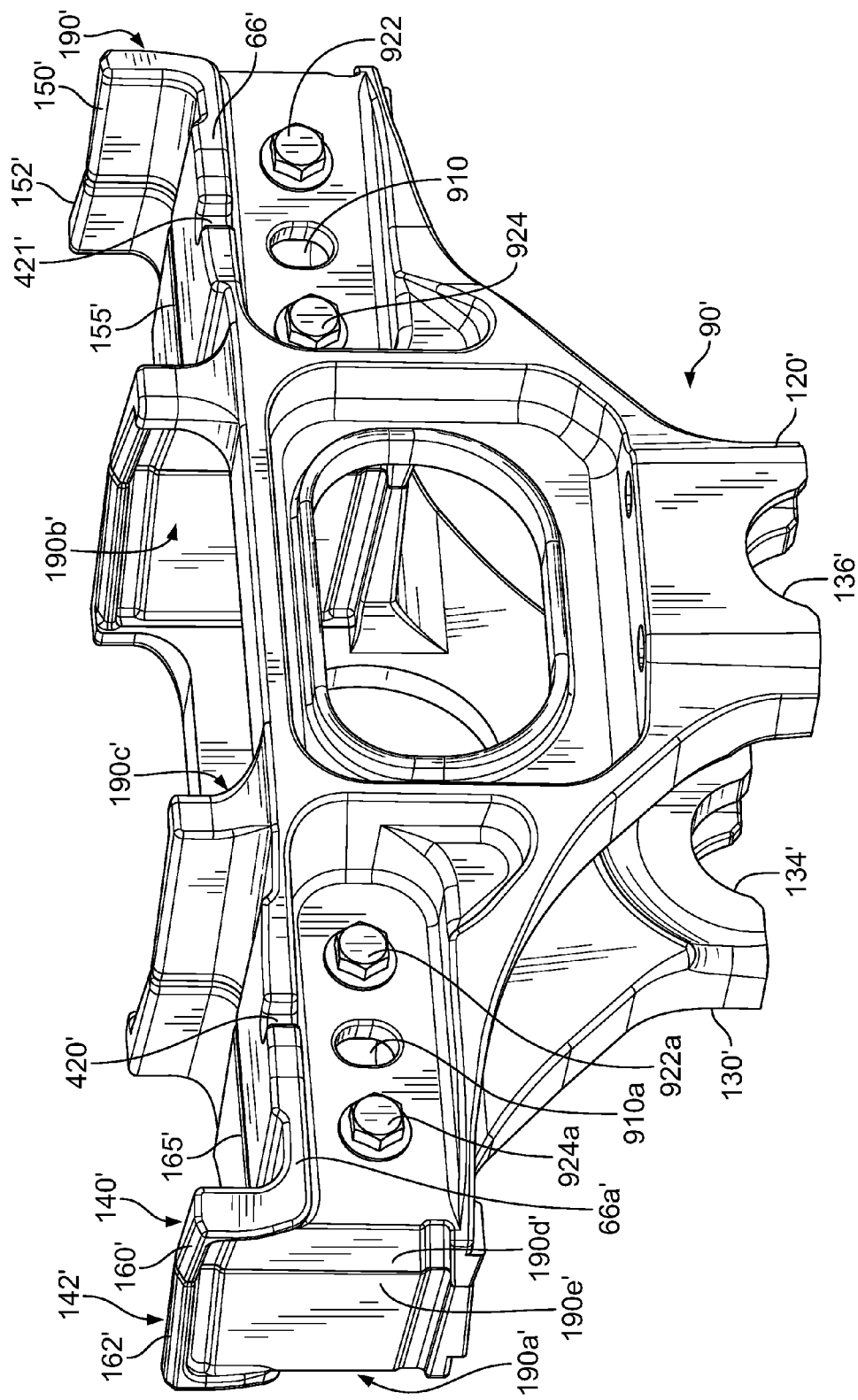
FIG. 37 is a perspective view of a saddle assembly shown in FIGS. 33-36.
Figure 38:
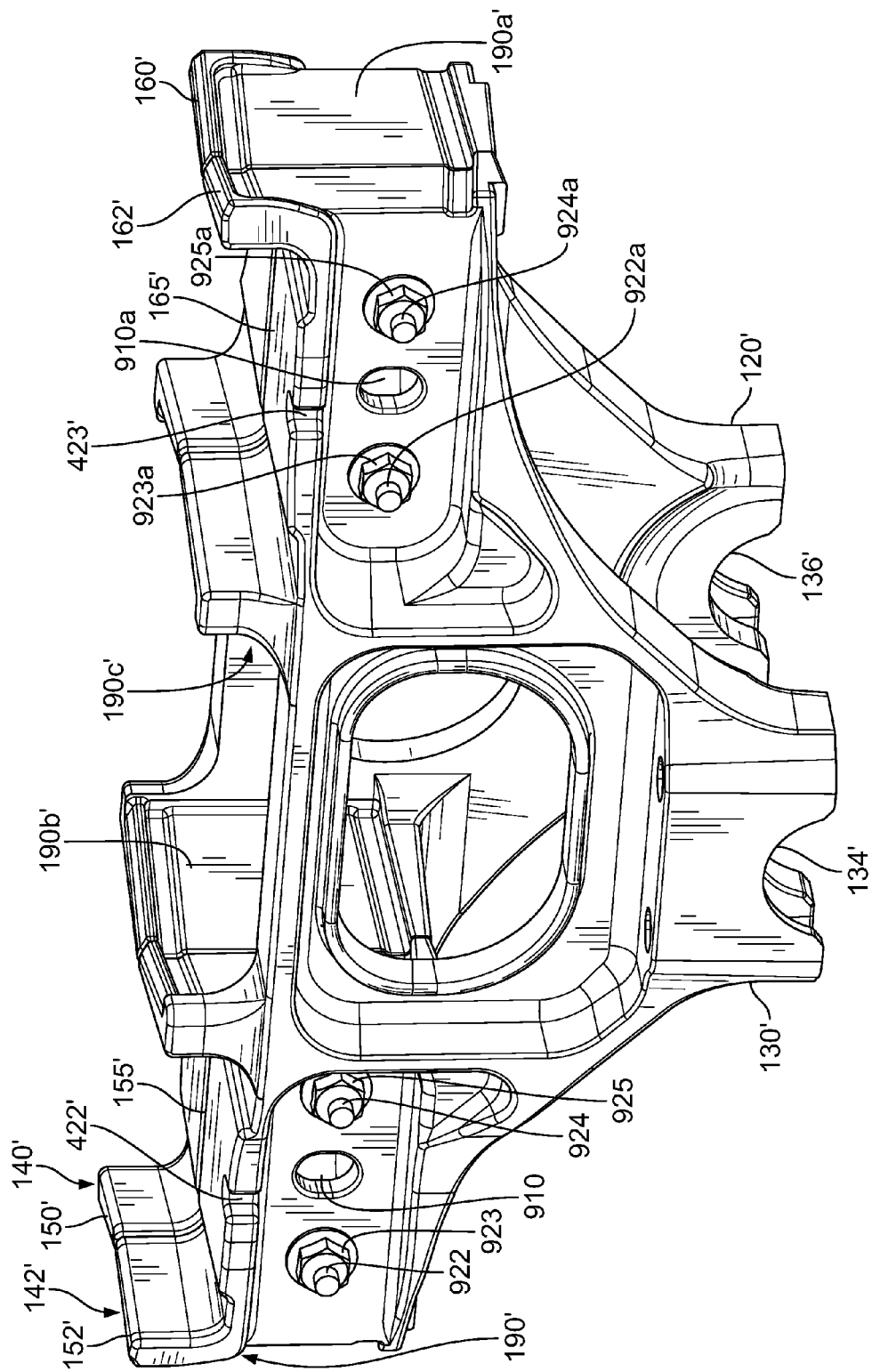
FIG. 38 is another perspective view of the saddle assembly shown in FIG. 37.
Figure 39:
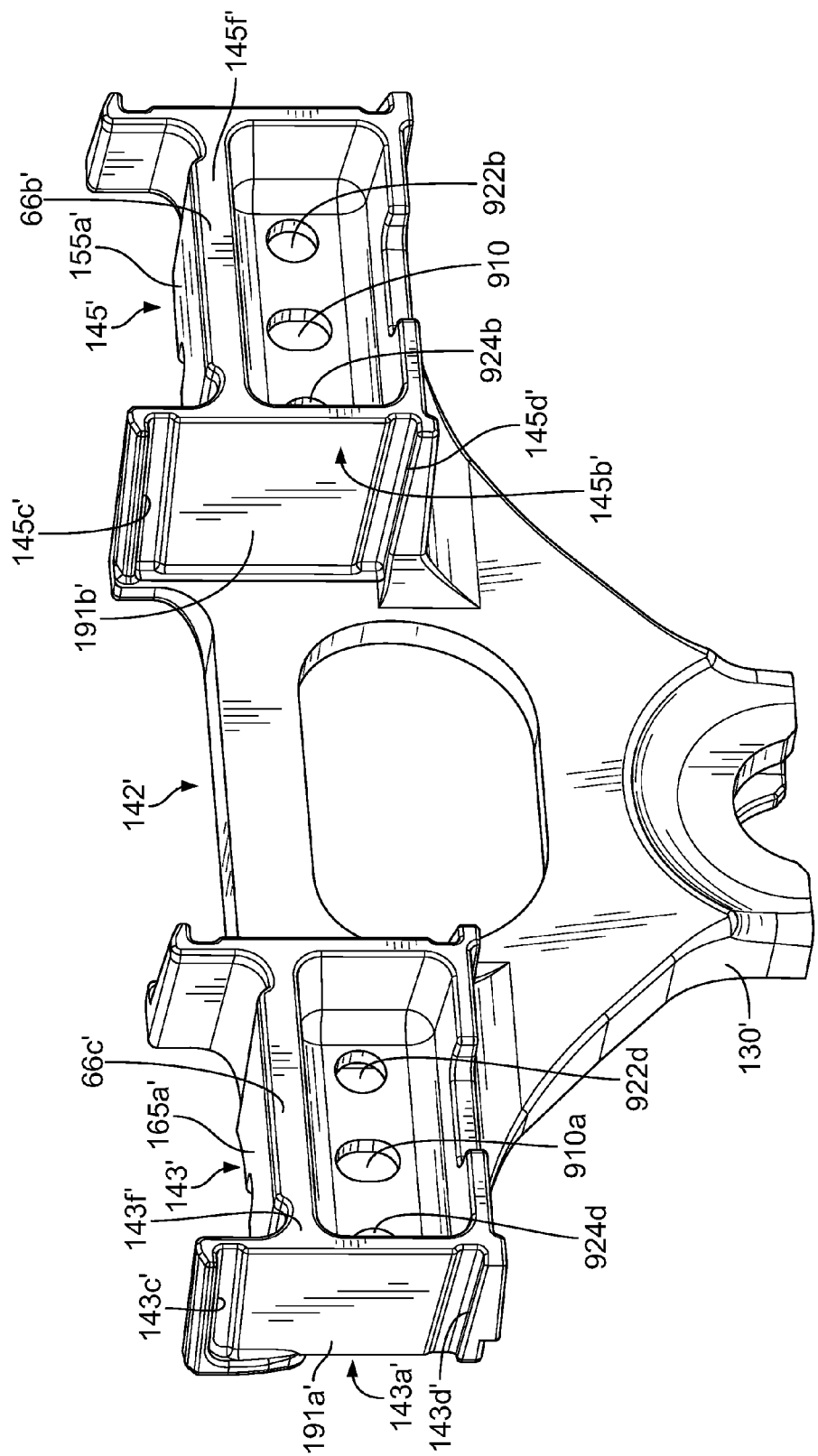
FIG. 39 is a perspective view of a portion of the saddle assembly shown in FIGS. 37 and 38.
Figure 39A:
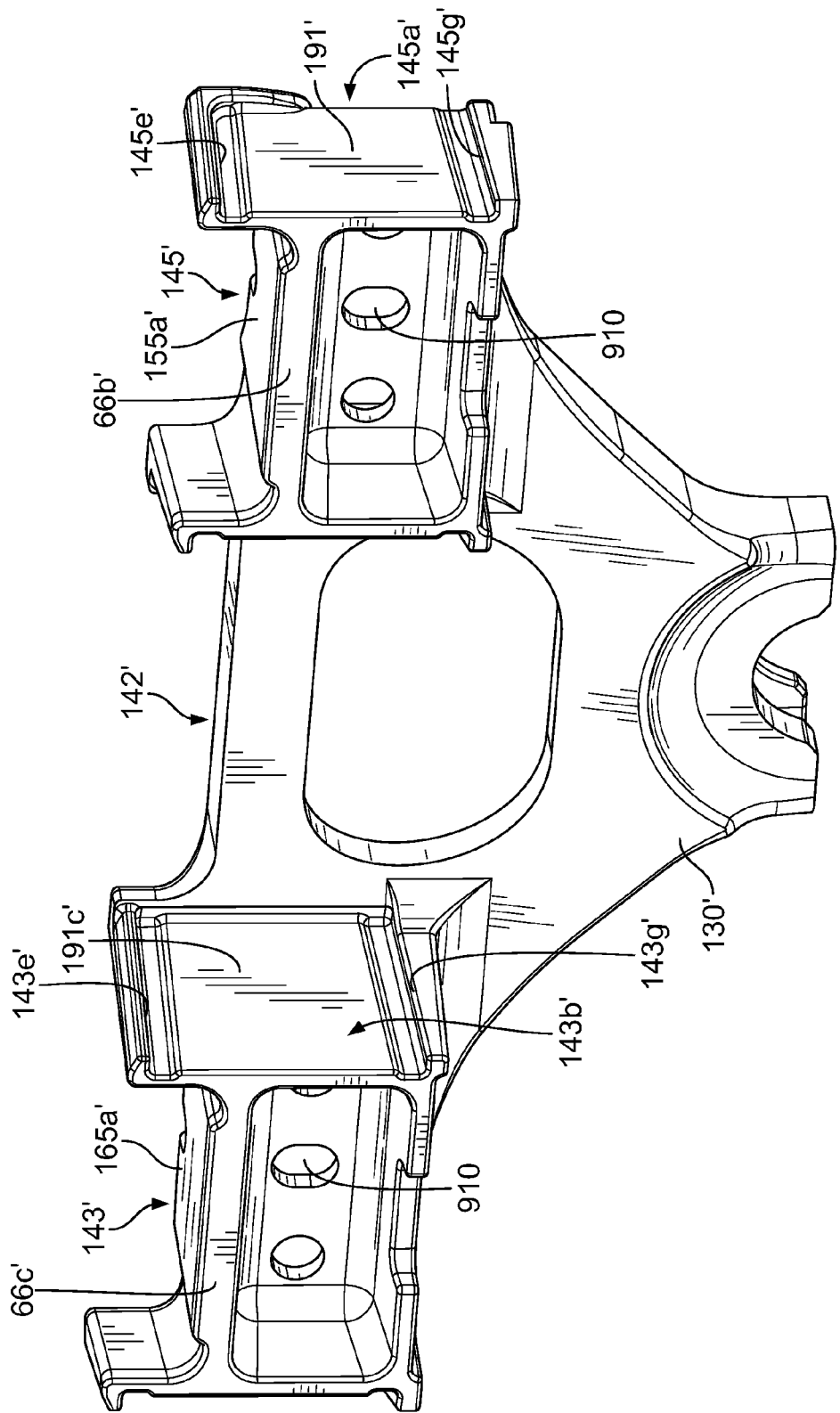
FIG. 39A is another perspective view of the portion of the saddle assembly shown in FIGS. 37 and 38.

FIGS. 37 and 38 are perspective views of a saddle assembly 90' that is shown in FIGS. 33-36 and that comprises an outboard saddle 120' and an inboard saddle 130'. FIGS. 39 and 39A are perspective views of inboard saddle 130'. In accordance with the embodiments described herein, inboard saddle 130' may be identical to outboard saddle 120'. Alternatively, inboard saddle 130' may be identical to outboard saddle 120' except that the mounting holes 910 and 910*a* through which threaded rods 146 and 146*a* are installed in one of those saddles may be tapped holes and the mounting holes in the other saddle may be untapped holes. Similarly, holes for connecting rods 922 and 924, or 922*a* or 924*a* may also extend all the way through, or may comprise tapped holes.

Saddles 120', 130' each include upper and bottom portions. Each upper portion of saddles 120', 130' includes two spring mount portions. Each of the two spring mount portions of saddle 120' interface to corresponding spring mount portions of saddle 130' to form respective spring mounts 66' and 66*a*'. The bottom portion of outboard saddle 120' includes a bottom mount section 136', and the bottom portion of inboard saddle 130 includes a bottom mount section 134'. Those bottom mount sections may be conical, spherical, or wedge shaped, and may form a mechanical joint when attached to a walking beam as is known in the art. Furthermore, the bottom portions of outboard saddle 120' and inboard saddle 130' may be similar to the bottom portions of saddles disclosed in U.S. Pat. No. 7,926,836.

As shown in one or more of FIGS. 37, 38, 39, and 39A, the upper portion of outboard saddle 120' is identified as upper portion 140', and the upper portion of inboard saddle 130' is identified as upper portion 142'. As shown in FIG. 39 and/or FIG. 39A, upper portion 142' includes a spring mount portion 143' and a spring mount portion 145'. Spring mount portion 143' includes spring mount side portions 143*a*' and 143*b*' and spring mount portion interface 143*f*. Similarly, spring mount portion 145' includes spring mount side portions 145*a*' and 145*b*' and spring mount portion interface 145*f*'. Each spring mount side portion of upper portions 140' and 142' includes a pair of flanges and a tapered surface.

As shown in FIG. 39, spring mount side portion 143*a*' includes flanges 143*c*' and 143*d*' and tapered surface 191*a*', and spring mount side portion 145*b*' includes flanges 145*c*' and 145*d*' and tapered surface 191*b*'. As shown in FIG. 39A, spring mount side portion 143*b*' includes flanges 143*e*' and 143*g*' and tapered surface 191*c*', and spring mount side portion 145*a*' includes flanges 145*e*' and 145*g*' and tapered surface 191'.

Upper portions 140', 142' of saddles 120', 130' include a number of significant advantages over the saddles and saddle assemblies shown in U.S. Pat. No. 7,926,836. As one example, the upper portions 140', 142' of saddles 120', 130' may be drawn together (e.g., drawn in contact with each other) by threaded rods 146 and 146*a* (shown in FIGS. 21*a* and 21*b*). Of course, a press such as a pneumatic or hydraulic press could be used to draw the upper portions 140' and 142' together. In that way, spring mount portion interface 143*f* is drawn into contact with a corresponding spring mount portion interface on upper portion 140' and spring mount portion interface 145f' is drawn into contact with another corresponding spring mount portion interface on upper portion 140'.

In accordance with this design, the upper portions 140', 142' may serve as spring mounts. In particular, the upper portions 140', 142' include first ends 150', 152' thereof that together form first load cushion mounting surface 155' on first spring mount 66' that is adapted to have a first load cushion mounted thereon. Similarly, upper portions 140', 142' also include second ends 160', 162' thereof that together form second load cushion mounting surface 165' on second spring mount 66a' that is adapted to have a second load cushion mounted thereon. Of course, while two load cushion mounting surfaces are shown, only one, or perhaps three or more load cushion mounting surfaces could be provided on the upper portions 140', 142' in a manner similar to FIG. 28. Thus, spring mounts 66' and 66a' are integrally attached to the saddle, unlike the saddle shown in U.S. Pat. No. 7,926,836. Indeed, spring mounts 66' and 66a' are preferably integrally formed with the saddles 120' and 130', as shown in FIG. 33. With this design, the need for separate spring mounts is eliminated. Of course, spring mounts integral with the saddle are not required and spring mounts that are separate from the saddle may be used for particular applications, as shown for example in FIG. 27.

As mentioned above, the upper portions 140', 142' of the outboard saddle 120' and inboard 130' are connected together. As discussed in greater detail below, a connecting rod may be a bolt, screw, threaded or unthreaded, or other suitable fastener and may be used to connect the saddles together. As illustrated in FIGS. 37 and 38, connecting rods 922 and 924, and connecting rods 922a, and 924a show where the connection of the saddles may be accomplished. Although two connecting rods 922 and 924 are shown for spring mount 66', it is possible to use only a single connecting rod, or additional connecting rods as desired.

FIG. 38 further illustrates the threaded shank portions of connecting rods 922 and 924, and 922a and 924a, with nuts 923 and 925, and nuts 923a and 925a attached to connect the saddles together. As noted above, the connecting rods do not need to be threaded, but could instead be a threadless rod held in place with a cotter pin or other suitable holding device.

Depending on the application, the disclosed vehicle suspension 50' may not utilize load cushions on the top surface of the spring mounts, and thus the load cushion mounting surfaces 155' and 165' may not be necessary. However, even in the absence of load cushion mounting surfaces, with the design of the saddle assembly 90' shown in FIGS. 38 and 39, the upper portions 140', 142' may still serve as a spring mount. In particular, the upper portions 140', 142' include first ends 150', 152' thereof that together form a first V-shaped side wall 190' of spring mount 66', that is adapted to contact and compress a first shear spring having a corresponding V-shaped surface (not shown, but see below).

Similarly, upper portions 140', 142' also include second ends 160', 162' thereof that together form a second V-shaped side wall 190a' of the spring mount 66a', that is adapted to contact and compress a second shear spring having a corresponding V-shaped top surface (also not shown, but see below). While V-shaped side walls 190' and 190a' are disclosed, the saddles could be designed such that only ends 150' and 152' or ends 160' and 162' include a V-shaped side wall. Again, with the design shown in FIG. 33, the need for a separate spring mount to contact a shear spring is eliminated.

As described above, there are two openings (64 and 64a) in vehicle suspension 50'. The saddle assembly 90' also includes a third V-shaped wall 190b' positioned between side walls 190' and 190a', as well as a fourth V-shaped wall 190c' opposite from V-shaped wall 190b' and between side walls 190' and 190a'. V-shaped walls 190b' and 190c', along with side walls 82 and 80a, respectively (of spring modules 70 and 70a shown in FIGS. 33-36) are also adapted to contact and compress additional shear springs having corresponding V-shaped surfaces (not shown, but see below).

FIG. 39 and/or FIG. 39A further illustrates surface 155a' which provides one half of load cushion mounting surface 155' shown in FIGS. 37 and 38, and surface 165a' which provides one half of load cushion mounting surface 165' shown in FIGS. 37 and 38. Thus, surface 155a' is part of an inboard part 66b' of first spring mount 66' shown in FIGS. 37 and 38, and surface 165a' is part of inboard part 66c' of second spring mount 66a' shown in FIGS. 37 and 38.

FIG. 39 also illustrates tapered surface 191a' that forms one half of V-shaped wall 190a' at end 162' of saddle assembly 90', and tapered surface 191b' that forms one half of V-shaped wall 190b' shown in FIGS. 37 and 38. Further, through-hole through-holes 922b and 924b are shown positioned about through-hole 910 that allow connecting rods 922 and 924 to pass through, and through-holes 922d and 924d are shown positioned about through-hole 910a that allow connecting rods 922a and 924a to pass through.

FIG. 39A also illustrates tapered surface 191' that forms one half of V-shaped wall 190' at end 152' of saddle assembly 90', and tapered surface 191c' that forms one half of V-shaped wall 190c' shown in FIGS. 37 and 38.

Figure 40:
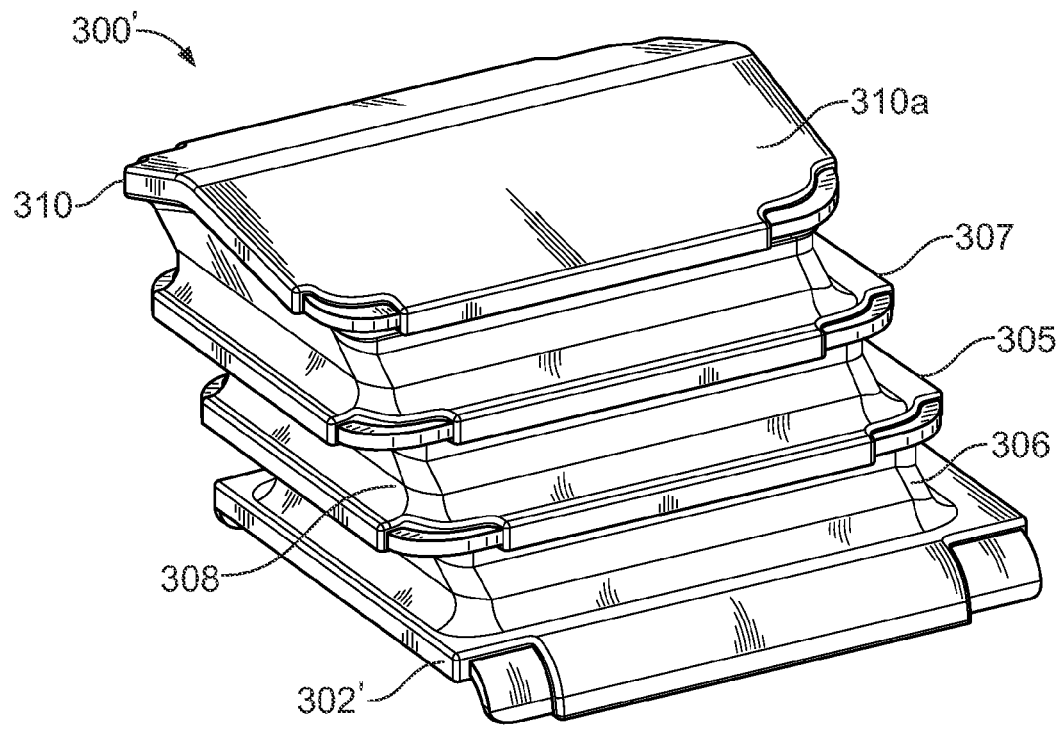
FIG. 40 is a perspective view of a shear spring shown in the vehicle suspension 50' shown in FIGS. 33-36.

FIG. 40 is a perspective view of shear spring 300', which is sometimes referred to as a V-spring. The shear springs 72', 72a', 74', and 74a' shown in FIGS. 33-36 may be arranged as shear spring 300' shown in FIGS. 40-42. Shear spring 300' is similar to shear spring 300 shown in FIGS. 9-13 as it includes a base plate 302 and a V-shaped plate 310. However, shear spring 300' includes first intermediate plate 315 and second intermediate plate 317, which are shown as flat plates in FIGS. 40-42. However, it is also possible to include only a first intermediate plate that is flat, two intermediate plates that are V-shaped, or one V-shaped intermediate plate and one flat intermediate plate.

In shear spring 300', V-shaped plate 310 results in shear spring 300' having a V-shaped wall 310a that is adapted to contact a corresponding V-shaped side wall of a spring mount, although the surface of V-shaped wall 310a could be V-shaped even in the absence of V-shaped plate 310. Shear spring 300' includes an elastomeric section 306 between base plate 302 and first intermediate plate 315, an elastomeric section 308 between first intermediate plate 315 and second intermediate plate 317, and an elastomeric section 318 between second intermediate plate 317 and V-shaped plate 310. Of course, the shear spring could be made without one or more of plates 302, 315, 317, and 312. For example, the shear spring could be all elastomer, have a base plate 302 without intermediate plates 315 and 317; have base plate 302 and plate 310 but no intermediate plates, etc. Furthermore, base plate 302 could also be V-shaped like plate 310, and all plates 302, 315, 317, and 310 could be V-shaped. In such a case, the side wall of the opening contacting base plate 302 could also have a corresponding V-shape.

Moreover, the shear spring 300' is shown having the geometry of a preferred embodiment. It will be appreciated that the base plate 302 may not even include a plate as noted above. Further, the base or base plate 302 of the shear spring 300' could also be affixed to the side walls of the opening in the spring module using fasteners, bolts, etc. in a known and conventional manner. Thus, the shear spring is not required to have, but may have, the geometry shown in FIGS. 40-42.

Figure 41:
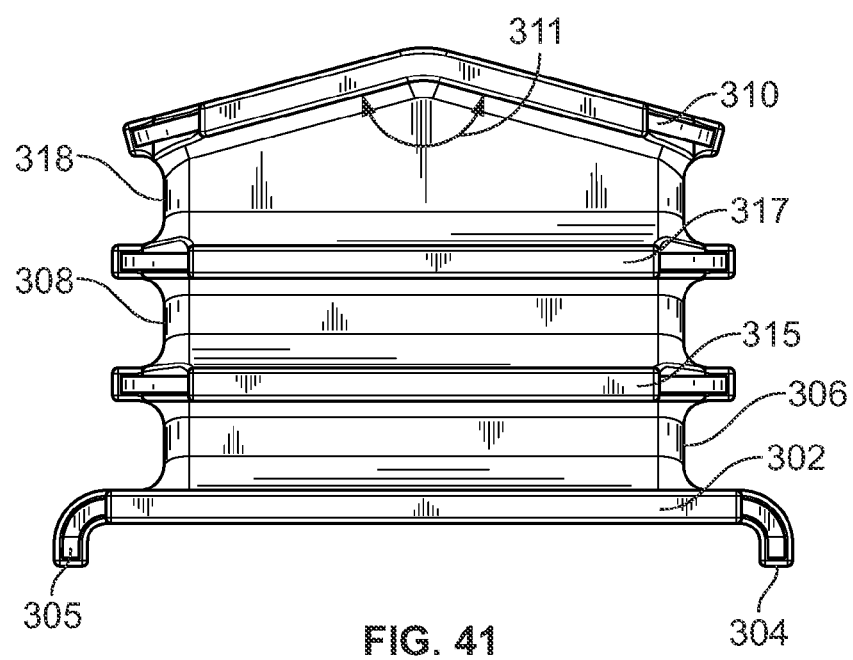
FIG. 41 is a side view of the shear spring shown in FIG. 40.

FIG. 41 is a plan view of shear spring 300' comprising base plate 302, V-shaped plate 310, first intermediate plate 315, and second intermediate plate 317. Base plate 302 includes a first flange 304 extending from a first end thereof away from V-shaped plate 310 and a second flange 305 extending from a second end thereof also away from V-shaped plate 310. Base plate 302 is adapted to contact a first side wall of a spring module opening of a vehicle suspension (for example, side wall 80 of opening 64 in the spring module of vehicle suspension 50' in FIGS. 33-36). Frictional forces acting on shear spring 300', a side wall of a spring module opening, and a V-shaped side wall of a spring mount provide a primary means to prevent lateral movement of shear spring 300'. The first flange 304 and the second flange 305 of base plate 302 are designed to extend beyond first and second side edges of a side wall of a spring module opening to secondarily restrict lateral movement of shear spring 300' with respect to vehicle suspension 50'.

Intermediate plates 315 and 317 provides additional resistance to lateral forces acting on shear spring 300', such as lateral forces in a direction from V-shaped plate 310 to base plate 302. Intermediate plates 315 and 317 are shown as flat plates parallel to base plate 302. However, intermediate plate 312 could have a larger or smaller angle for the V-shape as desired.

The V-shaped plate 310 may be bent from straight plates. Since V-shaped plate 310 has a V-shape, V-shaped plate 310 has an angle that is less than 180 degrees. FIG. 41 illustrates an included angle 311 formed by V-shaped plate 310. The included angle 311 may be a number of degrees that fall within any of a plurality of angle ranges including, but not limited to, the angle ranges of (i) 90° to 179°, (ii) 90° to 170°, or (iii) 115° to 125°. In accordance with that latter range, the included angle 311 may, for example, be 115°, 116°, 117°, 118°, 119°, 120°, 121°, 122°, 123°, 124°, 125° or some non-whole number angle between any two of those listed angles.

Figure 42:
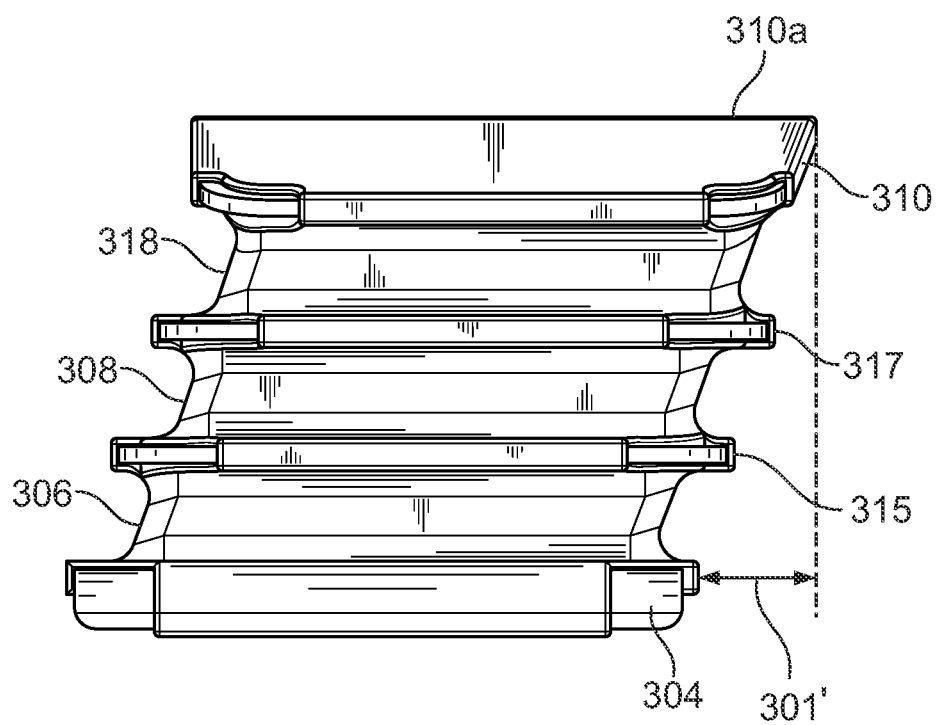
FIG. 42 is another side view of the shear spring shown in FIGS. 40 and 41.

FIG. 42 is a side view of shear spring 300'. Shear spring 300' has a free-state vertical offset 301' between its end plates (i.e., base plate 302 and V-shaped plate 310). Preferably, the free-state vertical offset 301 is equal to half the vertical travel of vehicle suspension 50' shown in FIGS. 33-36. This is done to minimize a couple induced in shear spring 300' by virtue of the compression load acting on shear spring 300' applied at both end plates. A couple is a moment induced when equal and opposing forces are acting on a body but are not collinear. The effect of the couple on shear spring 300' is to induce rotation within the spring that could cause the spring to rotate within a spring module sufficiently enough to relieve the shear spring's compression and put the elastomeric sections (e.g., elastomeric sections 306, 308, and 318) into tension. Offsetting both endplates of shear spring 300' by a distance equal to half of the suspension's vertical travel results in couples at the fully stroked and rebound conditions being equal but opposite in direction (the magnitude of these couples is half that of a spring with no offset or an offset equal to that of the vertical travel of vehicle suspension 50').

In accordance with the disclosed embodiments shown in FIGS. 33-42, shear spring 300' may be constructed of elastomeric sections 306, 308, and 318 bonded to plates 302, 315, 317, and 310. Elastomeric sections 306, 308, and 318 may comprise an elastomeric material (i.e., an elastomer) such as natural rubber, synthetic rubber, styrene butadiene, synthetic polyisoprene, butyl rubber, nitrile rubber, ethylene propylene rubber, polyacrylic rubber, high-density polyethylene, thermoplastic elastomer, a thermoplastic olefin (TPO), urethane, polyurethane, a thermoplastic polyurethane (TPU), or some other type of elastomer. In this regard and in particular, elastomeric sections 306, 308, and 318 may comprise an elastomer defined as American Society of Testing and Materials (ASTM) D2000 M4AA 717 A13 B13 C12 F17 K11 Z1 Z2. In this case, Z1 represents natural rubber and Z2 represents a durometer selected to achieve a desired shear rate. The selected durometer may be based on a given predefined scale, such as the Shore A scale, the ASTM D2240 type A scale, or the ASTM D2240 type D scale. In a preferred embodiment, in accordance with the Shore A scale, Z2, for example, is preferably 70±5. In another embodiment, in accordance with the Shore A scale, Z2 is, for example, within the range of 50 to 80. Other examples of Z2 and ranges for Z2 are also possible.

In another respect, elastomeric sections 306, 308, and 318 may comprise a viscoelastomeric material that (i) has elastic characteristics when the shear spring 300 is under a load within a given range and when that load is removed, and (ii) has non-elastic characteristics (for example, does not return to an original non-loaded shape) if the applied load exceeds the greatest load of the given range. The given range may extend from no load to a maximum expected load plus a given threshold. The given threshold accounts for possible overloading of shear spring 300. As an example, the viscoelastomeric material may comprise amorphous polymers, semi-crystalline polymers, and biopolymers. Other examples of the viscoelastomeric material are also possible.

In accordance with the example embodiments, elastomeric sections 306, 308, and 318 may also comprise one or more fillers. The filler(s) may optimize performance of elastomeric sections 306, 308, and 318. The fillers may include, but are not limited to, wax, oil, curing agents, and/or carbon black. Such fillers may optimize performance by improving durability and/or tuning elastomeric sections 306, 308, and 318 for a given shear load and/or a given compressive load applied to elastomeric sections 306, 308, and 318. Improving durability through the use of fillers may include, for example, minimizing a temperature rise versus loading characteristic of elastomeric sections 306, 308, and 318 and/or maximizing shape retention of elastomeric sections 306, 308, and 318.

Shear spring 300' may be formed, for example, by inserting the plates 302, 315, 317, and 310 into a mold (not shown). The plates may each be coated with a coating material. As an example, the coating material may comprise a material comprising zinc and phosphate, modified with calcium. The coating material may have a coating weight of 200-400 milligrams per square foot. Other examples of the coating material are also possible. A bonding agent may be applied to the coated plates for bonding the plates 302, 315, 317, and 310 to elastomeric sections 306, 308, and 318. As an example, the bonding agent may comprise Chemlok® manufactured by the Lord Corporation, Cary, N.C., USA. Other examples of the bonding agent are also possible. Applying the coating material and/or applying the bonding agent may occur prior to, during, and/or after insertion of the plates 302, 315, 317, and 310 into the mold. After applying the coating material and the bonding agent, the elastomeric material (while in a pourable form) may be inserted into the mold to form the elastomeric sections 306, 308, and 318.

In a preferred embodiment, any exposed portion of the plates 302, 315, 317, and 310 (for example, a portion of the plates not covered by the elastomeric material) is protected against corrosion by a means other than the elastomeric material. In other embodiments, some exposed portions of the plates 302, 315, 317, and 310, (e.g., the edges of the plates) may not be protected against corrosion, whereas any other exposed portions of the plates are protected against corrosion.

The plates 302, 315, 317, and 310 can be made of any of a variety of suitable materials, including, but not limited to, iron, steel, aluminum, plastic, a composite material, or some other material. The plates 302, 315, 317, and 310 may be fully, or at least substantially, encapsulated in elastomer to further enhance their corrosion resistance and friction at the mating suspension members. As an example, plates 302, 315, 317, and 310 can comprise plates having a thickness between a range of 0.125 inches (3.175 mm) to 0.25 inches (6.35 mm).

The vehicle suspension 50' can be initially drawn together in the same manner as the method of assembly of vehicle suspension 50 described above. Therefore, with reference to FIGS. 33-36, vehicle suspension 50' may be assembled by using a method including the steps of (i) providing a frame attachment portion 58 adapted for connection to a vehicle frame rail having a spring module 70 attached to the frame attachment portion 58 wherein the spring module 70 has an opening 64 defined by a top wall 84, a bottom wall 86, and first and second side walls 80, 82 of the spring module, (ii) positioning a first part of a first spring mount 66' within the opening 64, (iii) positioning a first shear spring 72' between a first tapered surface of the first spring mount 66' and a first side wall 80 of the opening 64 of the first spring module 70, (iv) positioning a second shear spring 74' between a second tapered surface of the first spring mount 66' and second side wall 82 of the opening 64 of the first spring module 70, (v) positioning a second part of the first spring mount 66' within the opening 64, (vi) placing a first threaded connecting rod 164 (see FIGS. 21a and 21b) through a through-hole in at least one of the first part of the first spring mount 66' or the second part of the first spring mount 66', and (vii) tightening the first threaded rod 146 (see FIGS. 21a and 21b) to draw together the first part of the first spring mount 66' and the second part of the first spring mount 66', and to compress the first shear spring 72' between the first side wall of the first spring mount 66' and the first side wall 80 of the opening 64 of the first spring module 70, and also to compress the second shear spring 74' between the second side wall of the first spring mount 66' and the second side wall 82 of the opening 64 of the first spring module 70. The shear springs 72a' and 74a' are compressed between spring mount 66a' and walls 80a and 82a in a similar manner using threaded rod 146a.

However, the method of assembly of vehicle suspension 50' differs from that of vehicle suspension 50 in that the saddle assembly 90' includes additional through holes for connecting outboard saddle 120' and inboard saddle 130' using connecting rods 922 and 924, as well as 922a and 924a. After the threaded rods 146 and 146a are used to draw and connects the outboard saddle together (as shown in FIGS. 2, 3, and 21a and 21b) and described above, then connecting rods 922 and 924 positioned about through-hole 910 are used to further secure the outboard saddle 120' and inboard saddle 130' together, and connecting rods 922a and 924a positioned about through-hole 910a are used to further secure the outboard saddle 120' and inboard saddle 130' together. At this point, the threaded rods 146 and 146a may be, but are not required to be, removed, leaving connecting rods 922 and 924, and 922a and 924a securing outboard saddle 120' and inboard saddle 130' together. FIGS. 33-36 shows vehicle suspension 50' with threaded rods 146 and 146a removed from through-holes 910 and 910a of vehicle suspensions 50'.

The use of two connecting rods 922 and 924 for spring mount 66', and two connecting rods 922a and 924a for spring mount 66a' may provide for additional holding strength that is greater than using a single threaded rod 146 or 146a for each spring mount.

One benefit of using connecting rod 922 or 924 after threaded rod 146 has been used to draw the outboard saddle 120' together with inboard saddle 130' is that it may be shorter than threaded rod 146, as the length of connecting rod 922 or 924 need only be long enough for attachment of a nut or other securing device after the outboard saddle 120' and inboard saddle 130' have been drawn together. By contrast, the threaded rod 146 must be long enough to extend through outboard saddle 130' and inboard saddle 120' before they are drawn together, resulting in a potentially undesirable protrusion of threaded rod 146 extending from the vehicle suspension.

Moreover having two connecting rods in each spring mount provides a redundancy in the vehicle suspension, in that if one rod were to fail, the other connecting rod would still hold the outboard saddle 120' and inboard saddle 130' together. Where two springs are used with two connecting rods per spring mount, then there would be four connecting rods holding the outboard saddle 120' and inboard saddle 130' together. In this case, if one of the connecting rods failed, then there would still be three connecting rods holding the outboard saddle 120' and inboard saddle 130' together.

The walking beams used with the various example vehicle suspensions described herein may be constructed in any of a variety of arrangements. In that regard, the number of and/or dimensions of various plates used to construct the walking beams may vary between the various walking beam arrangements. Furthermore, the walking beams attached to the each vehicle suspension may be retained to the vehicle suspension via various components such as, for example, a set of components comprising a saddle cap and threaded connecting rods or a set of components comprising a U-bolt and a pair of nuts.

FIGS. 43-47 are directed to shear spring 350, which includes an alternate shear spring design that may be used in vehicle suspension 50 shown in FIGS. 1-2, and 22-26, and vehicle suspension 50' shown in FIGS. 33-36. In particular, shear springs 72, 74, 72a, and 74a shown in FIGS. 1-2, and 22-26 may be arranged as shear spring 350 shown in FIGS. 43-47, and shear springs 72', 74', 72a', and 74a' shown in FIGS. 33-36 may be arranged as shear spring 350 shown in FIGS. 43-47. Furthermore, shear spring 350 shown in FIGS. 43-47 may also be used in vehicle suspension 1050 shown in FIGS. 48 and 49. In particular, in a preferred embodiment, shear springs 1072, 1074, 1072a, and 1074a shown in suspension 1050 may be arranged as shear spring 350 as shown in FIGS. 43-47.

Figure 43:
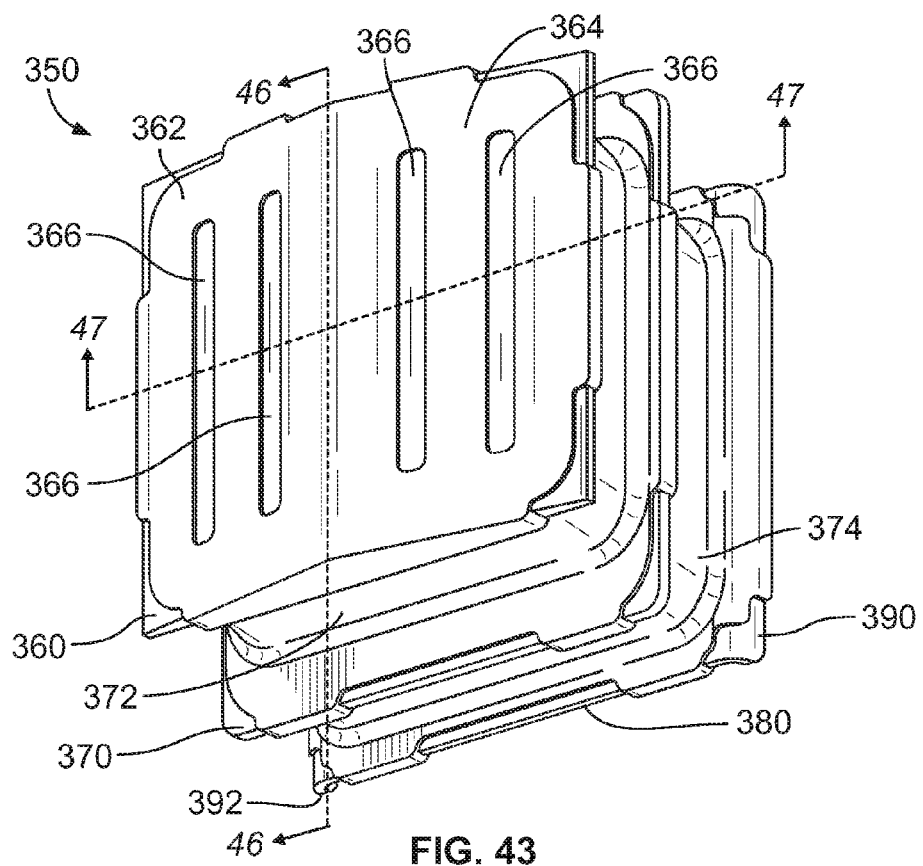
FIG. 43 is a perspective view of a shear spring 350 that may be used in suspension 50 or 50'.

FIG. 43 is a perspective view of shear spring 350 that is similar to shear spring 300 shown in FIGS. 9-13 and shear spring 300' shown in FIGS. 40-42 as it includes a base plate 380 and a plate 360 with a V-shaped upper surface. Shear spring 350 also includes a first intermediate plate 370 which is shown as a flat plate in FIGS. 43-47. However, in other embodiments, it is also possible to include additional intermediate plates, as desired. It will be appreciated that the terms "upper" "lower" and "base" are used in the specification and claims only to provide relational references for the components of the shear spring. However, the terms "upper" "lower" and "base" in no way require that the shear spring is oriented in any particular manner in a vehicle suspension. In fact, it will be appreciated that shear springs shown in suspension 50, 50' and 1050 show the shear springs positioned with the base plate and upper surface of the shear spring are mounted in a generally horizontal orientation. Thus, the shear spring 350 may be oriented horizontally, vertically, or somewhere in between.

In shear spring 350, plate 360 has a V-shaped upper surface that results in shear spring 350 having a V-shaped outer surface comprising surfaces 362 and 364 that are adapted to contact a corresponding V-shaped side wall of a spring mount.

As used herein, the term "V-shaped" is to be broadly construed to cover two walls angled with respect to one another, that may or may not come together at a point. In other words, the apex of the V-shaped surface could be rounded or even flat. Chaplets 366 are shown on the upper surface of plate 360 within surfaces 362 and 364 that are used during the molding process. In addition, the corners of plates 360, 370, and 380 are also exposed to facilitate the molding process.

Figure 44:
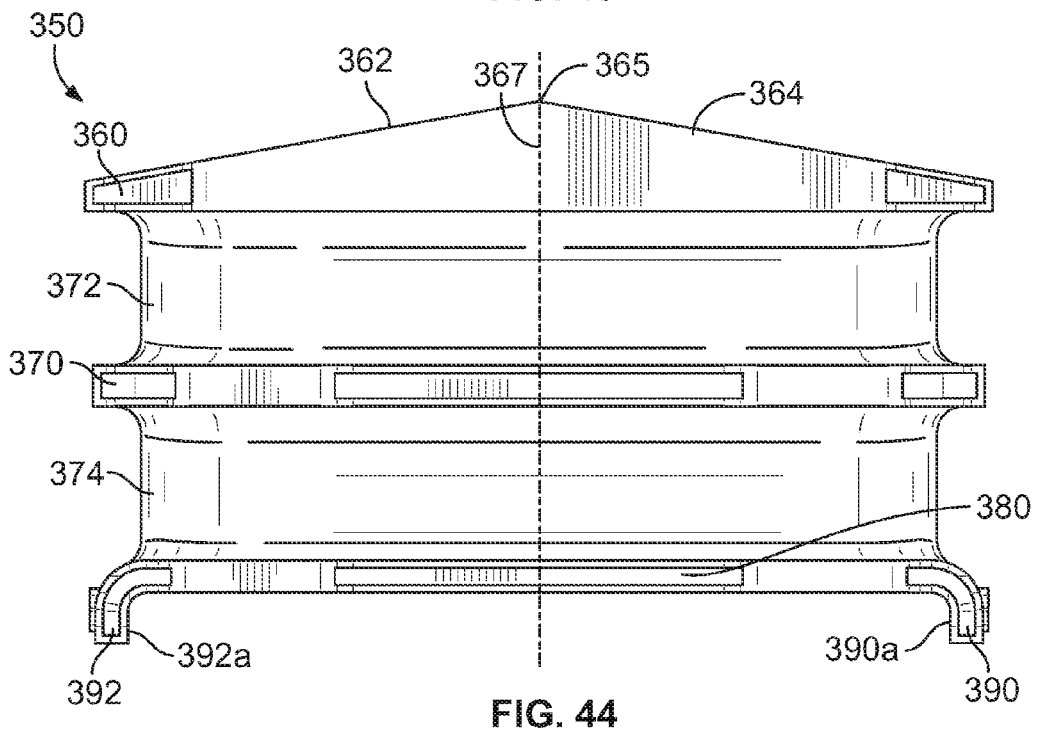
FIG. 44 is an end view of shear spring 350 shown in FIG. 43.
Figure 47:
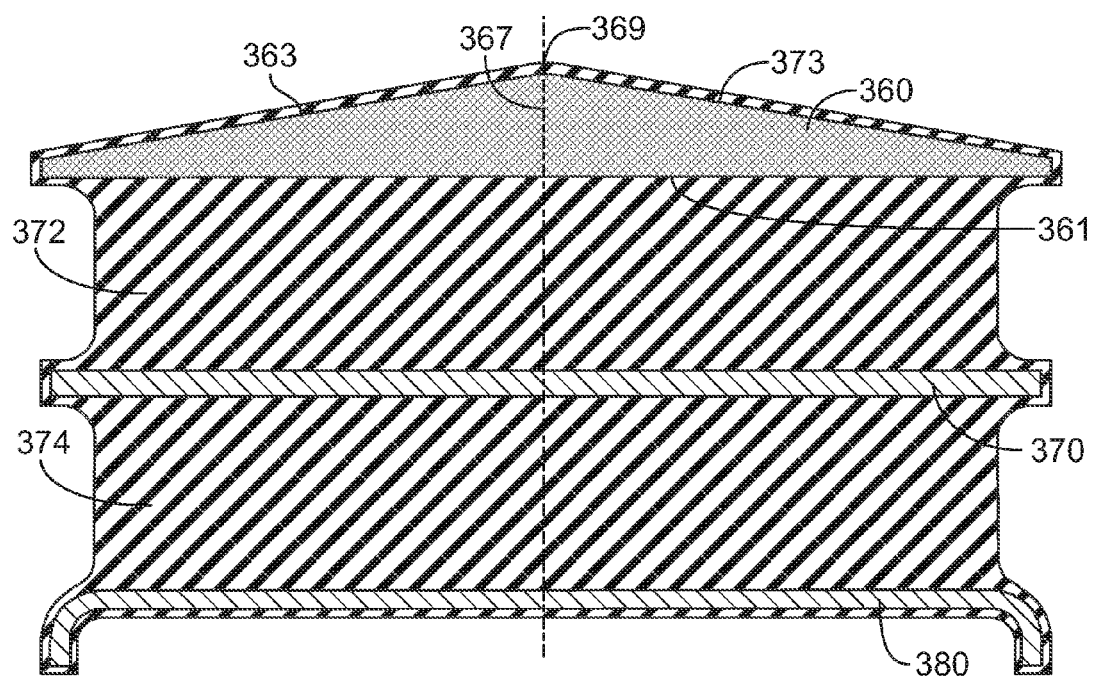
FIG. 47 is a cross-sectional end view of the shear spring 350 taken along the line 47-47 shown in FIG. 43.

FIG. 44 shows an end view of shear spring 350 shown in FIG. 43, and FIG. 47 shows a cross-sectional end view of shear spring 350 shown in FIG. 43 taken along line 47-47. It will be appreciated that plate 360 has a flat bottom surface 361 positioned beneath angled upper surfaces 363 and 373 of plate 360. In other words, plate 360 has a generally triangular-shaped cross section with angled upper surfaces 363 and 373 coming together at apex 365 at the top, and a flat lower surface 361. When using a formed plate, or a plate that is bent to form the V-shaped upper surface, the thickness of the plate remains generally constant, and the voided apex area must be filled with an elastomer such as rubber, resulting in an undesirable imbalance in compression and shear rates across the shear spring's laminate cross-section. The imbalances in compression and shear rates can then lead to compromises resulting in less than optimal results.

Figure 45:
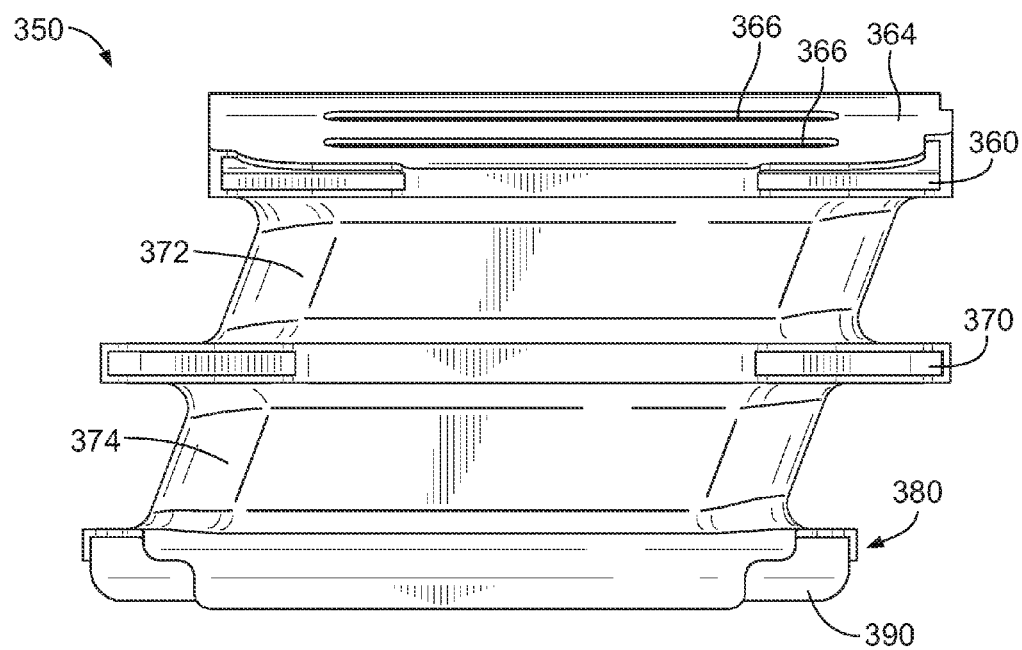
FIG. 45 is a side view of the shear spring 350 shown in FIGS. 43 and 44.
Figure 46:
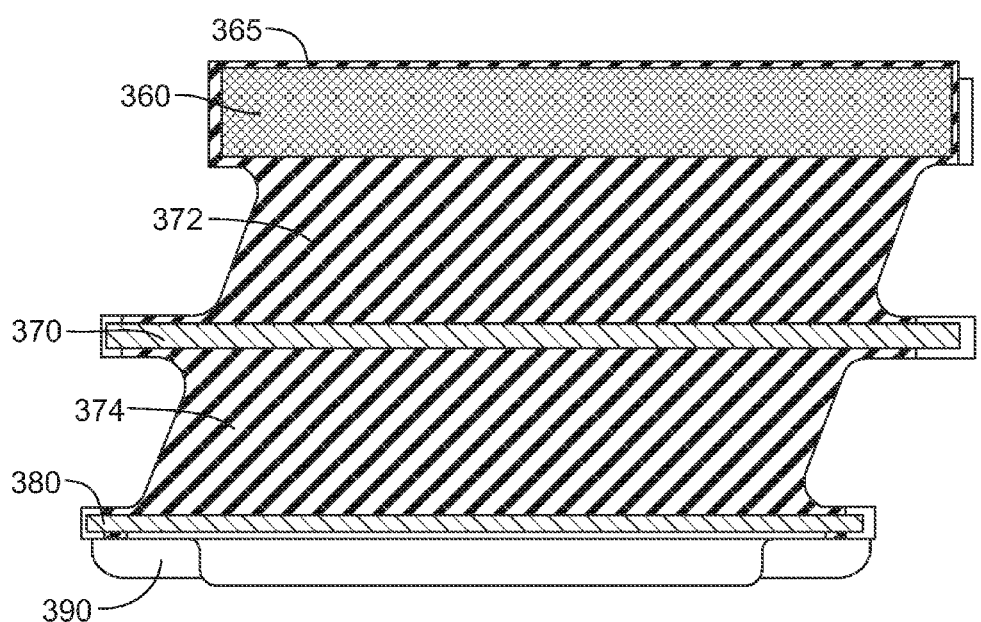
FIG. 46 is a cross-sectional side view of the spring 350 shown in FIG. 45.

FIG. 45 shows a side view of the shear spring 350, and FIG. 46 shows a cross-sectional view of the shear spring 350 shown in FIG. 45 taken along line 46-46. Shear spring 350 includes an elastomeric section 374 between base plate 380 and first intermediate plate 370, and an elastomeric section 372 between first intermediate plate 370 and plate 360. It will be seen that the bottom surface 361 of upper plate 360 is parallel to the upper surface of the intermediate plate 370, and the bottom surface of intermediate plate 360 is parallel to the top of base plate 380. As a result, the thickness of elastomeric section 372 that extends between the bottom surface 361 of upper plate 360 and the upper surface of intermediate plate 370 is constant across its cross-section, and the thickness of the elastomeric section 374 that extends between the bottom surface of intermediate plate 360 and the top of base plate 380 is also constant across its cross-section.

With the configuration of the upper plate 360 in FIGS. 43-47 having a flat bottom surface 361 and V-shaped upper surfaces 363 and 373, the cross section of plate 360 naturally fills the voided apex of the V-shaped outer surface 362 and 364, which is something that cannot be accomplished when using a formed or bent plate. Because the thickness of elastomeric sections 372 and 374 are constant, it is possible to equalize compression and shear strain in each elastomeric section 372 and 374 across their entire cross-section which results in an optimized design.

In a preferred embodiment, the thickness of elastomeric section 372 and the thickness of elastomeric section 374 are equal, and may have a thickness of 32 millimeters. The thickness of the intermediate plate 370 may be 3.175 millimeters. In addition, the upper plate 360 may preferably made from an extruded aluminum. The width of the bottom 361 of upper plate 360 may be 168 millimeters, with a thickness of the apex 365 of around 18 millimeters.

FIG. 44 is a plan view of shear spring 350 comprising base plate 380, intermediate plate 370, and upper plate 360. Base plate 380 includes a first flange 390 extending from a first end thereof away from upper plate 360 and a second flange 392 extending from a second end thereof also away from upper plate 360. Base plate 380 is adapted to contact a first side wall of a spring module opening of a vehicle suspension (for example, side wall 80 of opening 64 in the spring module of vehicle suspension 50' in FIGS. 33-36). Frictional forces acting on shear spring 350, a side wall of a spring module opening, and a V-shaped side wall of a spring mount provide a primary means to prevent lateral movement of shear spring 350. The first flange 390 and the second flange 392 of base plate 380 are designed to extend beyond first and second side edges of a side wall of a spring module opening to secondarily restrict lateral movement of shear spring 350 with respect to vehicle suspension 50 or 50'.

Intermediate plate 370 provides additional resistance to lateral forces acting on shear spring 350, such as lateral forces in a direction from upper plate 360 to base plate 380. Since the upper surface of plate 360 has a V-shape, upper plate 360 has an angle that is less than 180 degrees. The included angle may be a number of degrees that fall within any of a plurality of angle ranges including, but not limited to, the angle ranges of (i) 90° to 179°, (ii) 90° to 170°, or (iii) 115° to 125°. In accordance with that latter range, the included angle may, for example, be 115°, 116°, 117°, 118°, 119°, 120°, 121°, 122°, 123°, 124°, 125° or some non-whole number angle between any two of those listed angles.

In a preferred embodiment, as best seen in FIGS. 44 and 47, the upper plate 360 has an apex of the V-shaped upper surface that is located on a centerline 365 drawn perpendicularly through the center of upper plate 360 and the center of base plate 380, such that the centerline is equidistant from an inner surface 390a of flange 390 and an inner surface 392a of flange 392 of base plate 380. The apex 365 may be positioned such that the upper surfaces 363 and 373 of upper plate 360 have the same length.

The shear spring 350 is shown having the geometry of a preferred embodiment, including flanges 390 and 392 extending downwardly from base plate 380. However, the base plate 380 of the shear spring 350 could also be affixed to the side walls of the opening in the spring module using fasteners, bolts, etc. in a known and conventional manner. Thus, the shear spring is not required to have, but may have, the geometry shown in FIGS. 43-47.

In accordance with the disclosed embodiments shown in FIGS. 43-47, shear spring 350 may be constructed of elastomeric sections 372 and 374 bonded to plates 360, 370, and 380. Elastomeric sections 372 and 374 may comprise an elastomeric material (i.e., an elastomer) such as natural rubber, synthetic rubber, styrene butadiene, synthetic polyisoprene, butyl rubber, nitrile rubber, ethylene propylene rubber, polyacrylic rubber, high-density polyethylene, thermoplastic elastomer, a thermoplastic olefin (TPO), urethane, polyurethane, a thermoplastic polyurethane (TPU), or some other type of elastomer. In this regard and in particular, elastomeric sections 372 and 374 may comprise an elastomer defined as American Society of Testing and Materials (ASTM) D2000 M4AA 717 A13 B13 C12 F17 K11 Z1 Z2. In this case, Z1 represents natural rubber and Z2 represents a durometer selected to achieve a desired shear rate. The selected durometer may be based on a given predefined scale, such as the Shore A scale, the ASTM D2240 type A scale, or the ASTM D2240 type D scale. In a preferred embodiment, in accordance with the Shore A scale, Z2, for example, is preferably 70±5. In another embodiment, in accordance with the Shore A scale, Z2 is, for example, within the range of 50 to 80. Other examples of Z2 and ranges for Z2 are also possible.

In another respect, elastomeric sections 372 and 374 may comprise a viscoelastomeric material that (i) has elastic characteristics when the shear spring 350 is under a load within a given range and when that load is removed, and (ii) has non-elastic characteristics (for example, does not return to an original non-loaded shape) if the applied load exceeds the greatest load of the given range. The given range may extend from no load to a maximum expected load plus a given threshold. The given threshold accounts for possible overloading of shear spring 350. As an example, the viscoelastomeric material may comprise amorphous polymers, semi-crystalline polymers, and biopolymers. Other examples of the viscoelastomeric material are also possible.

In accordance with the example embodiments, elastomeric sections 372 and 374 may also comprise one or more fillers. The filler(s) may optimize performance of elastomeric sections 372 and 374. The fillers may include, but are not limited to, wax, oil, curing agents, and/or carbon black. Such fillers may optimize performance by improving durability and/or tuning elastomeric sections 372 and 374 for a given shear load and/or a given compressive load applied to elastomeric sections 372 and 374. Improving durability through the use of fillers may include, for example, minimizing a temperature rise versus loading characteristic of elastomeric sections 372 and 374 and/or maximizing shape retention of elastomeric sections 372 and 374.

Shear spring 350 may be formed, for example, by inserting the plates 360, 370, and 380 into a mold (not shown). The plates may each be coated with a coating material. As an example, the coating material may comprise a material comprising zinc and phosphate, modified with calcium. The coating material may have a coating weight of 200-400 milligrams per square foot. Other examples of the coating material are also possible. A bonding agent may be applied to the coated plates for bonding the plates 360, 370, and 380 to elastomeric sections 372 and 374. As an example, the bonding agent may comprise Chemlok® manufactured by the Lord Corporation, Cary, N.C., USA. Other examples of the bonding agent are also possible. Applying the coating material and/or applying the bonding agent may occur prior to, during, and/or after insertion of the plates 360, 370, and 380 into the mold. After applying the coating material and the bonding agent, the elastomeric material (while in a pourable form) may be inserted into the mold to form the elastomeric sections 372 and 374.

In a preferred embodiment, any exposed portion of the plates 360, 370, and 380 (for example, a portion of the plates not covered by the elastomeric material) is protected against corrosion by a means other than the elastomeric material. In other embodiments, some exposed portions of the plates 360, 370, and 380 (e.g., the corners of the plates) may not be protected against corrosion, whereas any other exposed portions of the plates are protected against corrosion.

The plates 360, 370, and 380 can be made of any of a variety of suitable materials, including, but not limited to, iron, steel, aluminum, plastic, a composite material, or some other material. The plates 360, 370, and 380 may be fully, or at least substantially, encapsulated in elastomer to further enhance their corrosion resistance and friction at the mating suspension members. Furthermore, as an example, plates 370 and 380 may comprise plates having a thickness between a range of 0.125 inches (3.175 mm) to 0.25 inches (6.35 mm).

Figure 48:
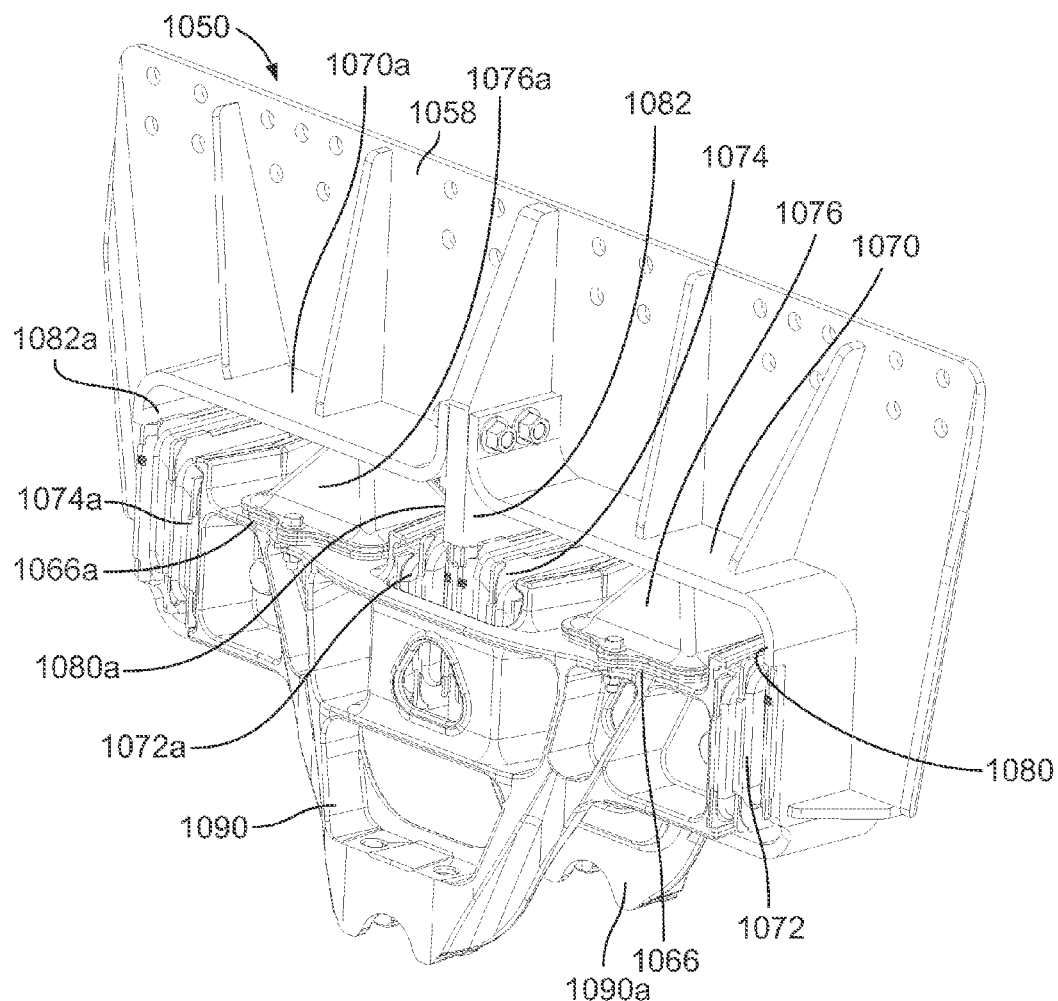
FIG. 48 is a perspective view of vehicle suspension 1050.
Figure 49:
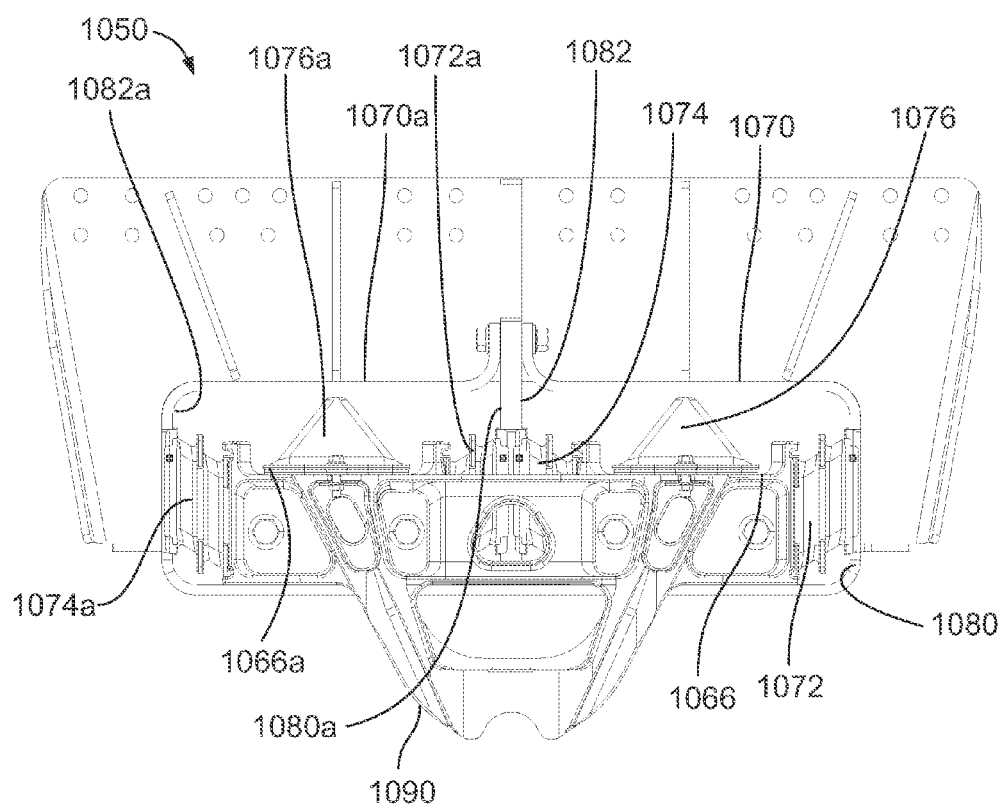
FIG. 49 is a front view of the vehicle suspension 1050 shown in FIG. 48.

The shear spring 350 shown in FIGS. 43-47 may be used in suspension 1050 shown in FIGS. 48 and 49. In particular, in FIGS. 48 and 49, the suspension 1050 includes a frame bracket 1058 having a first spring module 1070 and a second spring module 1072. Spring module 1070 includes shear spring 1072 positioned between a side wall 1080 and a side wall of spring mount 1066, and shear spring 1074 positioned between side wall 1082 and a side wall of spring mount 1066. Similarly, spring module 1070a includes shear spring 1072a positioned between a side wall 1080a and a side wall of spring mount 1066a, and shear spring 1074a positioned between side wall 1082a and a side wall of spring mount 1066a. A load cushion 1076 is positioned atop spring mount 1066 and another load cushion 1076a is positioned atop spring mount 1066a. Saddle assembly 1090 and saddle assembly 1090a are attached to spring mount 1066 and 1066a. In a preferred embodiment, shear springs 1072, 1074, 1072a, and 1074a are configured as shear spring 350 shown in FIGS. 43-47.

Example embodiments of the present invention have been described above. Those skilled in the art will understand that changes and modifications may be made to the described embodiments without departing from the true scope and spirit of the present invention, which is defined by the claims.

We claim:

1. A suspension for supporting a longitudinally extending vehicle frame rail above an axle, comprising:
a first frame attachment portion adapted for connection to the vehicle frame rail;
a first spring module attached to the first frame attachment portion;
said first spring module having an opening;
a first spring mount positioned within the opening of the first spring module;
a first shear spring positioned between a first side wall of the first spring mount and a first side wall of the opening of the first spring module;
a second shear spring positioned between a second side wall of the first spring mount and a second side wall of the opening of the first spring module;
said first spring mount comprising an inboard part and an outboard part separate from the inboard part, a first through-hole positioned in at least one of the inboard or the outboard parts of the first spring mount adapted to allow passage of a first connecting rod therethrough, wherein the first connecting rod connects the inboard part of the first spring mount together with the outboard part of the first spring mount, and wherein the first shear spring has a V-shaped outer surface, where the first shear spring is compressed between the first side wall of the first spring mount and the first side wall of the opening of the first spring module, and wherein the second shear spring has a V-shaped outer surface, where the second shear spring is compressed between the second side wall of the first spring mount and the second side wall of the opening of the first spring module.

2. The suspension of claim 1, wherein the first shear spring is comprised of a base plate having a flat upper surface and an upper plate having a V-shaped upper surface opposite the base plate adapted to mate with a corresponding V-shaped surface positioned on a first side wall of the first spring mount, wherein the upper plate has a flat lower surface parallel to the flat upper surface of the base plate, and wherein the second shear spring is comprised of a base plate having a flat upper surface and an upper plate having a V-shaped upper surface opposite the base plate adapted to mate with a corresponding V-shaped surface positioned on a second side wall of the first spring mount, wherein the upper plate has a flat lower surface parallel to the flat upper surface of the base plate.

3. The suspension of claim 2, wherein the V-shaped upper surface of the upper plate of the first shear spring is at least partially covered with an elastomer providing the outer surface of the first shear spring.

4. The suspension of claim 2, further including a second through-hole positioned in at least one of the inboard or the outboard parts of the first spring mount adapted to allow passage of a second connecting rod therethrough, wherein the second connecting rod also connects the inboard part of the first spring mount together with the outboard part of the first spring mount.

5. The suspension of claim 4, wherein the first connecting rod is a threaded bolt that extends through the inboard part and the outboard part of the first spring mount, and the second connecting rod is a threaded bolt that extends through the inboard part and the outboard part of the first spring mount.

6. The suspension of claim 2, wherein the upper surface of the upper plate of the first shear spring has an apex that is located at a centerline drawn perpendicularly through a center of the upper plate and a center of the base plate of the first shear spring, and wherein the upper surface of the upper plate of the second shear spring has an apex that is located at a centerline drawn perpendicularly through a center of the upper plate and a center of the base plate of the second shear spring.

7. The suspension of claim 6, further including a flat intermediate plate positioned between the upper plate and the base plate of the first shear spring, and a flat intermediate plate positioned between the upper plate and the base plate of the second shear spring.

8. The suspension of claim 7, wherein the intermediate plate of the first shear spring has a flat upper surface and a flat lower surface that are parallel to the lower surface of the upper plate and to the upper surface of the base plate of the first shear spring, and the intermediate plate of the second shear spring has a flat upper surface and a flat lower surface that are parallel to the lower surface of the upper plate and to the upper surface of the base plate of the second shear spring.

9. The suspension of claim 1, further including
a second frame attachment portion adapted for connection to the vehicle frame rail;
a second spring module attached to the second frame attachment portion;
said second spring module having an opening;
a second spring mount positioned within the opening of the second spring module;
a third shear spring positioned between a first side wall of the second spring mount and a first side wall of the opening of the second spring module;
a fourth shear spring positioned between a second side wall of the second spring mount and a second side wall of the opening of the second spring module;
said second spring mount comprised of an inboard part and an outboard part separate from the inboard part, a through-hole positioned in at least one of the inboard or the outboard parts of the second spring mount adapted to allow passage of a second connecting rod therethrough, wherein the second connecting rod connects the inboard part of the second spring mount together with the outboard part of the second spring mount, and wherein the third shear spring has a V-shaped outer surface, where the third shear spring is compressed between the first side wall of the second spring mount and the first side wall of the opening of the second spring module, and wherein the fourth shear spring has a V-shaped outer surface, where the fourth shear spring is compressed between the second side wall of the second spring mount and the second side wall of the opening of the second spring module.

10. The suspension of claim 9, wherein the first frame attachment portion is connected to the second frame attachment portion.

11. The suspension of claim 9, wherein the first frame attachment portion is integral with the second frame attachment portion.

12. The suspension of claim 9, wherein the first shear spring is comprised of a base plate having a flat upper surface and an upper plate having a V-shaped upper surface opposite the base plate adapted to mate with a corresponding V-shaped surface positioned on a first side wall of the first spring mount, wherein the upper plate has a flat lower surface parallel to the flat upper surface of the base plate, and wherein the second shear spring is comprised of a base plate having a flat upper surface and an upper plate having a V-shaped upper surface opposite the base plate adapted to mate with a corresponding V-shaped surface positioned on a second side wall of the first spring mount, wherein the upper plate has a flat lower surface parallel to the flat upper surface of the base plate; and wherein the third shear spring is comprised of a base plate having a flat upper surface and an upper plate having a V-shaped upper surface opposite the base plate adapted to mate with a corresponding V-shaped surface positioned on a first side wall of the second spring mount, wherein the upper plate has a flat lower surface parallel to the flat upper surface of the base plate, and wherein the second shear spring is comprised of a base plate having a flat upper surface and an upper plate having a V-shaped upper surface opposite the base plate adapted to mate with a corresponding V-shaped surface positioned on a second side wall of the second spring mount, wherein the upper plate has a flat lower surface parallel to the flat upper surface of the base plate.

13. The suspension of claim 12, further including a second through-hole positioned in at least one of the inboard or the outboard parts of the first spring mount adapted to allow passage of a third connecting rod therethrough, wherein the third connecting rod also connects the inboard part of the first spring mount together with the outboard part of the first spring mount; and further including a second through-hole positioned in at least one of the inboard or the outboard parts of the second spring mount adapted to allow passage of a fourth connecting rod therethrough, wherein the fourth connecting rod also connects the inboard part of the second spring mount together with the outboard part of the second spring mount.

14. The suspension of claim 13, wherein the first connecting rod is a threaded bolt that extends through the inboard part and the outboard part of the first spring mount, and the third connecting rod is a threaded bolt that extends through the inboard part and the outboard part of the first spring mount; and the second connecting rod is a threaded bolt that extends through the inboard part and the outboard part of the first spring mount, and the fourth connecting rod is a threaded bolt that extends through the inboard part and the outboard part of the first spring mount.

15. The suspension of claim 12, wherein the upper surface of the upper plate of the first shear spring has an apex that is located at a centerline drawn perpendicularly through a center of the upper plate and a center of the base plate of the first shear spring, and wherein the upper surface of the upper plate of the second shear spring has an apex that is located at a centerline drawn perpendicularly through a center of the upper plate and a center of the base plate of the second shear spring; and wherein the upper surface of the upper plate of the third shear spring has an apex that is located at a centerline drawn perpendicularly through a center of the upper plate and a center of the base plate of the third shear spring, and wherein the upper surface of the upper plate of the fourth shear spring has an apex that is located at a centerline drawn perpendicularly through a center of the upper plate and a center of the base plate of the fourth shear spring.

16. The suspension of claim 15, further including a flat intermediate plate positioned between the upper plate and the base plate of the first shear spring, and a flat intermediate plate positioned between the upper plate and the base plate of the second shear spring; and further including a flat intermediate plate positioned between the upper plate and the base plate of the third shear spring, and a flat intermediate plate positioned between the upper plate and the base plate of the fourth shear spring.

17. The suspension of claim 16, wherein the intermediate plate of the first shear spring has a flat upper surface and a flat lower surface that are parallel to the lower surface of the upper plate and to the upper surface of the base plate of the first shear spring; and the intermediate plate of the second shear spring has a flat upper surface and a flat lower surface that are parallel to the lower surface of the upper plate and to the upper surface of the base plate of the second shear spring; and the intermediate plate of the third shear spring has a flat upper surface and a flat lower surface that are parallel to the lower surface of the upper plate and to the upper surface of the base plate of the third shear spring; and the intermediate plate of the fourth shear spring has a flat upper surface and a flat lower surface that are parallel to the lower surface of the upper plate and to the upper surface of the base plate of the fourth shear spring.

18. A shear spring comprising:

a base plate having a flat upper surface;

an upper plate having a V-shaped upper surface opposite the base plate adapted to mate with a corresponding V-shaped surface positioned on a side wall of a spring mount, the upper plate having a flat lower surface parallel to the flat upper surface of the base plate, and an elastomeric material positioned between the flat upper surface of the base plate and the flat lower surface of the upper plate.

19. The shear spring of claim 18, wherein the V-shaped upper surface of the upper plate of the shear spring is at least partially covered with the elastomeric material providing an outer surface of the shear spring.

20. The shear spring of claim 18, wherein the upper plate has an apex that is located at a centerline drawn perpendicularly through a center of the upper plate and the base plate.

21. The shear spring of claim 20, wherein upper sides of a cross-section of the V-shaped outer surface of the upper plate are of equal length.

22. The shear spring of claim 20, wherein the upper plate is comprised of an aluminum extrusion.

23. The shear spring of claim 20, further including an intermediate plate positioned between the upper plate and the base plate.

24. The shear spring of claim 23, wherein the intermediate plate is positioned equidistant from the lower surface of the upper plate and the upper surface of the base plate.

25. The shear spring of claim 23, wherein the intermediate plate has a flat upper surface and a flat lower surface that are parallel to the lower surface of the upper plate and to the upper surface of the base plate.

26. The shear spring of claim 25, wherein the base plate has a truncated U-shaped cross section.

27. The shear spring of claim 25, wherein compression and shear strain in each of the elastomer sections is equalized across an entire cross-section thereof.

* * * * *